United States Patent
Patton et al.

(10) Patent No.: US 12,381,509 B2
(45) Date of Patent: Aug. 5, 2025

(54) FRAMES FOR SOLAR PANELS

(71) Applicant: Origami Solar, Inc., Sacramento, CA (US)

(72) Inventors: John C. Patton, Roseville, CA (US);
Eric L. Hafter, Sacramento, CA (US);
Tyler Hudson, Bend, OR (US)

(73) Assignee: Origami Solar, Inc., Sacramento, CA (US)

( * ) Notice: Subject to any disclaimer, the term of this patent is extended or adjusted under 35 U.S.C. 154(b) by 0 days.

(21) Appl. No.: 18/556,206

(22) PCT Filed: Apr. 19, 2022

(86) PCT No.: PCT/US2022/025388
§ 371 (c)(1),
(2) Date: Oct. 19, 2023

(87) PCT Pub. No.: WO2022/225961
PCT Pub. Date: Oct. 27, 2022

(65) Prior Publication Data
US 2024/0186945 A1 Jun. 6, 2024

Related U.S. Application Data

(60) Provisional application No. 63/288,556, filed on Dec. 11, 2021, provisional application No. 63/176,824, filed on Apr. 19, 2021.

(51) Int. Cl.
*H02S 30/10* (2014.01)
(52) U.S. Cl.
CPC ..................... *H02S 30/10* (2014.12)
(58) Field of Classification Search
None
See application file for complete search history.

(56) References Cited

U.S. PATENT DOCUMENTS

| | | | |
|---|---|---|---|
| 2010/0162641 A1* | 7/2010 | Reyal | F24S 25/40 52/173.3 |
| 2014/0020308 A1* | 1/2014 | Heisler | F24S 25/61 52/90.1 |

(Continued)

FOREIGN PATENT DOCUMENTS

| | | |
|---|---|---|
| CN | 102569465 A | 7/2012 |
| CN | 102760782 A | 10/2012 |

(Continued)

OTHER PUBLICATIONS

U.S. Appl. No. 63/176,803, filed Apr. 19, 2021. First named inventor: Hafter.

(Continued)

*Primary Examiner* — Ryan S Cannon
(74) *Attorney, Agent, or Firm* — Santangelo Law Offices, P.C.

(57) ABSTRACT

A frame (101) for at least partially enclosing or supporting a panel (190) is provided. The frame may include at least a first frame section (201-1) including a bottom flange (104) provided at a base of the frame section. A frame sidewall (103) may be provided at an outer portion of the frame section, the frame sidewall characterized by a height H extending from the bottom flange (104). A panel containment structure (101-1) may be provided at an upper portion of the frame sidewall (103), the panel containment structure including a lower shelf (105) extending from the frame sidewall. A support wall (431-1) may be provided at an inner portion of the frame section (201-1), the support wall extending (i) between the bottom flange (104) and the frame sidewall (103), (ii) between the bottom flange (104) and the lower shelf (105), or (iii) both (i) and (ii).

28 Claims, 39 Drawing Sheets

(56) References Cited

U.S. PATENT DOCUMENTS

| | | | | |
|---|---|---|---|---|
| 2017/0104445 A1* | 4/2017 | Depauw | ................... | F24S 25/35 |
| 2018/0212556 A1 | 7/2018 | Wegert et al. | | |
| 2022/0103117 A1* | 3/2022 | Gong | ...................... | H02S 30/10 |

FOREIGN PATENT DOCUMENTS

| | | |
|---|---|---|
| CN | 202651163 U | 1/2013 |
| CN | 208272919 U | 12/2018 |
| CN | 112165298 A | 12/2021 |
| JP | 10308522 A | 11/1998 |
| KR | 20140036105 A | 3/2014 |
| WO | 2020252091 A1 | 12/2020 |
| WO | 2021036273 A1 | 3/2021 |
| WO | 2022225961 A2 | 10/2022 |

OTHER PUBLICATIONS

U.S. Appl. No. 63/176,824, filed Apr. 19, 2021. First named inventor: Patton.
U.S. Appl. No. 63/288,556, filed Dec. 11, 2021. First named inventor: Patton.
U.S. Appl. No. 63/189,591, filed May 17, 2021. First named inventor: Hafter.
U.S. Appl. No. 63/213,541, filed Jun. 22, 2021. First named inventor: Hafter.
U.S. Appl. No. 63/224,271, filed Jul. 21, 2021. First named inventor: Patton.
U.S. Appl. No. 63/272,086, filed Oct. 26, 2021. First named inventor: Patton.
International PCT Patent Application No. PCT/US2022/25388, filed Apr. 19, 2022. First named Inventor: Patton.
International PCT Patent Application No. PCT/US2022/25388, filed Apr. 19, 2022. First named Inventor: Patton. International Search Report dated Oct. 26, 2022. 4 pages.
International PCT Patent Application No. PCT/US2022/25388, filed Apr. 19, 2022. First named Inventor: Patton. International Search Report dated Oct. 26, 2022. 9 pages.
Machine Translation of CN202651163U provided with the Written Opinion of the International Searching Authority. 2 pages. Obtained Sep. 16, 2022.
Machine Translation of CN112165298A provided with the Written Opinion of the International Searching Authority. 13 pages. Obtained Sep. 16, 2022.
Machine Translation of JPH10308522A provided with the Written Opinion of the International Searching Authority. 4 pages. Obtained Sep. 16, 2022.
Machine Translation of WO2021036273 provided with the Written Opinion of the International Searching Authority. 6 pages. Obtained Sep. 16, 2022.
European Patent Application No. 22792333.1, Third Party Observations dated Jul. 22, 2024, 19 pages.
European Patent Application No. 22792333.1, Search Report dated Feb. 14, 2025, 7 pages.

* cited by examiner

1900

1904

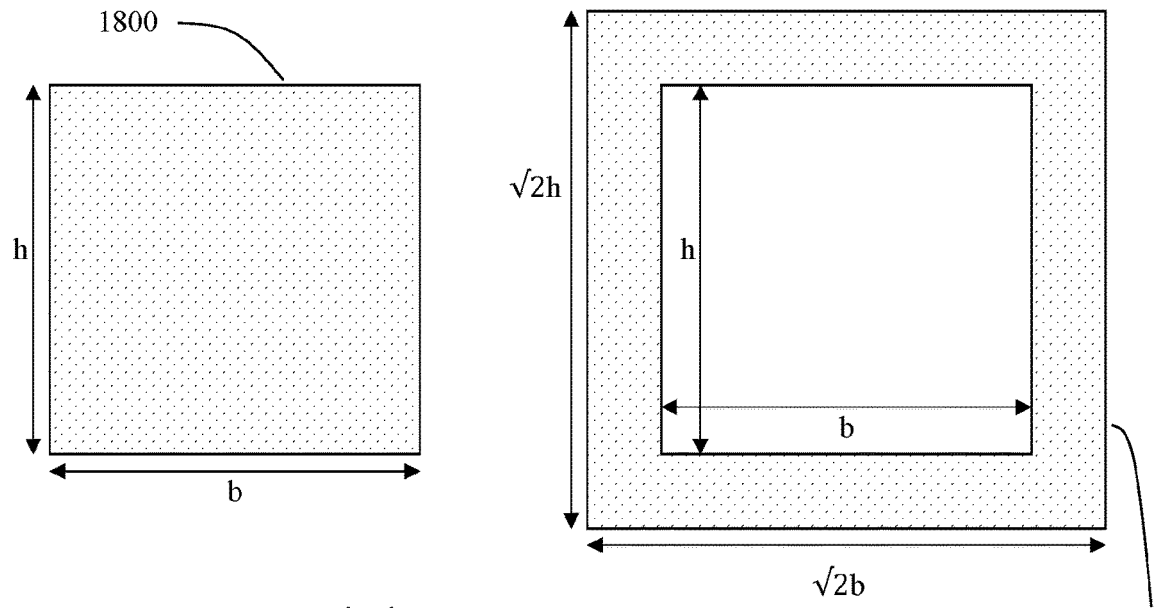

A = Area
$I_x$ = Moment of inertia along the (x) axis
b = base length
h = height length
σ = bending stress
τ = torsional shear stress
M = bending moment
y, r = distance from central axis
J = polar moment of inertia $A = bh$ $I_x = \dfrac{bh^3}{12}$ $I_y = \dfrac{hb^3}{12}$ $J = I_x + I_y = \dfrac{bh}{12}(b^2 + h^2)$ $\sigma = \dfrac{My}{I_x}$ $A = \left(\sqrt{2}b \cdot \sqrt{2}h\right) - b \cdot h = bh$ $I_x = \dfrac{\sqrt{2}b \cdot \left(\sqrt{2}h\right)^3}{12} = \dfrac{4bh^3}{12} = \dfrac{bh^3}{3}$ $I_y = \dfrac{\sqrt{2}h \cdot \left(\sqrt{2}b\right)^3}{12} = \dfrac{4hb^3}{12} = \dfrac{hb^3}{3}$ $J = I_x + I_y = \dfrac{bh}{3}(b^2 + h^2)$ $\tau = \dfrac{Tr}{J}$

FIG. 13

FRAMES FOR SOLAR PANELS

CROSS-REFERENCE TO RELATED APPLICATION

This application is the United States National Phase of PCT International Application No. PCT/US2022/025388, filed Apr. 19, 2022, which claims priority to and the benefit of U.S. Provisional Patent Application No. 63/176,824 filed on Apr. 19, 2021, entitled "FRAME SUPPORT SUB-STRUCTURES FOR SOLAR PANELS", and U.S. Provisional Patent Application No. 63/288,556 filed on Dec. 11, 2021, entitled "FRAMES FOR SOLAR PANELS", the contents of each application and any priority case are hereby incorporated by reference in their entirety.

TECHNICAL FIELD

The present disclosure relates to various embodiments for frame structures for panels such as solar panels.

BACKGROUND

Photovoltaic solar panels for residential and commercial use are relatively large and heavy. For example, a typical rectangular solar panel may weigh about 20-30 kg, have a width of about 1 meter, a length of about 1.6 to 2.5 meters, and a thickness of about 3 to 5 cm. A photovoltaic solar panel may typically be a multilayer laminated structure (sometimes referred to as a PV laminate) and may include photovoltaic cells encapsulated between a top glass and a protective back-sheet. A solar panel can further include appropriate wiring and junctions so that solar-generated electricity (typically DC) may be transmitted to a desired load, grid, or energy storage unit. While having some physical toughness, significant additional strength to the panel may be provided by including it in a frame. A frame may allow for easy attaching of a photovoltaic solar panel to a rack. A framed PV laminate is sometimes referred to as a PV module.

Over the years, the cost of solar panels has decreased perhaps due to a decrease in the material and manufacturing costs and even an increased efficiency of the solar cells. However, in order to further expand the use of renewable solar energy, there is a continuing desire to further reduce costs and simplify the manufacture of frames.

DISCLOSURE OF INVENTION

The present application includes a variety of aspects, which may be selected in different combinations based upon the particular application or needs to be addressed. In various embodiments, the application may include a frame for at least partially enclosing or supporting a panel. The frame may include at least a first frame section including a bottom flange provided at a base of the frame section. A frame sidewall may be provided at an outer portion of the frame section, the frame sidewall characterized by a height extending from the bottom flange. A panel containment structure may be provided at an upper portion of the frame sidewall, the panel containment structure including a lower shelf extending from the frame sidewall. A support wall may be provided at an inner portion of the frame section, the support wall extending (i) between the bottom flange and the frame sidewall, (ii) between the bottom flange and the lower shelf, or (iii) both (i) and (ii). The bottom flange, frame sidewall, lower shelf, and support wall may be formed at least in part from folds provided in a single piece of framework material.

It may be an object of the application to provide frames, frame sections, and frame precursor structures with improved frame strength.

Another object of the application may include improved mounting structures.

Yet another object of the application may include improved options for high-strength modules.

An object of the application may include frames, frame sections, and frame precursor structures with improved bending, improved twisting and even improved durability of framed panel structures.

Another object of the application may include frames, frame sections, and frame precursor structures with reduced material costs, reduced manufacturing costs, reduced manufacturing tack time, and perhaps even higher manufacturing yield.

In yet other objects, the application may provide frames, frame sections, and frame precursor structures with reduced installation costs, simplified installation, reduced installation time, higher installation yield, or some other advantage.

Naturally, further objects, goals and embodiments of the application are disclosed throughout other areas of the specification, claims, and drawings.

BRIEF DESCRIPTION OF DRAWINGS

FIG. 13 illustrates general models for understanding some aspects of the present disclosure with respect to stresses.

MODE(S) FOR CARRYING OUT THE INVENTION

It should be understood that embodiments include a variety of aspects, which may be combined in different ways. The following descriptions are provided to list elements and describe some of the embodiments of the present application. These elements are listed with initial embodiments; however, it should be understood that they may be combined in any manner and in any number to create additional embodiments. The variously described examples and embodiments should not be construed to limit embodiments of the present application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

It is to be understood that the drawings are for purposes of illustrating the concepts of the disclosure and may not be to scale. Additional details of certain embodiments of the present application may be found in PCT application PCT/US2020/037092 filed on Jun. 10, 2020 and published as WO2020/252091A1, U.S. provisional application 63/176,803 filed on Apr. 19, 2021, U.S. provisional application 63/189,591 filed May 17, 2021, U.S. provisional application 63/213,541 filed Jun. 22, 2021, U.S. provisional application 63/224,271 filed Jul. 21, 2021, and U.S. provisional application 63/272,086 filed Oct. 26, 2021, the entire contents of each application are incorporated herein by reference for all purposes.

Figure 1A:
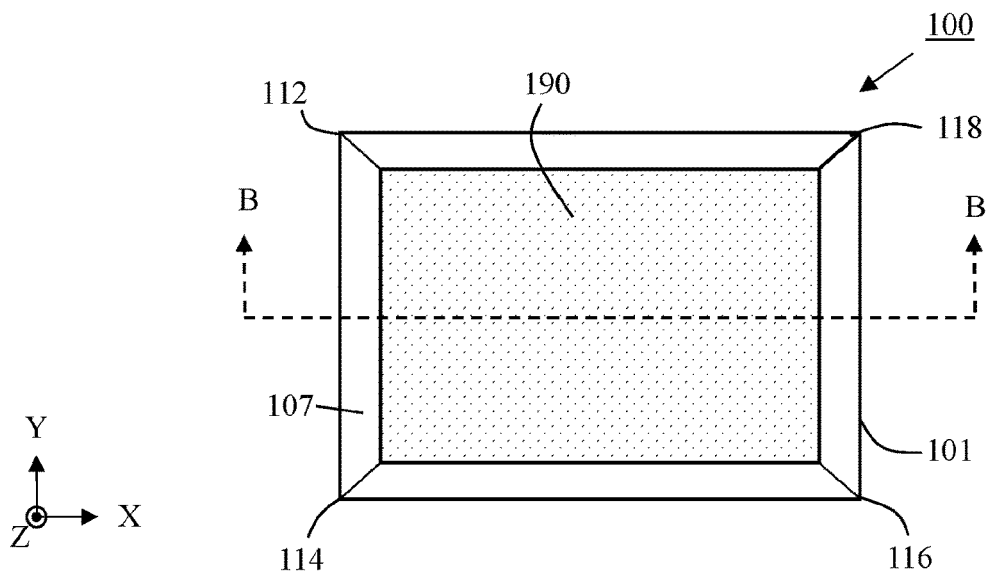
FIG. 1A is a plan view of a non-limiting example of a framed panel structure according to some embodiments.
Figure 1B:
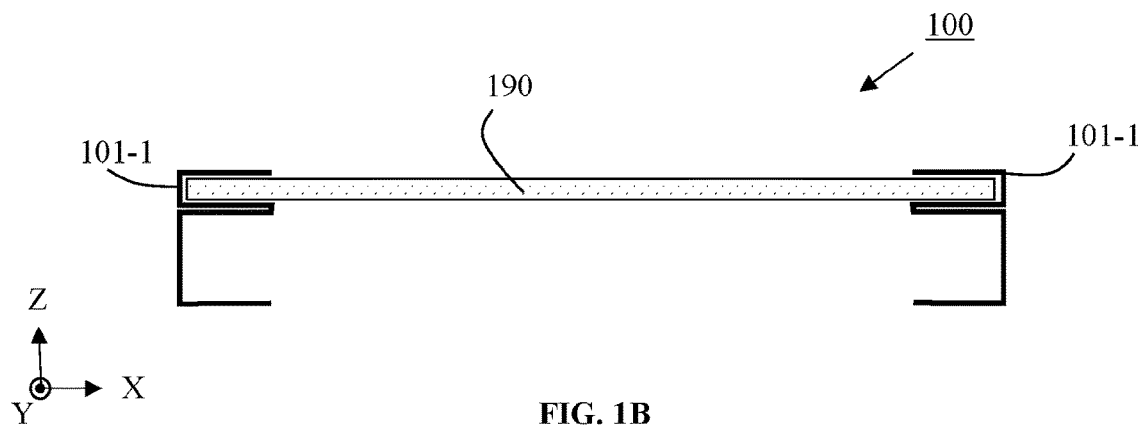
FIG. 1B is a cross-sectional view of a non-limiting example of a framed panel structure along cutline B-B of FIG. 1A according to some embodiments.
Figure 1C:
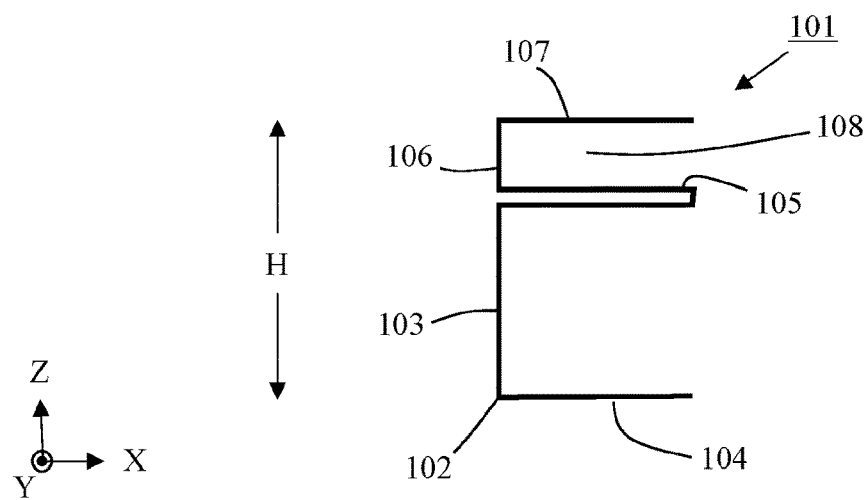
FIG. 1C is the cross-sectional view from FIG. 1B showing a non-limiting example of just the frame according to some embodiments.

FIG. 1A is a plan view of a non-limiting example of a framed panel structure 100 (e.g., a framed solar panel structure or PV module) including panel 190 (e.g., a solar panel) encased in a frame 101 according to some embodiments. FIG. 1B is a cross-sectional view of the framed panel structure 100 along cutline B-B. For added perspective, XYZ coordinate axes are also shown. FIG. 1C is the cross-sectional view as in FIG. 1B but excluding the panel to further illustrate some of the features of the frame 101.

In some embodiments and as discussed in more detail herein, frame 101 may be formed from substantially a single frame precursor structure that is bent in predetermined regions to accommodate three corners of the solar panel, perhaps with the fourth corner forming a joint between two ends of the frame precursor structure. That is, frame 101 may in some cases include a first corner bend 112 corresponding to a first corner of panel 190, a second corner bend 114 corresponding to a second corner of panel 190, a third corner bend 116 corresponding to a third corner of panel 190, and even a corner joint 118 corresponding to a fourth corner of panel 190.

Referring to FIGS. 1B and 1C, frame 101 may include a framework material that has been cut and folded into a desired shape. Frame 101 may be characterized by a height H and may include a lengthwise fold 102 defining an intersection of a frame sidewall 103 with a bottom flange 104. The frame may further include a series of folds to form a panel containment structure 101-1 including a lower shelf 105, a pocket wall 106, a top lip 107, and perhaps even a pocket region 108. In some embodiments, the bottom flange may generally represent, or be provided at, the base of the frame or framed panel structure. The panel 190 may be received into a portion of the pocket region and secured in place, optionally with a sealant that may have adhesive properties (not shown). Some non-limiting examples of sealants may include curable liquid silicone, urethane, epoxy, resin, any other liquid seal, or the like. Alternatively, or in combination, a pressure sensitive adhesive tape may optionally be used to secure the panel in the pocket region. In some embodiments, a panel containment structure may include only a lower shelf, or alternatively, only a lower shelf and a pocket wall. In such embodiments, the panel may optionally be secured in place using a sealant or pressure sensitive adhesive as described above. In some embodiments, only some of the frame sections may include a panel containment structure, for example, only frame sections on one set of opposing sides of a rectangular or square panel.

Although FIGS. 1B and 1C show non-limiting examples where the bottom flange, the lower shelf, and the top lip all extend away from the frame sidewall to an equal extent, any of these features may be varied such as shorter or longer than the others or the like. The angle between the frame sidewall and bottom flange is shown to be approximately 90°, e.g., in a range of about 85° to about 95°, but in some other embodiments, the angle may be outside of that range, e.g., in a range of about 45° to about 135° depending on other features of the structure and overall system design. In some embodiments, the lower shelf and bottom flange may remain approximately parallel, e.g., within about 40°, alternatively within about 30°, 20°, 15°, 10°, or 5°, regardless of the angle between the frame sidewall and the bottom flange. The top lip is shown to be parallel with the lower shelf, but in some embodiments, it may be at a slight angle or curved at the end perhaps so that the opening of the pocket region is larger or smaller than the pocket wall. In the embodiment illustrated in FIGS. 1B and 1C, the lower shelf 105 is shown as being formed from, or including multiple layers of, framework material. In some embodiments, any or all of the frame features (e.g., the sidewall, bottom flange, lower shelf, pocket wall, upper lip, support wall, or the like) may be formed from or include multiple layers of framework material. In some cases, multiple layers may provide increased strength to the frame.

FIGS. 1A, 1B, and 1C illustrate a conventional rectangular panel shape that may be common for solar panels. However, there is no particular limitation on the shape of the panel which may be any shape such as polygon having 3, 4, 5, 6 7, 8 or more sides. The sides of the polygon may have the same length, or alternatively some sides may be longer or shorter. The corner angles of the polygon may all be the same, or alternatively, some corner angles may have smaller or larger angles than others. Although frames and frame sections herein are generally shown as having a bottom flange, in some embodiments, one or more frame sections may not include a bottom flange. In some embodiments where the frame has a rectangular shape, the frame sections corresponding to the shorter sides of the frame may not include a bottom flange whereas the frame sections corresponding to the longer sides of the frame may include a bottom flange.

Making the frame or a frame section substantially from a single piece of framework material may have considerable manufacturing, assembly, and cost advantages. However, the panel containment structure in some embodiments may be formed using alternative methods and materials. For example, the lower shelf may include a piece of shelf material bonded (e.g., welded, brazed, soldered, glued, riveted, or the like) to an upper portion of the frame sidewall. Similarly, the top lip may include a piece of top lip material bonded to the top of the frame structure. Alternatively, the entire panel containment structure may be a separate structure designed to sit on, slip over, or otherwise mate with the frame sidewall. As discussed elsewhere herein, rather than one elongated piece of framework material, a 4-sided frame may be formed from 2, 3, or even 4 separate frame sections (or more or if the frame has more than 4 sides). Although not illustrated in FIGS. 1A-1C, the frame or framed panel structure may further include a support wall extending from the bottom flange to the panel containment structure or to the frame sidewall, as described in more detail elsewhere herein. It should be noted that, throughout this disclosure, an upper portion and top lip may in some cases refer to general positions relative to the bottom flange or the base of the frame, and does not necessarily indicate a position or orientation in the final framed panel structure, which may be oriented in a manner other than horizontal as shown in FIG. 1B (e.g., at an angle, on its side, or even parietally or fully inverted).

Figure 2A:
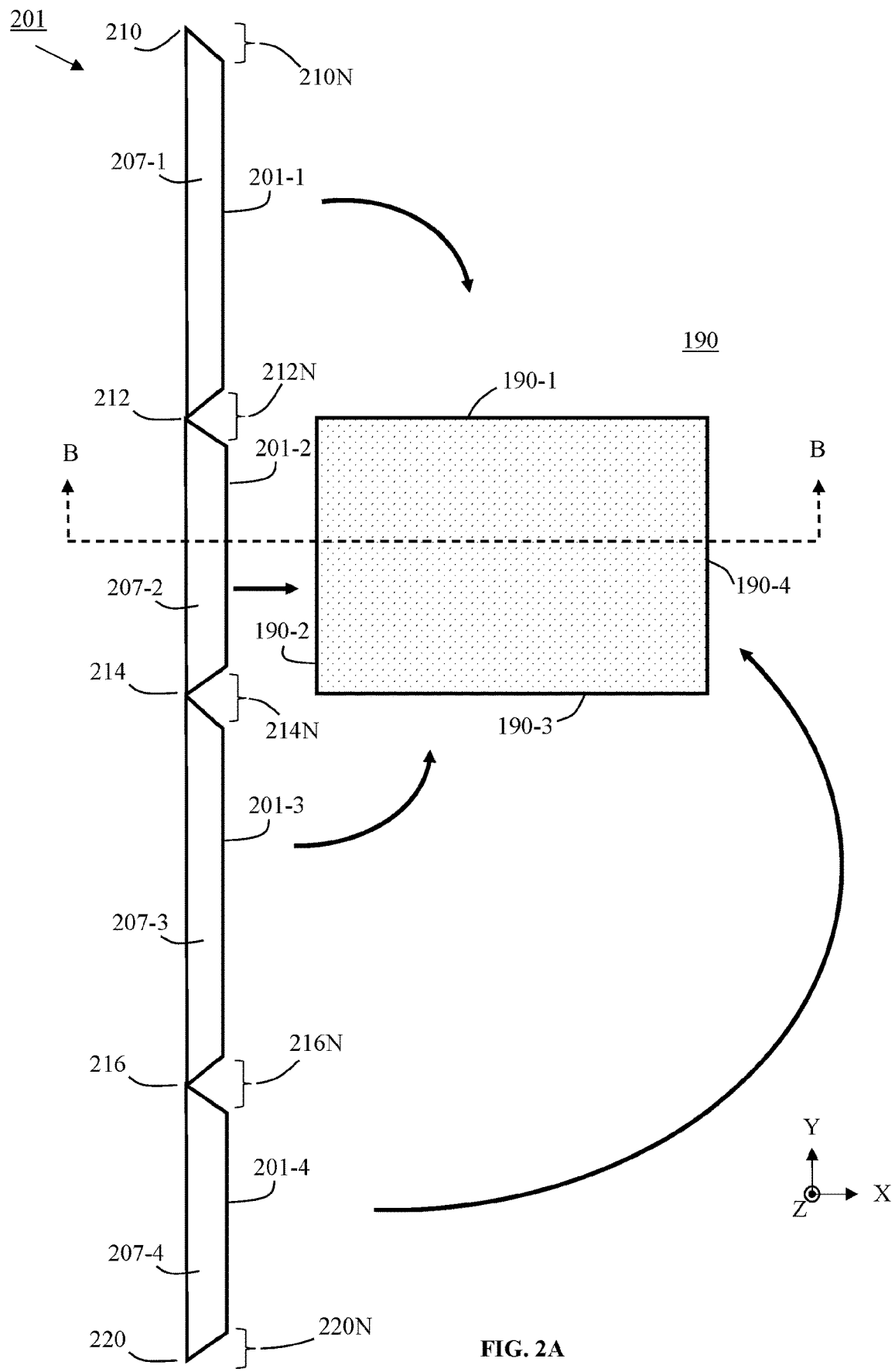
FIG. 2A is a plan view of a non-limiting example of a frame precursor structure and a panel prior to assembling a framed panel structure according to some embodiments.
Figure 2B:
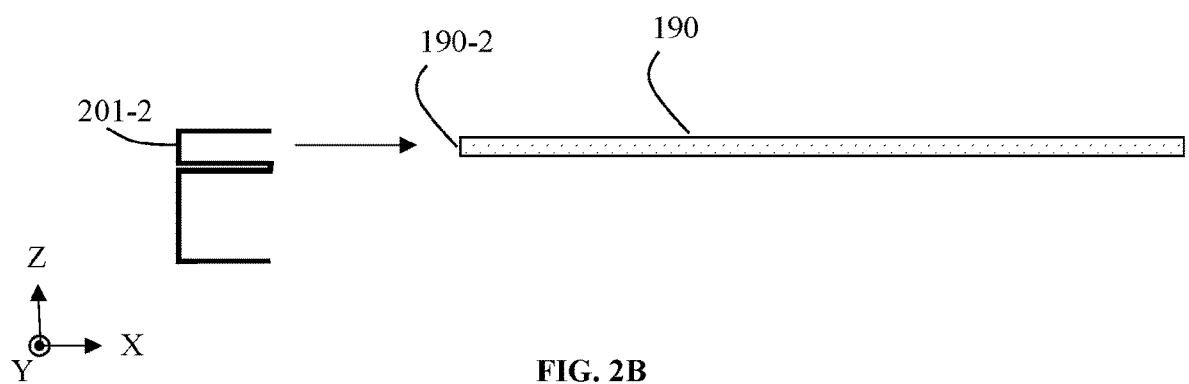
FIG. 2B is a cross-sectional view of a non-limiting example of a frame precursor structure and a panel along cutline B-B of FIG. 2A according to some embodiments.

FIG. 2A is a plan view schematic to generally illustrate construction of a framed panel structure according to some embodiments. FIG. 2B is a cross-sectional view of FIG. 2A along cutline B-B. A frame precursor structure 201 may be formed from framework material characterized by an average thickness. Frame precursor structure 201 may include a first end 210 and a second end 220 defining a lengthwise dimension. The frame precursor structure 201 may include a first frame section 201-1 designed to fit with or attach to first panel edge 190-1 of panel 190, a second frame section 201-2 designed to fit with or attach to second panel edge 190-2, a third frame section 201-3 designed to fit with or attach to third panel edge 190-3, and even a fourth frame section 201-4 designed to fit with or attach to fourth panel edge 190-4. Frame precursor structure 201 may include a first corner bend precursor axis 212 between the first and second frame sections and may be designed to bend along the Z axis (the height axis) of the frame sidewall. In a finished framed panel structure, first corner bend precursor axis 212 can correspond to first corner bend 112 (FIG. 1A). Similarly, frame precursor structure 201 may include second and third corner bend precursor axes 214 and 216, respectively.

Figure 2C:
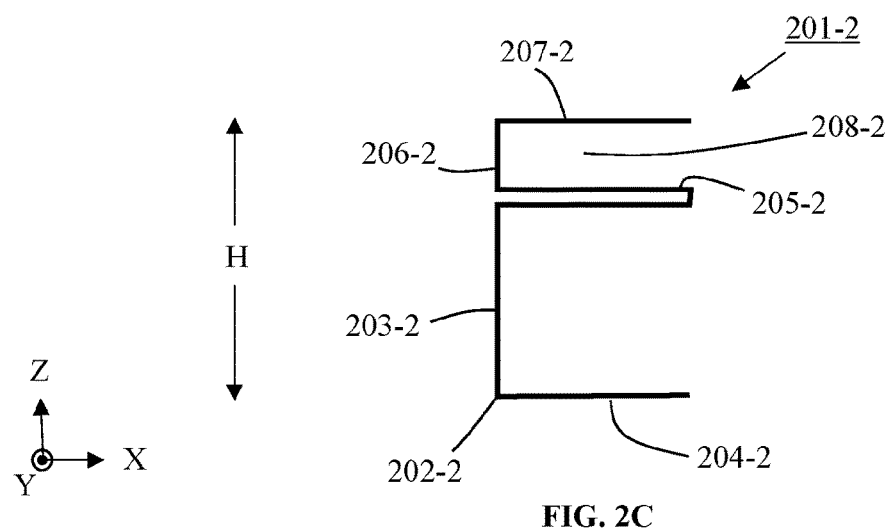
FIG. 2C is the cross-sectional view from FIG. 2B showing a non-limiting example of just the frame precursor structure according to some embodiments.

Referring to FIG. 2B, the cross-sectional structure correlates to that of FIG. 1B for the finished frame. FIG. 2C is the cross-sectional view as in FIG. 2B but excluding the panel to further illustrate some non-limiting examples of the features of the frame precursor structure, in particular, frame section 201-2. Here, second frame section 201-2 may be characterized by height H and may include a lengthwise fold 202-2 perhaps defining an intersection of a frame sidewall 203-2 with a bottom flange 204-2. The second frame section may include a series of folds to form a panel containment structure including a lower shelf 205-2, a pocket wall 206-2, a top lip 207-2 and perhaps even a pocket region 208-2. In some embodiments, the bottom flange may generally represent, or be provided at, the base of the frame section. Panel edge 190-2 of panel 190 may be received into a portion of the pocket region and secured in place, optionally with some sealant (not shown). In some embodiments, each frame section of the frame precursor structure may have substantially the same cross-sectional structure as shown for the second frame section 201-2 in FIG. 2B. But in some other embodiments, there may be differences between cross-sectional structures of two or more of frame sections. In the embodiment illustrated in FIGS. 2B and 2C, the lower shelf 205-2 is shown as being formed from, or including multiple layers of, framework material. In some embodiments, any or all of the frame section features (e.g., the sidewall, bottom flange, lower shelf, pocket wall, upper lip, support wall, or the like) may be formed from or include multiple layers of framework material. In some cases, multiple layers may provide increased strength to the frame.

In order to accommodate bending of the frame precursor structure to enclose the panel, the frame precursor structure may include a series of notches (212N, 214N, 216N) in the top lip, the lower shelf, and even the bottom flange, such notches corresponding to first, second, and third corner bend precursor axes, 212, 214, and 216, respectively. In FIG. 2A, the notches are only visible in the top lip (between top lip 207-1 and top lip 207-2, between top lip 207-2 and top lip 207-3, and between top lip 207-3 and top lip 207-4), but similar notches may also be present perhaps in the lower shelf and bottom flange. In some embodiments, the angle of the notch may be about 180° minus the angle of the panel corner being enclosed. Similarly, the ends of the frame precursor structure may also include an angled cut (210N and 220N) in the top lip, the lower shelf, and the bottom flange to accommodate formation of a corner joint.

Figure 2D:
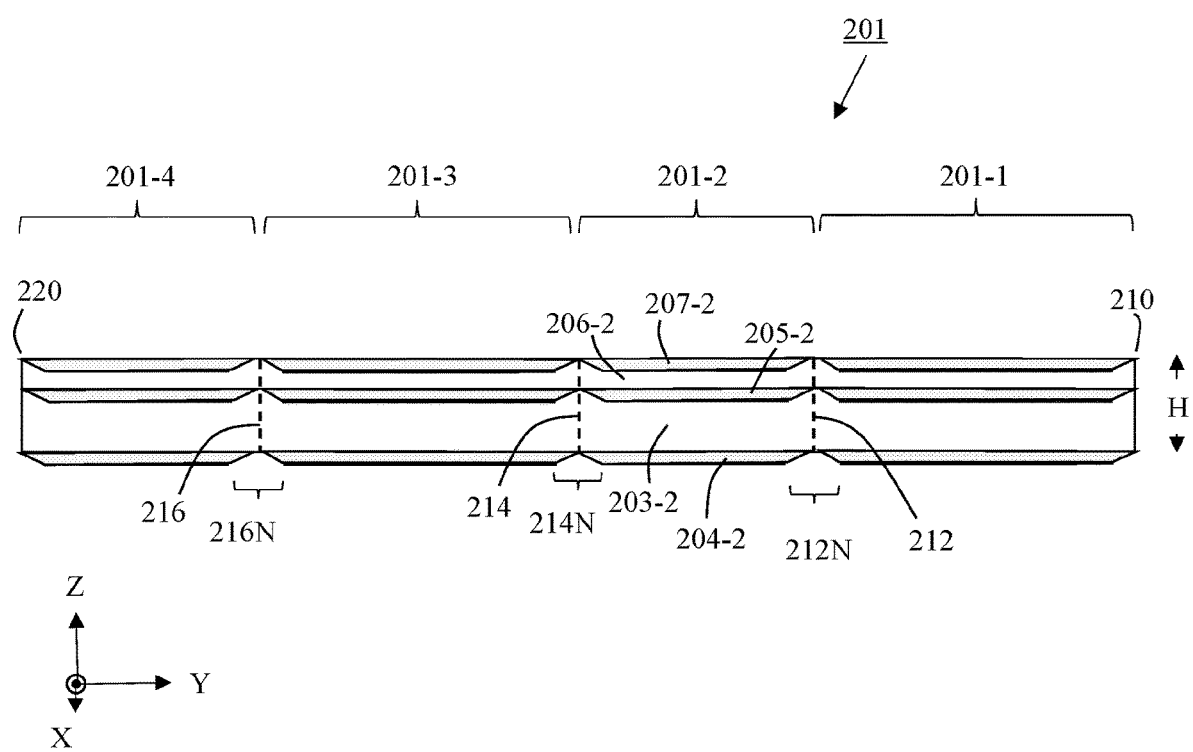
FIG. 2D is a side view with slight elevation of a non-limiting example of a frame precursor structure according to some embodiments.

In FIG. 2D, there is shown a non-limiting example of a side view schematic (with slight elevation) of the frame precursor structure facing the side that can receive the panel. For clarity, not all of the features are labelled, but in combination with the other figures, the identity of each feature is self-evident.

Figure 2E:
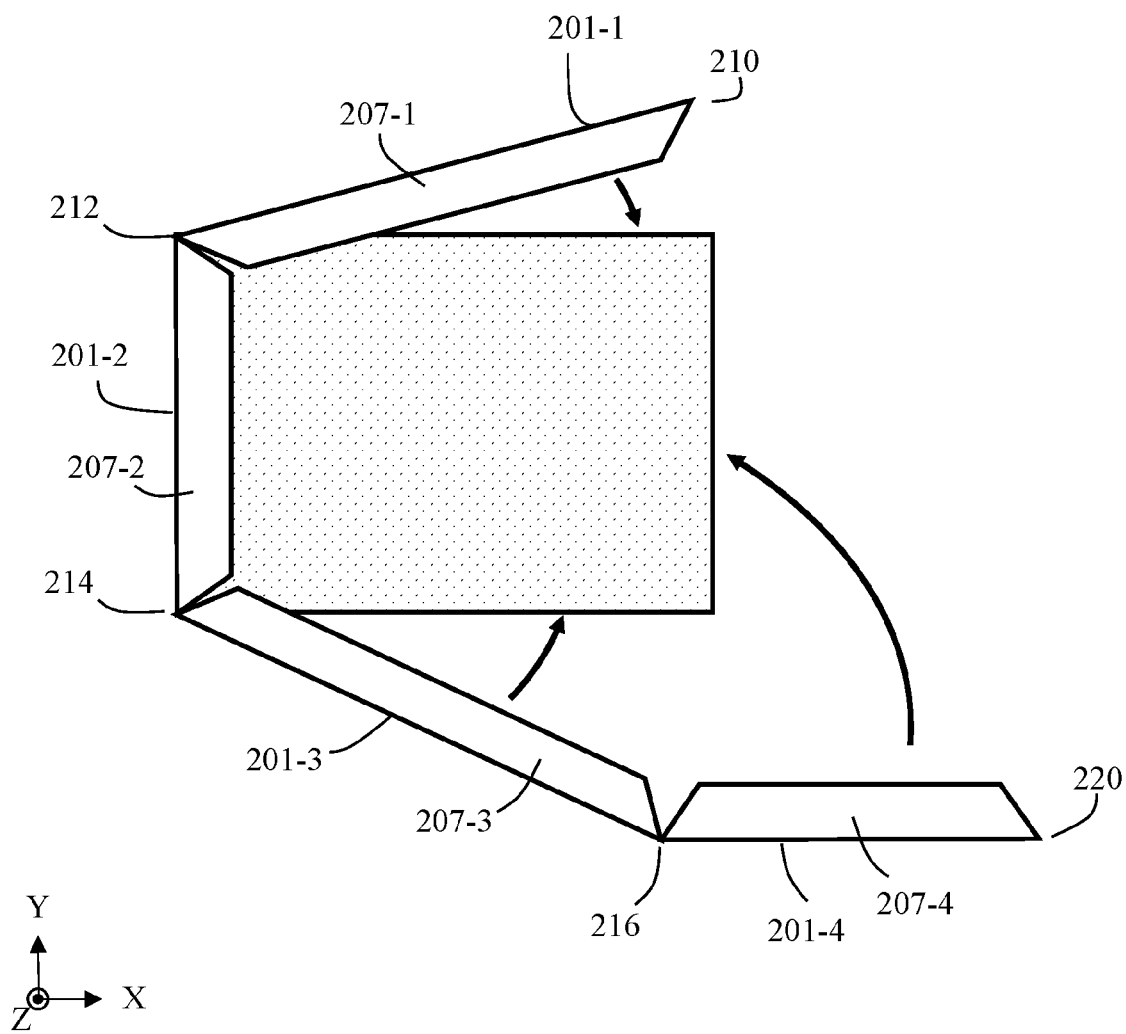
FIG. 2E is a plan view of a non-limiting example of a frame precursor structure and a panel at an intermediate stage of assembly according to some embodiments.

Referring to FIG. 2E, there is a plan view showing a non-limiting example of an intermediate state of assembling the framed panel structure where the frame precursor structure has received the panel edge 190-2 into frame section 201-2 and bends are being formed along the bend precursor axes as other frame sections move closer to their intended final positions around the panel. Note that assembly does not have to start with panel edge 190-2 but may instead start with any panel edge or corner. Forming the corner joint 118 (see FIG. 1A) where the two ends (210 and 220) of the frame precursor structure meet may be a final step in this portion of the framed panel structure assembly, but there may be additional steps to further secure or modify the frame (e.g., adding optional support brackets, tightening optional bolts, or the like). In some embodiments, assembling the framed panel structure may include use of an assembly apparatus that holds and manipulates the panel and frame precursor structure(s). With respect to orientation of the components during assembly relative to the assembly apparatus, the plan view of FIG. 2E may represent a view from above, or alternatively a view from below, or even a view from the side, depending on the nature of the assembly apparatus.

In some embodiments, the corner bends and/or corner joints may include features capable of forming interlocking structures. For example, a bottom flange or other portion on one side of the corner may include a locking element that may be received into an opening on the other side of the corner.

Although not illustrated in FIGS. 2A-2E, one or more frame sections may further include a support wall extending from the bottom flange to the panel containment structure or to the frame sidewall, as described in more detail elsewhere herein.

In some embodiments, the frame precursor structure 201 may be substantially linear (as shown) prior to assembling the framed panel structure. In some embodiments, the frame precursor structure may be received by an assembler already partially bent at one or more corner bend precursor axes. One or more corner bend precursor axes may be pre-scored or include a furrow or features that promote bending along the height access between the frame sections.

The frame and frame precursor structures described in FIGS. 1A-C and 2A-E are non-limiting examples provided in order to illustrate how some of the frame support substructures and frame support walls described below may be implemented in a frame. Alternative designs and structures may be used effectively with such support structures. In some embodiments, rather than using one frame precursor structure, multiple frame precursor structures may be used to enclose a panel. For example, with a rectangular panel, two similar frame precursor structures, each having one corner bend precursor axis may be used to form a framed panel structure that may include two corner joints at opposite corners and two corner bends at opposite corners. Alternatively, a first frame precursor structure may have two corner bend precursor axes and a second frame precursor structure may have no corner bend precursor axes and be used to form a framed panel structure that may include two corner joints at adjacent corners and two corner bends also at adjacent corners. Alternatively, three frame precursor structures may be used where one may have one corner bend precursor axis and the other two may not, whereby a framed panel structure may include one corner bend and three corner joints. Alternatively, four frame precursor structures may be used wherein none have a corner bend precursor axis and the framed panel structure may include four corner joints.

Figure 3:
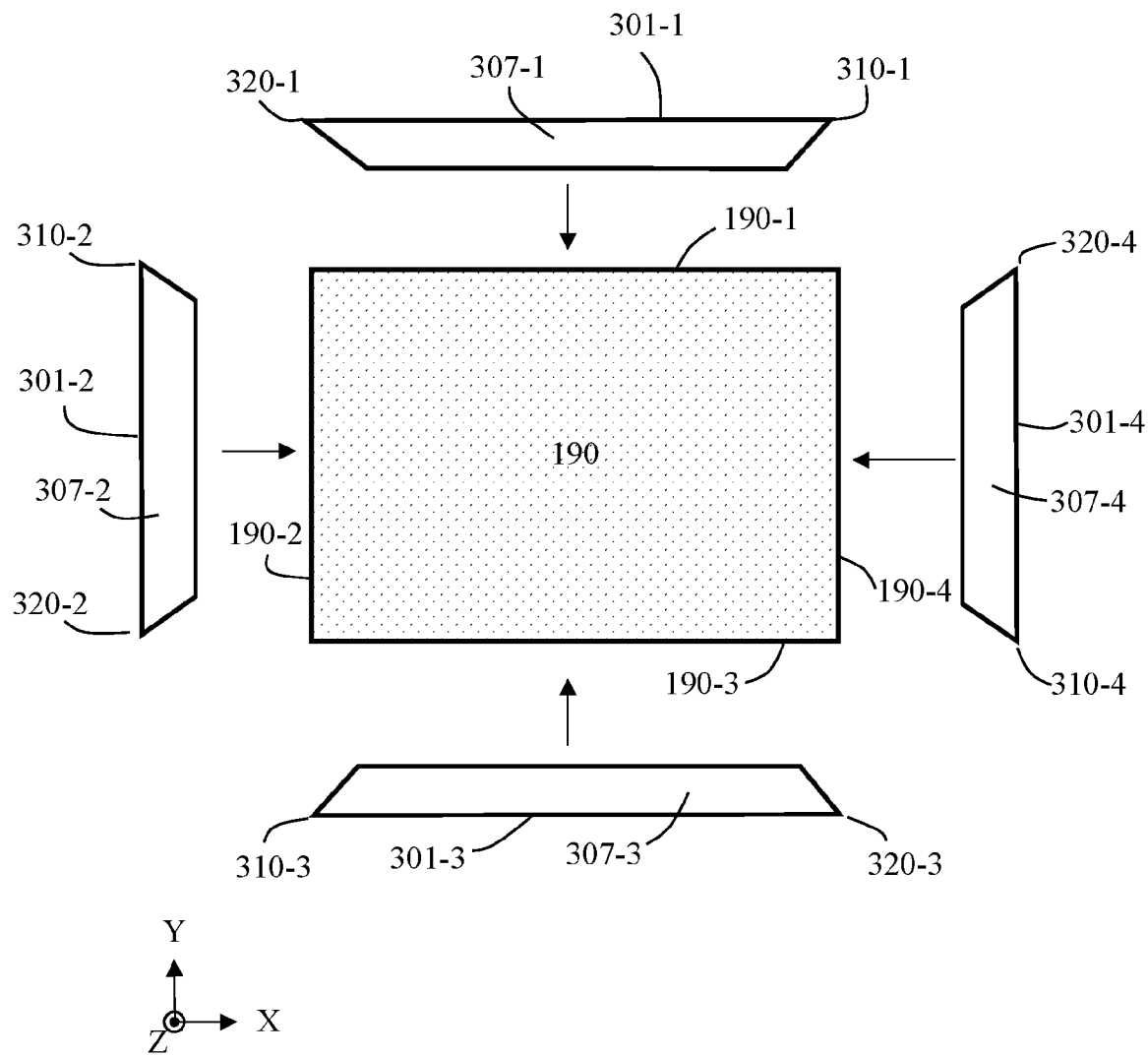
FIG. 3 is a plan view showing a non-limiting example of assembling a frame using four frame precursor structures according to some embodiments.

FIG. 3 is a plan view showing a non-limiting example of assembling a frame using four frame precursor structures according to some embodiments. Each frame precursor structure (each of which may also be referred to herein as a frame section) 301-1, 301-2, 301-3, 301-4 may optionally include any of the features described above, such as a bottom flange, a side wall, and even a panel containment structure that may include a lower shelf, a pocket wall and a top lip. In some cases, one or more frame sections may further include a support wall extending from the bottom flange to the panel containment structure or to the frame sidewall as discussed elsewhere herein. In this view, only the top lip 307-1, 307-2, 307-3, 307-4 of each frame precursor structure is visible. Each frame precursor structure may have a first end 310-1, 310-2, 310-3, 310-4 and a second end 320-1, 320-2, 320-3, 320-4. When assembled, a first end of one frame precursor structure may form a corner joint with a second end of an adjacent frame precursor structure. As discussed with respect to FIG. 2E, the plan view of FIG. 2E may represent a view from above, or alternatively a view from below, or even a view from the side, depending on the nature of the assembly apparatus.

As indicated by the arrows, a first frame precursor structure may be designed to fit with or attach to a first panel edge 190-1 of panel 190, a second frame precursor structure 301-2 may be designed to fit with or attach to a second panel edge 190-2, a third frame precursor structure 301-3 may be designed to fit with third panel edge 190-3, and even a fourth frame precursor structure 301-4 may be designed to fit with fourth panel edge 190-4. There are numerous variations regarding the sequence used to assemble the frame. In some embodiments, all four frame precursor structures can concurrently be brought together with their respective panel edges and attached at approximately the same time. In some cases, attachment is sequential and may be in any order. In some embodiments, just two or three frame precursor structures are concurrently brought together with their respective panel edges and the remaining frame precursor structures are attached later or already pre-attached. In some embodiments, two or three of the frame precursor structures may be first attached to each other via a corner joint connection and then attached to the panel. In some cases, a frame precursor structure may initially be brought together with its respective panel edge at an angle rather than flush or parallel. In some cases, the choice of assembly sequence may in part be dependent upon the design of the corner joint and optional corner joint connection to be used. In some embodiments, corners joint connection may, for example, be made using clinching, rivets, screws, nuts/bolts, welding, adhesives, or the like. In some cases, corner joint connections may be made using a tab connection assembly or any of the other connection structures and methods discussed in U.S. Provisional Patent Application 63/272,086 filed Oct. 26, 2021.

In some embodiments, a finished frame (whether made from a continuous piece or from multiple frame section pieces) may further include one or more cross bars that may extend from one frame section to an opposite or adjacent frame section. In some embodiments with respect to a rectangular frame, a cross bar may extend between the two longest opposing frame sections. In some cases, a cross bar may connect two opposing frame sections at about their middle areas. Cross bars may act to strengthen the frame. A cross bar may be connected to the frame at the bottom flange, a frame sidewall, or at some other frame feature including, but not limited to, support walls (discussed below). In some embodiments, a cross bar structure may include an upper surface upon which the panel may rest or optionally be adhered to. In some cases, cross bars may be readily attached as part of the panel mounting process (e.g., as discussed in FIGS. 2E and 3). That is, an additional separate step may not be needed in some cases. In some embodiments, the cross bars may be formed of the framework material used for the rest of the frame. In some embodiments, the cross bars may use a different material.

Figure 4A:
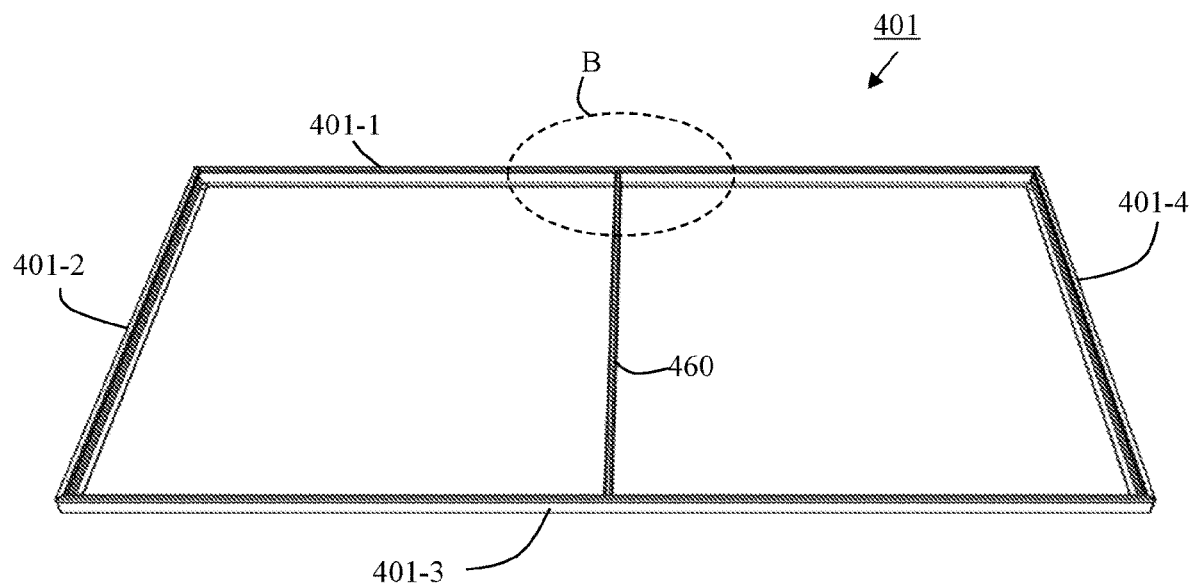
FIG. 4A is a perspective view of a non-limiting example of a frame that includes a cross bar according to some embodiments.

FIG. 4A is a perspective view of a non-limiting example of a frame that includes a cross bar according to some embodiments. For clarity, the framed panel is not shown. In some cases, frame 401 may include a first frame section 401-1, second frame section 401-2, third frame section 401-3, and even fourth frame section 401-4. Cross bar 460 may be connected to opposing frame sections 401-1 and 401-3. In some embodiments, connection may, for example, be made using clinching, crimping, rivets, screws, nuts/bolts, welding, adhesives, or the like. In some cases, connections may be made using a tab connection assembly or any of the other connection structures and methods discussed in U.S. Provisional Patent Application 63/272,086 filed Oct. 26, 2021.

Figure 4B:
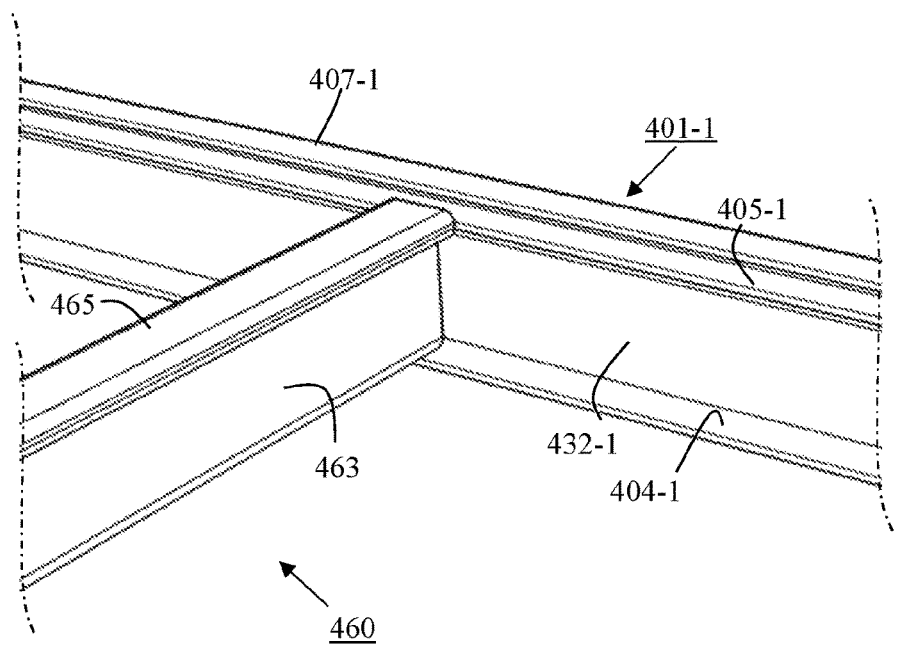
FIG. 4B is a zoomed in view of area B from FIG. 4A according to some embodiments.

FIG. 4B is a zoomed in view of area B from FIG. 4A. In some cases, first frame section 401-1 may optionally have a box frame structure as described below. Frame section 401-1 may, for example, include a bottom flange 404-1, a support wall 432-1, lower shelf 405-1, top lip 407-1, and frame sidewall (not visible in this view). In some embodiments cross bar 460 may include a cross bar top surface 465 and cross bar sidewall 463. Cross bar 460 may optionally have a box type of structure including another sidewall (not visible in this figure) opposite cross bar sidewall 463 and a bottom flange or bottom surface (not visible in this figure) opposite cross bar top surface 465. In some cases, the cross bar top surface 465 may contact the panel and may option- ally include an adhesive layer to help secure the panel. In some embodiments, the cross bar top surface 465 may be flush (such as at the same height) with lower shelf 405-1 of the first frame section. In some embodiments, cross bar 465 may be connected to the first frame section at the frame sidewall, bottom flange, support wall, or any combination.

The framework material should have sufficient strength to support the panel. In some embodiments, the framework material may include a metal such as uncoated steel, coated steel, stainless steel, aluminum, or another metal or metal alloy (perhaps coated or uncoated), or the like. In some embodiments, the framework material may be a coated metal such as coated steel or the like that includes an anti-corrosion coating or treatment. For example, coated steel may include metallic-coated steel, organic-coated steel, or tinplate. Some non-limiting examples of metallic coatings for steel may include zinc and zinc alloys (e.g., a Zn—Al alloy), aluminum, magnesium, or the like. Depending on the coating, such metallic coatings may be applied by hot dip galvanization, electro-galvanizing, thermal spray, or the like. Some non-limiting examples of organic coatings may include polyesters or PVDF, which may be applied from a paint or other coatable mixture. Tinplate may be made by coating tin onto the cold-rolled steel, e.g., by electroplating. In some embodiments, the thickness of coated steel for use as a framework material may be in a range of about 0.5 to about 0.6 mm, alternatively about 0.6 to about 0.7 mm, alternatively about 0.7 to about 0.8 mm, alternatively about 0.8 to about 0.9 mm, alternatively about 0.9 to about 1.0 mm, alternatively about 1.0 to about 1.2 mm, alternatively about 1.2 to about 1.4 mm, alternatively about 1.4 to about 1.6 mm, alternatively about 1.6 to about 1.8 mm, alternatively about 1.8 to about 2.0 mm, or any combination or permutation of ranges thereof, or the like. When a coated steel framework material may be used to make a frame for a conventional photovoltaic solar panel, in some embodiments, the thickness may be in a range of about 0.7 to about 1.4 mm.

In some embodiments, steel may be a steel other than stainless steel. For some applications, e.g., for photovoltaic solar panels, steel may have a useful combination of technical and commercial benefits. Steel can have properties that may be applied in the material selection, fabrication, and long-term durability that are useful to the form and function of the frame or frame precursor structure product. During preproduction, steel may be readily coated with anti-corrosion coatings employing multiple chemistries that offer corrosion resistance which can be beneficial to the durability of the frames. Steel may be painted with clear or specific colors that may optionally allow identification of a specific module selection of various categories. Because painting or anti-corrosion coatings may be applied in high-speed manufacturing formats, the cost and durability are more effective than most other metals. Steel may optionally be both painted and have anti-corrosion coatings, allowing for multiple benefits to the branding, module identification, and long-term maintenance over non-steel module frames.

Steel is a highly durable material that may be significantly deformed while retaining its toughness and resistance to structural failure. The properties of toughness while being deformed may be referred to as ductility. Due to the ductility of steel, it may be shaped starting from a thin sheet of material, e.g., wrapped around a coil, which may be fed directly into a punching station that may employ a variety of methods to cut or partially cut or create grooves in the face of the steel sheet. Following this process, the steel which has been modified in the punching station may be fed into a linear and non-linear set of rollers which can deform the steel sheet into a new profile, of which many variations are possible. Due to the ductility of steel, this process may be performed at high speed, with production speeds from less than about 0.1 meters/second to over about 4.0 meters/second. Steel's compatibility with this high-speed forming process may provide significant manufacturing cost advantages. Due to steel's ductility, it may be bent into simple or complex shapes that will retain their relative shape or position for the life of the product. In some embodiments, steel that has been shaped into simple or complex forms may also be designed to yield or partially yield at specific locations or along a predetermined path as part of intended installation or operational parameters.

Steel has electrical properties which may allow it to act as a code-approved path of intended electricity, such as to create an electrical ground or electrical bonding. Due to the properties of steel and the potential anti-corrosion or paint coatings available, the electrical ground or electrical bonding may still occur without the need for additional hardware or devices. When steel module frames are attached directly to a steel structure, most electrical codes allow for this connection to be considered a competent electrical ground or electrical bond. This means that the framed panel structures may connect directly to a steel substructure and may be considered to have achieved sufficient electrical ground or electrical bond sufficient to meet code, with or without addition of hardware, as part of the module-to-substructure attachment.

Steel's magnetic properties may allow for special features and benefits through the use of magnetic steel frames. The magnetic properties of steel may allow for simple attachments of appurtenances utilizing few or no added hardware. Steel's magnetic properties may allow for sensory devices to collect useful data during the manufacture of a frame precursor structure or data regarding a panel installation. Steel's magnetic properties may allow for robot sensors to be used to assist in the proper installation or deinstallation of panel modules. Steel's magnetic properties may allow the easy attachment or pre-attachment of hardware of various sorts to the module frame to facilitate installation of additional equipment.

In some cases, the frame precursor structure may be fabricated from an elongated sheet of the framework material that is bendable and cuttable. The elongated sheet may be cut, for example, using a water cutter, a laser, a punch, a saw, or the like, depending on the framework material. The cuts may be used to form some of the various features described herein such as notches, holes, furrows or other features. After at least some of the cuts have been made, the elongated sheet may be folded to form at least a portion of the frame precursor structure. Such folding may include, but is not limited to, roll forming. In some embodiments, the cutting and folding processes may be applied to a coated steel-based framework material.

Figure 5:
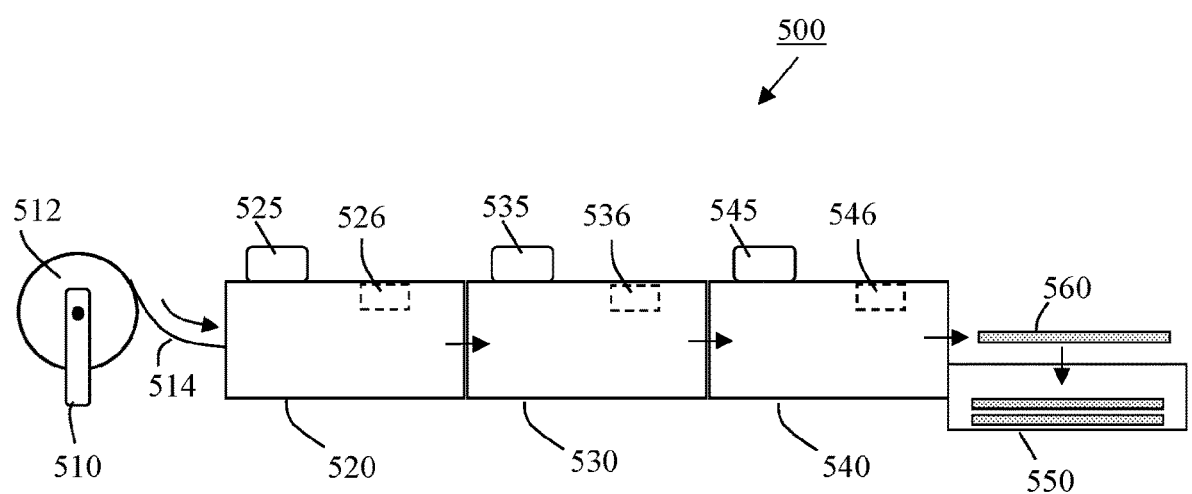
FIG. 5 is a schematic diagram of a non-limiting example of a manufacturing process line for making frame precursor structures according to some embodiments.

FIG. 5 is schematic diagram showing a non-limiting example of a manufacturing process line for making frame precursor structures according to some embodiments. Manufacturing process line 500 may include a framework material station 510 having framework material that may be fed into the next station. In some embodiments, the framework material may be in the form of sheets that are pre-cut to the final desired length. In some embodiments, the framework material may be fed continuously to the next station. For example, framework material station 510 may include a coil 512 of coated steel 514. The coated steel 514 may be supplied to punching station 520. For example, the punching station 520 may pull the coated steel 514 from the coil. In some embodiments, certain cutting and/or punching processes may be performed at punching station 520 to cut and/or remove predetermined sections of the framework material to make a patterned framework material. In some embodiments, the framework material may be cut to a desired length at the punching station, if such cut has not yet been performed. In some embodiments, the process may be controlled to high tolerances. Punching station 520 may include a microprocessor 525 and machine software and/or firmware that may control the cutting. Punching station 520 may include one or more sensors 526 that provide data to the microprocessor which may be used to monitor the punching processes or identify defects. The microprocessor 525 may be in electronic communication with another microprocessor or with an external computer for sending or receiving data or instructions. Such electronic communication may be through cables or wireless methods.

After the punching station 520, the patterned framework material, e.g., coated steel or the like, may be received by a roll forming station 530. The steel may be shaped in a linear fashion using multiple rollers that provide a graduated bending process to form the steel into the desired shape such as a shaped framework material. The design of the rollers, order of the rollers, and tolerances may be highly precise, and may result in a fully or even nearly fully shaped and punched frame precursor structure. Roll forming station 530 may include a microprocessor 535 and machine software and/or firmware that may control the roll forming. Roll forming station 530 may include one or more sensors 536 that provide data to the microprocessor which may be used to monitor the bending and folding processes or identify defects. The microprocessor 535 may be in electronic communication with another microprocessor or with an external computer for sending or receiving data or instructions. Such electronic communication may be through cables or wireless methods. In some embodiments, the framework material may be cut to a desired length at the roll forming station, if such cut has not yet been performed. In some embodiments, the roll forming station may include an adhesive applicator tool to apply an appropriate adhesive to a predetermined portion of the framework material while shaping framework material, e.g., to help the shaped framework material to maintain its shape.

After the roll forming station 530, the shaped framework material, e.g., coated steel, may be received by a post forming station 540. Some non-limiting examples of post forming processes may include cutting the frame precursor structures to length, buffing/deburring, cleaning, or passing the frame precursor structures through straightening rollers or dies that may ensure product accuracy. Post forming station 540 may include a microprocessor 545 and machine software and/or firmware that may control one or more post forming processes. Post forming station 540 may include one or more sensors 546 that provide data to the microprocessor which may be used to monitor the post forming processes or identify defects or out-of-tolerance parts. These data may be fed back to roll forming station 530 for active adjustment of roll forming rollers or adjustment rollers. Post forming station 540 may include a cleaning section. The microprocessor 545 may be in electronic communication with another microprocessor or with an external computer for sending or receiving data or instructions. Such electronic communication may be through cables or wireless methods.

After the post forming station 540, finished or even nearly finished frame precursor structures 560 are received by a finished product station 550. The frame precursor structures may be loaded into transportation containers and prepared for delivery, e.g., to a solar panel module production facility.

In some embodiments, the framework material may proceed in a generally linear perhaps forward direction from one station to the next. In some embodiments, the direction of framework material may be temporarily reversed within a station, for example, to repeat a particular step. In some embodiments, there may be multiple punching stations, roll forming stations, and/or post forming stations.

For any of the aforementioned stations, the microprocessor(s) may provide control signals to electro-mechanical motors that may be responsible for moving the intermediate products along the manufacturing line. Depending upon the process to be performed on the intermediate products, software/firmware running on the microprocessor(s) may dictate various factors/parameters of production. For merely some non-limiting examples, a microprocessor may dictate the speed and/or direction of the intermediate products traversing a given station. In some embodiments, a microprocessor may dictate when and/or how the intermediate products are to be shaped, punched, cut or the like in order to affect the desired intermediate/final products. In some embodiments, a microprocessor may receive signals from one or more sensors for monitoring manufacturing progress, identifying defects or out-of-tolerance parts, or measuring some other useful property of intermediate products as they are made. For example, an optical or imaging sensor(s) may provide data that allows a microprocessor to assess manufacturing status and/or how well a particular production step was performed. In some embodiments, if quality is below standard, a microprocessor may send a status alert signal to a system operator and/or to another microprocessor. Other sensors may also be useful to monitor manufacturing status and/or quality control metrics. In addition to optical and imaging sensors, non-limiting examples of potentially useful sensors or their components may include laser-based sensors including, but not limited to, laser position sensors, vision systems including, but not limited to vision measurement and shape vision systems, contact sensors including, but not limited to contact position sensors, vibration sensors, thermal sensors, conductivity sensors, roughness sensors, profilometers, ultrasonic sensors, stress sensors, or the like.

In some embodiments, the frame or framed panel structure may be attached to a support structure that may hold the frame or framed panel structure in a predetermined position. Such support structures and systems may take many forms, but some non-limiting examples may include racking, rail mounts, pole mounts, tracking mounts, or non-tracking mounts, or the like.

In combination with a support structure, a frame or framed panel structure may be attached to its intended target, including but not limited to, attachment to a building (e.g., a roof, a wall, an awning or the like), to the ground, to a shade structure or carport, or to a moving or stationary vehicle. In some embodiments, a frame or framed panel structure may be attached directly to its intended target without an intermediate support structure. In such case, the target itself may act as the support structure.

To provide robust support and strength to the framed panel such as a solar panel, it may be useful for the frame to include one or more connection features, for example, when forming a corner joint between frame precursor structures or sections. For the purposes of describing various connection features and technology below, a frame precursor structure and frame sections may be used interchangeably unless otherwise noted. In some cases, the frame may also include additional strengthening features such as cross bars that may extend from one frame section to an opposite or adjacent frame section. These additional strengthening features may also benefit from the use of one or more connection features. Similarly, in some embodiments, certain connection features may be used to attach a framed panel structure to a support structure such as racking.

Frame Support Substructures

In some embodiments, the frame or frame sections illustrated in FIGS. 1-3 may benefit from additional structural support features such as frame support substructures perhaps to improve the strength of the frame in some way to address various forces it may experience when used in a framed panel structure. For example, such additional support may enable the frame to hold larger panels (e.g., PV laminates), withstand greater environmental and/or handling forces (e.g., wind, snow, mounting, clamping, bending, torsional stresses or the like), or increase PV module lifetime by reducing the number or intensity or of stress points, or improving their distribution. In some cases, structural support features may enable the use of framework materials that are thinner, easier to handle, or less expensive.

In some embodiments a useful structural support feature such as a frame support substructure may include a support wall extending (i) between the bottom flange and the frame sidewall, (ii) between the bottom flange and the lower shelf, or (iii) both (i) and (ii). In some cases, a frame or frame section including a support wall, bottom flange, sidewall, and lower shelf, may be advantageously produced from a single piece of framework material. In some cases, using a single piece of framework material for these features may simplify manufacturing thereby reducing costs and increasing throughput and yield. Such single piece manufacturing may also increase the lifetime of the frame by avoiding the many failure-prone attachments points that would be needed if these features were assembled from separate parts.

Figure 6A:
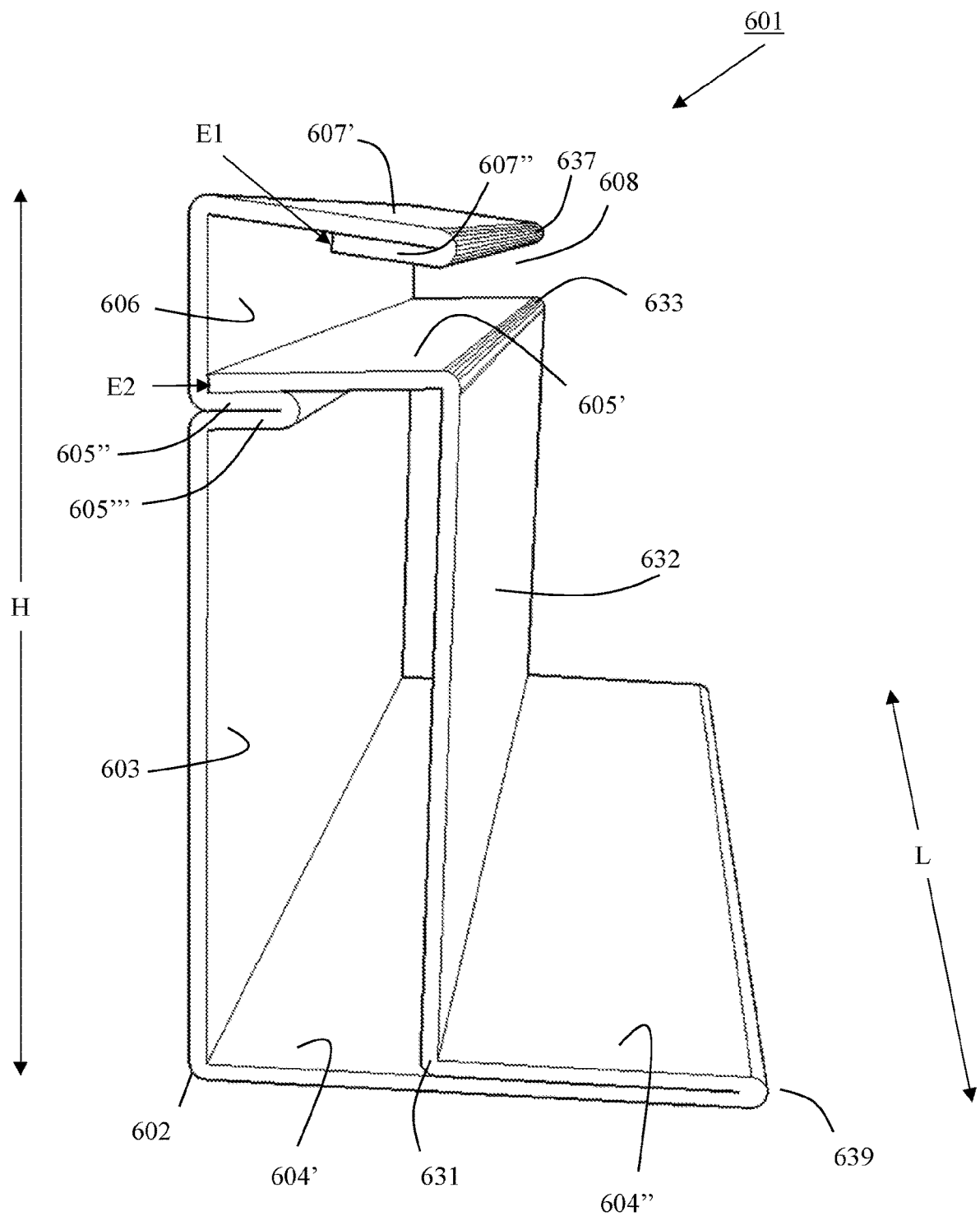
FIG. 6A is a perspective view of a cutaway portion of a non-limiting example of a frame section including a support wall according to some embodiments.
Figure 6B:
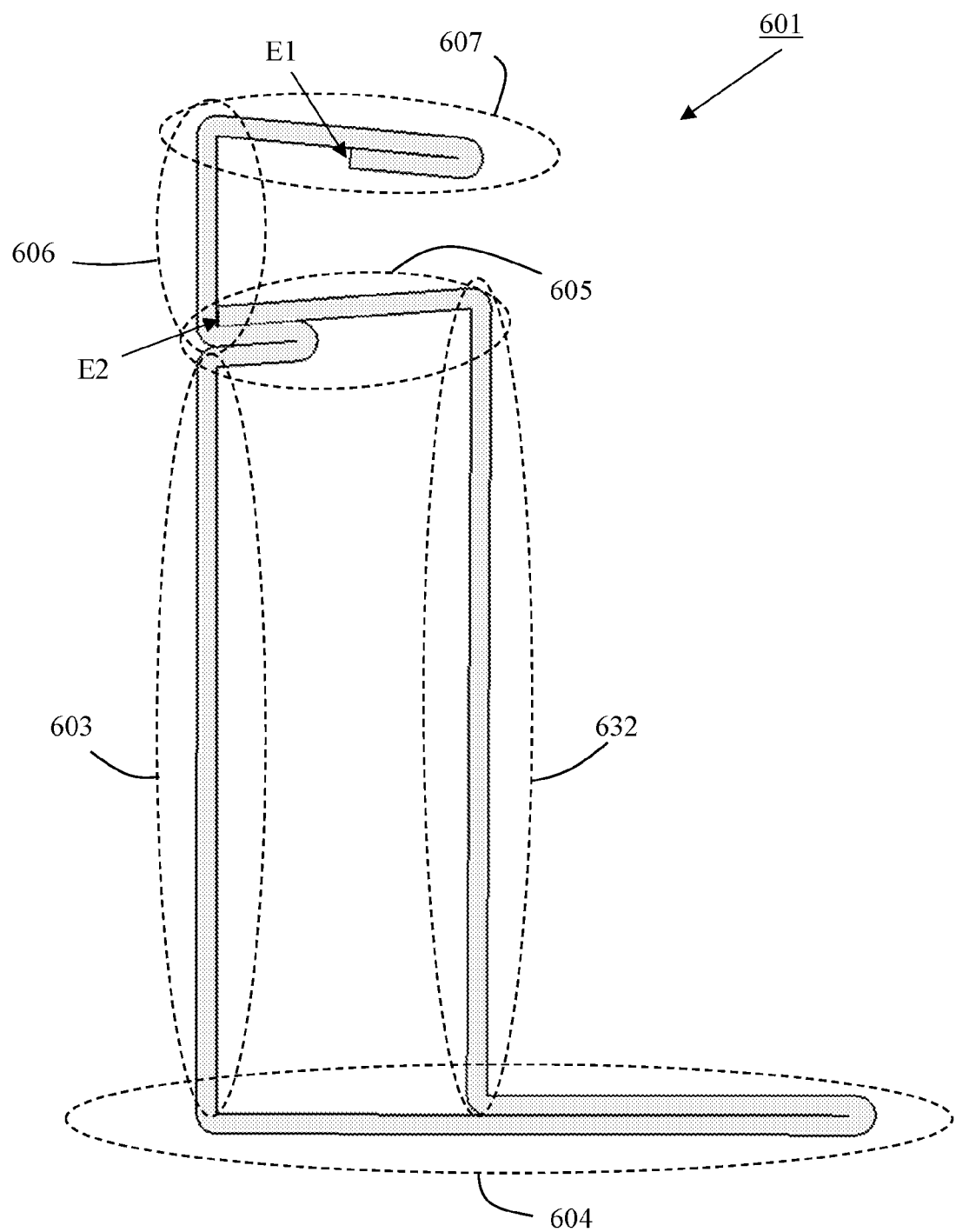
FIG. 6B is a cross-sectional view of the frame section from FIG. 6A according to some embodiments.

There are many embodiments of useful frame sections that include a support wall. FIG. 6A is a perspective view of a cutaway portion of a non-limiting example of a frame section including a support wall according to some embodiments. The height H and lengthwise L axes are also shown for reference. FIG. 6B is a cross-sectional view of the frame section from FIG. 6A, but labelled in a modified manner to clarify that any of the features may include multiple layers of framework material. Frame section 601 may include a framework material that has been cut and folded into a desired shape. Frame section 601 may include a bottom flange 604 provided at the base of the frame section, which in some embodiments may include multiple layers of framework material such as bottom flange layers 604' and 604". A frame sidewall 603 may be provided at an outer portion of the frame section and characterized by a height extending from the bottom flange. In some embodiments, a lengthwise fold 602 may define an intersection of the frame sidewall 603 and the bottom flange 604, e.g., with bottom flange layer 604'. A panel containment structure may be provided at an upper portion of the frame sidewall. The panel containment structure may include at least a lower shelf 605 extending from the frame sidewall and may also include a pocket wall 606, a top lip 607, and perhaps even a pocket region 608 for containing the panel. In some embodiments, some or all of the lower shelf 605 may include multiple layers of framework material, such as lower shelf layers 605', 605". 605'". In some embodiments, two or more lower shelf layers may be formed from a fold in the framework material at the upper portion of the frame sidewall. In some cases, the lower shelf layers 605" and 605'" formed from the fold in framework material at the upper portion of the frame sidewall may be characterized as a panel containment support feature, upon which lower shelf layer 605' rests. In some embodiments, the top lip may be formed of multiple layers of framework material, such as top lip layer 607' and top lip layer 607" which may be formed from a top lip fold 637 to form a multilayered rounded top lip edge. A support wall 632 may be provided at an inner portion of the frame section (inner relative to the frame sidewall). In some embodiments, the support wall 632 may extend between the bottom flange and the lower shelf. In some embodiments, the frame section may include a reversing flange fold 639 such that a portion 604' of the bottom flange may include a double layer of framework material. In some embodiments, another lengthwise fold 631 may define an intersection of the support wall 632 with the bottom flange structure, e.g., with portion 604'. In some cases, a lengthwise fold 633 may define an intersection of the support wall with the lower shelf 605.

Figure 6C:
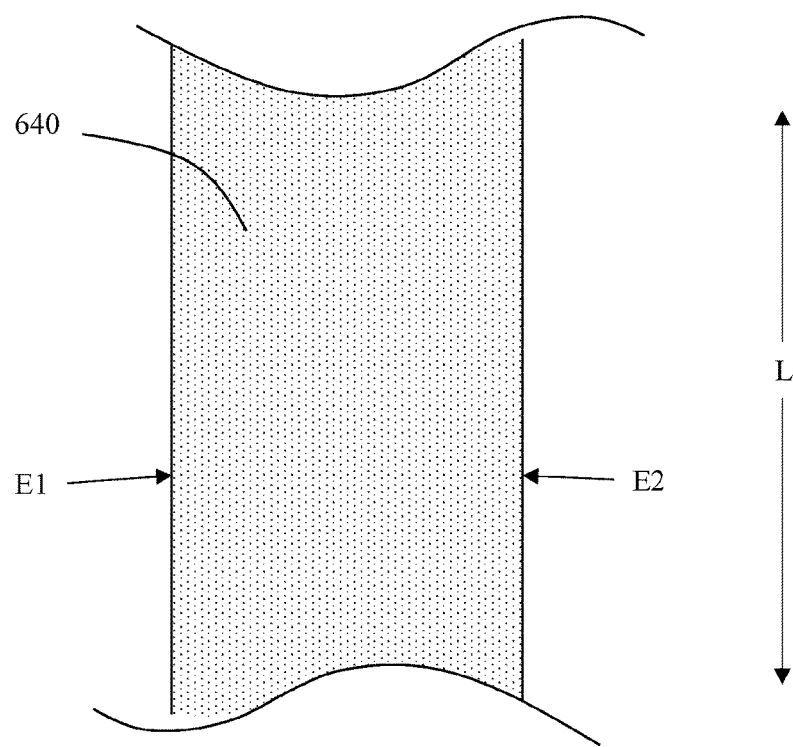
FIG. 6C is a plan view of a non-limiting example of a portion of framework material according to some embodiments.

FIG. 6C is a plan view of a non-limiting example of a portion of framework material 640 prior to any cutting, punching, or folding operations that may be used to make the frame section 601. The lengthwise dimension of the framework material is illustrated as are a first edge E1 and second edge E2, which are also labelled in FIGS. 6A and 6B. In some embodiments, such as shown in FIGS. 6A and 6B, E1 may correspond to the end of top lip layer 607" and E2 may correspond to the end of lower shelf layer 605'.

Figure 6D:
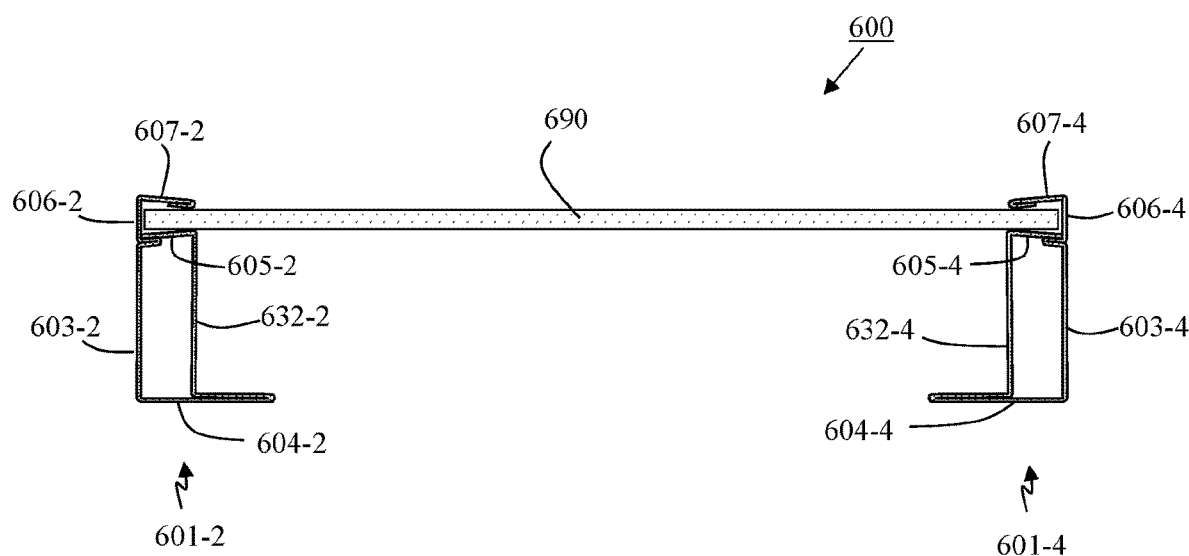
FIG. 6D is a cross-sectional view of a non-limiting example of a framed panel structure according to some embodiments.

FIG. 6D is a cross-sectional view of a non-limiting example of a framed panel structure according to some embodiments. Framed panel structure 600 may include various frame sections as previously discussed, e.g., frame section 601-2 and opposing frame section 601-4. In some embodiments, each frame section may include a frame sidewall 603-2, 603-4, a bottom flange 604-2, 604-4, a lower shelf 605-2, 605-4, a pocket wall 606-2, 606-4, a top lip 607-2, 607-4, and a support wall 632-2, 632-4. The panel 690 may be received into a portion of each pocket region (formed by the lower shelf, the pocket wall, and the top lip) and secured in place, optionally with a sealant that may have adhesive properties (not shown). The frame sidewall of a frame section may be characterized as provided at an outer portion of the frame section whereas the support wall of the same frame section may be characterized as provided at an inner portion of the frame section. An outer portion, in some embodiments may include relative to the support wall position, the frame sidewall may be generally provided further from the center of the panel. An inner portion, in some embodiments may be relative to the frame sidewall position, the support wall may be generally provided closer to the center of the panel. An outer portion and inner portion may be relative terms with respect to the frame sidewall and support wall, and do not necessarily mean the outermost part or innermost part of a frame section (although that may be the case in some embodiments).

Frames or frame precursor structures having a frame section like FIG. 6A or 6B may sometimes be referred to herein as a box frame perhaps where the bottom flange, frame sidewall, lower shelf and support wall collectively form in cross-section an enclosed structure, in this case, one having four sides. However, a box frame may apply to any frame section that in cross section forms any enclosed shape. In some embodiments, the enclosed shape may involve at least the bottom flange, the frame sidewall, and the support wall, and have three or more apparent sides in cross section.

Figure 7A:
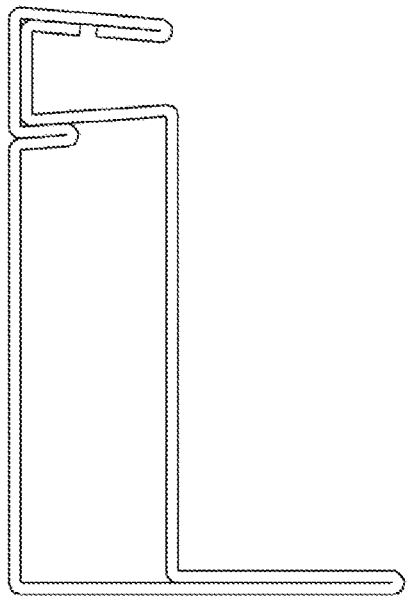
FIGS. 7A-7OO are cross-sectional views of some non-limiting examples of frame sections according to some embodiments.
Figure 7B:
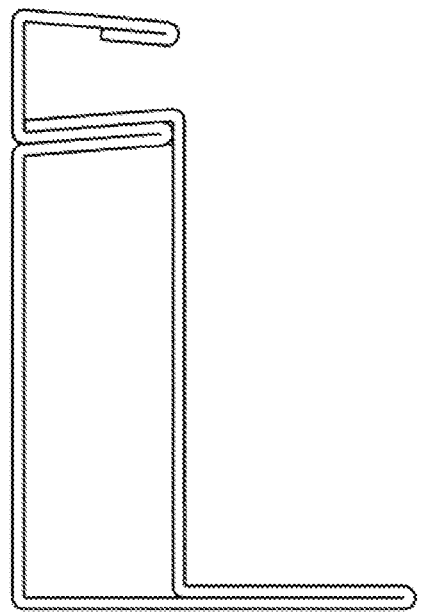
Figure 7C:
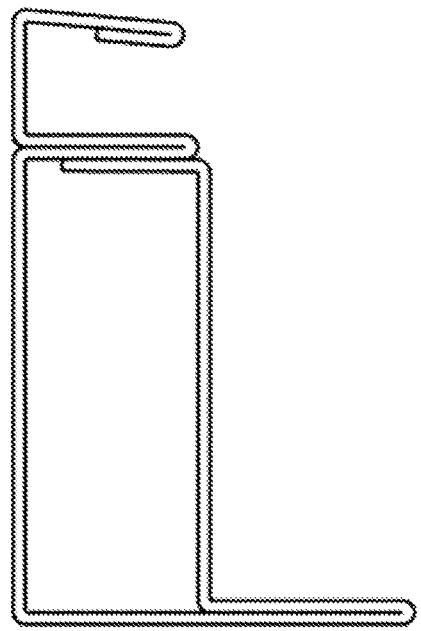

As mentioned, there are numerous alternative embodiments of box frames besides those shown in FIGS. 6A-6B. FIGS. 7A-7OO are cross-sectional views of some non-limiting examples of frame sections according to some embodiments. For clarity, these figures are generally not labelled with part numbers, but the identity of their various frame features are self-evident from the other figures and discussion herein. Box frames, including but not limited to the box frames illustrated herein, may have one or more of the following advantages: improved load distribution; improved strength for use with top clamps when mounting to racking; improved torsional stiffness; improved flexural stiffness; improved manufacturability; or some other advantage. As noted elsewhere, wherever layers of framework material meet, an attachment feature may optionally be provided to bond or otherwise hold the layers together. In some cases, a particularly useful, but still optional attachment feature location may be highlighted in the figure by a star (*). Some non-limiting examples of attachment features may include clinching, crimping, rivets, screws, nuts/bolts, welding, adhesives, or the like. In some cases, an attachment feature may include interlocking elements between the two layers of framework material. Where such interlocking elements are at least in part prefabricated into the framework material, e.g., during roll forming and/or punching, such attachment feature may be a locking feature. In some embodiments, a locking feature may include a hole, a hook, a plug, a tab, a spring tab, or the like formed in the framework material. In some cases, connections between layers may be made using a tab connection assembly or any of the other connection structures and methods discussed in U.S. Provisional Patent Application 63/272,086 filed Oct. 26, 2021. Some of these figures and attachment features are discussed in more detail below, but it is first useful to provide some additional non-limiting general discussion about some of the frame section features.

Bottom Flange

Figure 7D:
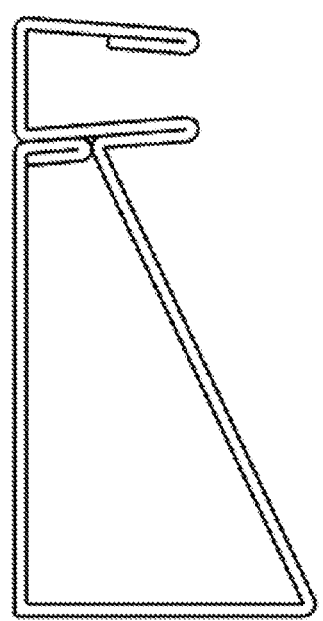
Figure 7E:
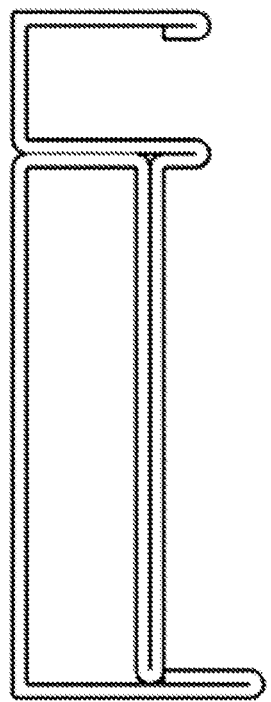
Figure 7F:
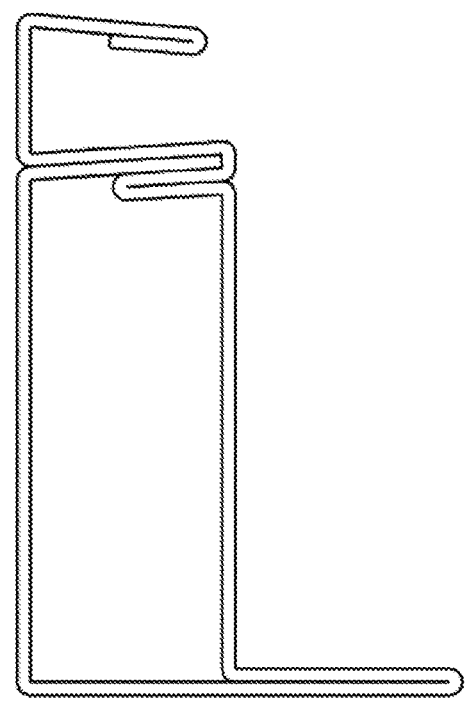
Figure 7G:
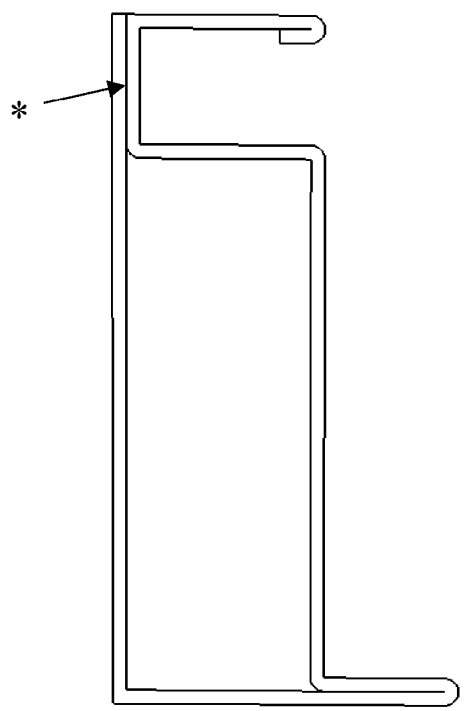
Figure 7H:
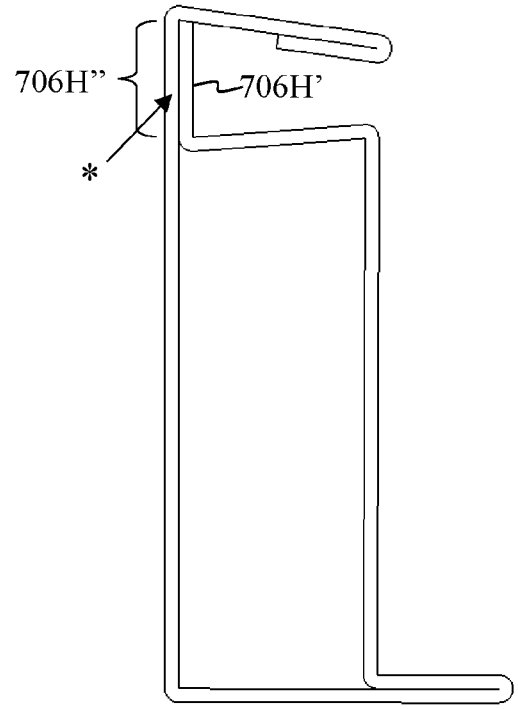
Figure 7I:
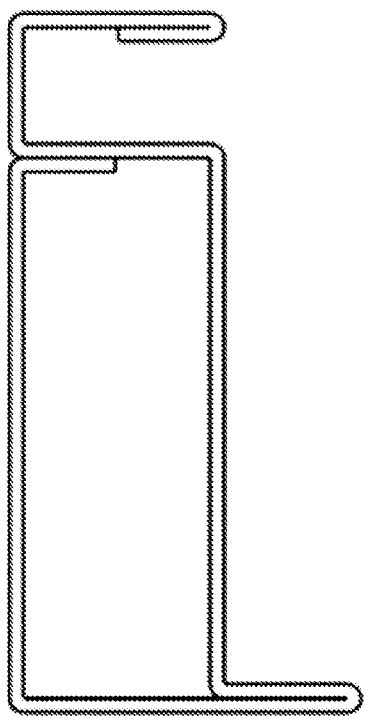
Figure 7J:
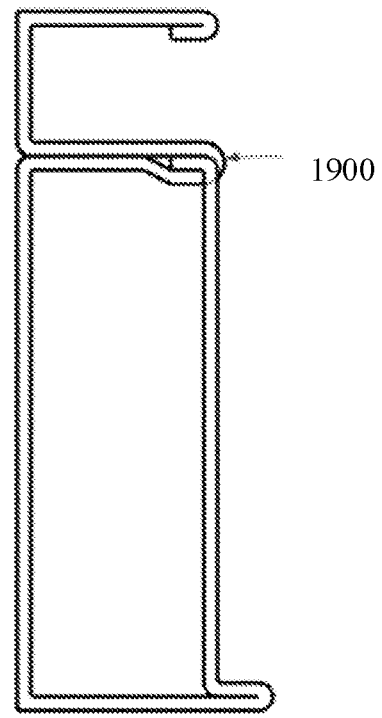
Figure 7K:
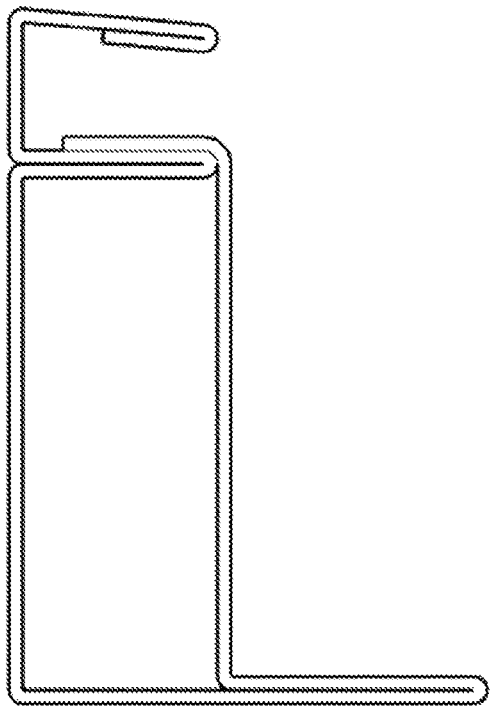
Figure 7L:
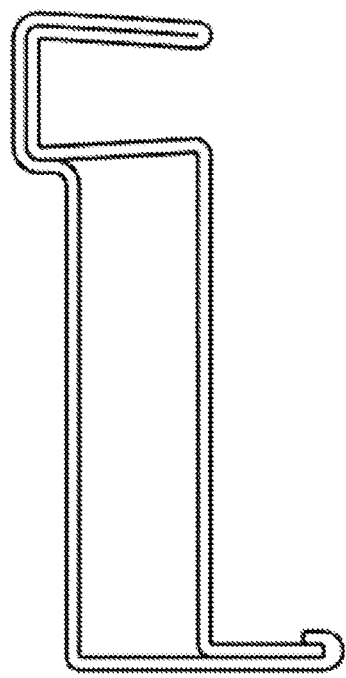
Figure 7M:
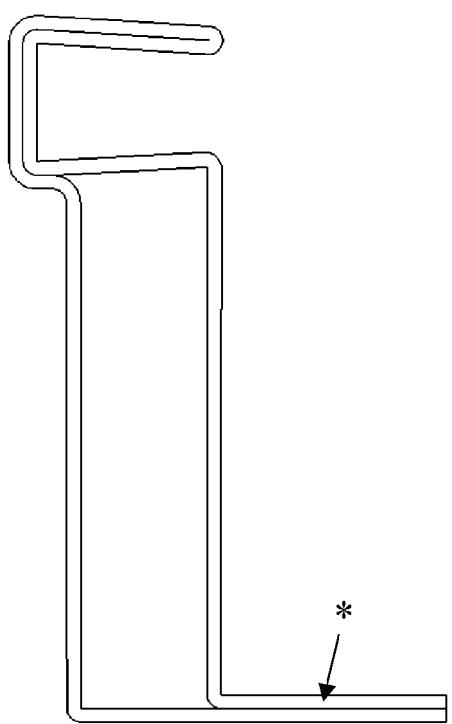
Figure 7N:
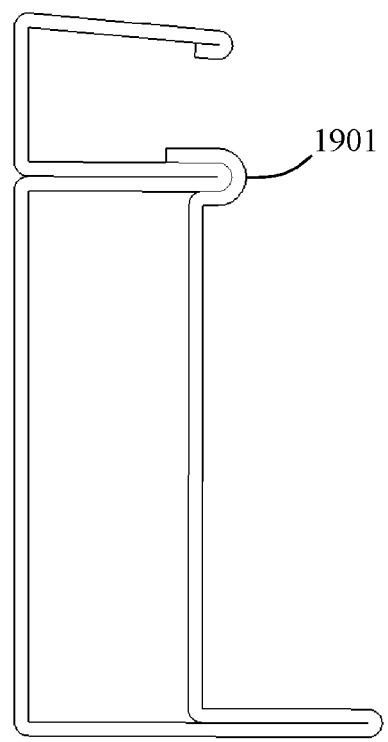
Figure 7O:
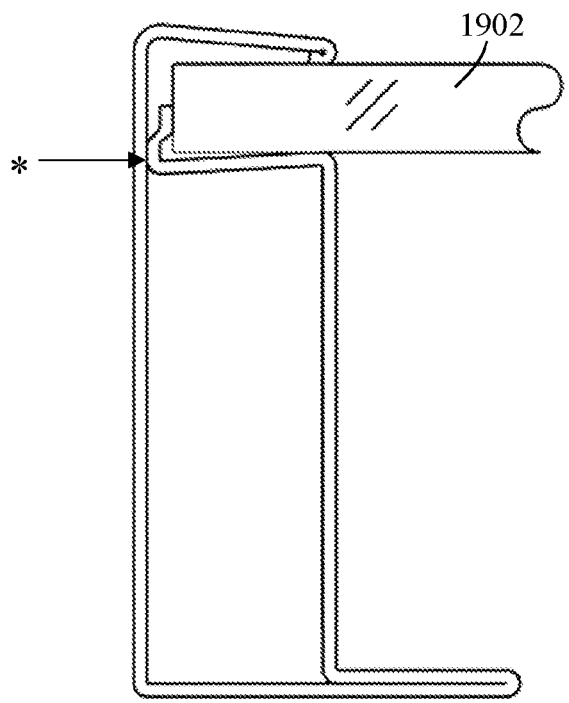
Figure 7P:
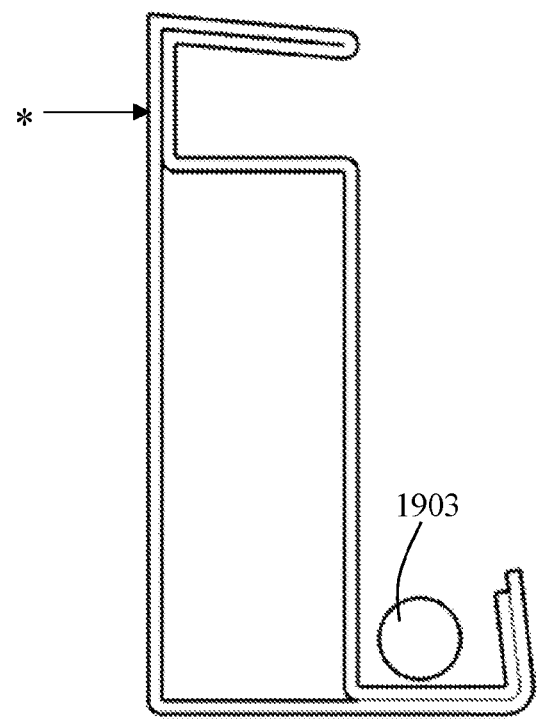
Figure 7Q:
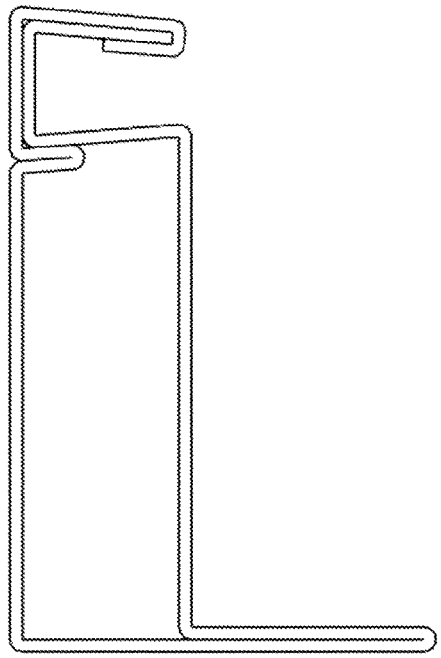
Figure 7R:
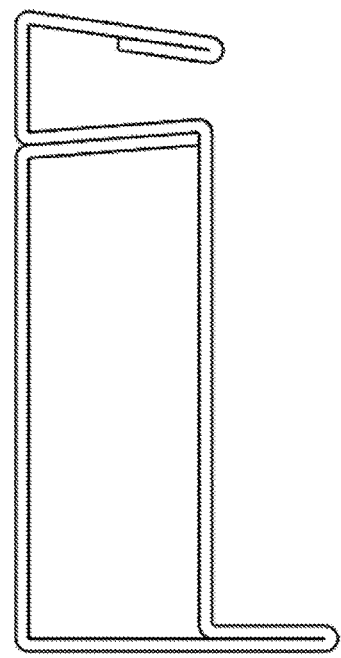
Figure 7S:
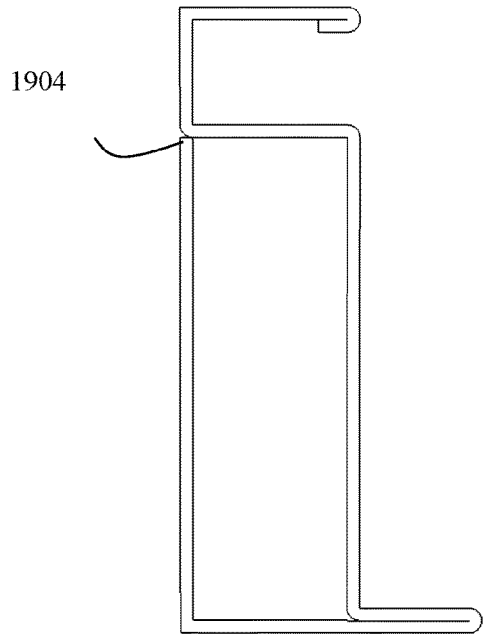

In some cases, the base of the frame section may generally correspond to a portion of the frame section that is below the lower shelf. In some embodiments the bottom flange may be provided at the base of the frame. In some embodiments, the base of the frame section and/or the bottom flange may correspond to or include the bottommost part of the frame section. In some cases, bottommost may correspond to the portion of the frame section furthest from the plane of the panel or anticipated panel plane. In some embodiments, the bottom flange may rest upon or be mounted to a support structure or racking (not shown here). A bottom flange may include a single layer of framework material (for example, FIGS. 7D, 7Z, 7AA) or alternatively, two or more layers of framework material (for example, FIGS. 6A, 6B, 7A-7C, 7E-7Y, 7BB-7OO) which may be referred to as bottom flange layers. FIG. 7J may show fingers and crimp 1900, FIG. 7N may show a continuous crimp 1901, FIG. 7P may show a panel 1902, FIG. 7P may show an electrical wiring 1903, and FIG. 7S may show a finger connection 1904. For example, referring to FIGS. 6A and 6B, bottom flange 604 may collectively include bottom flange layers 604' and 604". In some embodiments, multiple bottom flange layers may provide improved frame strength and resistance to deformation upon external forces.

Although the panel is not illustrated in FIGS. 6A-6B or 7A-7OO (with the exception of FIG. 7O), the bottom flange may in some embodiments generally lie in a plane that may be substantially parallel to the panel, i.e., within about 30°, or alternatively within about 20°, about 10°, or about 5° or the like. Although shown as generally flat, in some embodiments, the bottom flange may be curved or partially curved upwards or downwards. Alternatively, the bottom flange may have or include a "V" shape, inverted "V" shape, a corrugated shape, or one or more steps. Such shapes may, in some cases, be beneficial when mating the frame to racking having a complementary/receptive surface to such bottom flange shape.

In some embodiments, the bottom flange may extend only between the frame sidewall and the support wall (for example, FIGS. 7D, 7Z, 7AA), e.g., not beyond. A bottom flange or even a portion of a bottom flange may extend between the frame sidewall and the support wall and may optionally be referred as a box floor. In some embodiments, the bottom flange may extend past the support wall, e.g., inwardly toward the center of the panel (perhaps an inward extension). In some cases, the end of the inward extension of a bottom flange may include or be formed from a reverse fold (for example, 639 in FIG. 6A, or as in FIGS. 7A-7C, 7E-7L, 7N, 7O, 7Q-7Y, 7CC, 7FF-7LL, 7NN, 7OO). In some cases, the end of the inward extension of a bottom flange may include or be formed from the two ends of the framework material (for example, FIGS. 7M, 7P, 7BB, 7DD, 7EE, 7KK, 7MM). In some embodiments, the bottom flange may extend past the frame sidewall, e.g., outwardly away from the panel (perhaps referred to as an outward extension). In some cases, the end of the outward extension of a bottom flange may include or be formed from a reverse fold (for example, FIGS. 7U, 7W). In some cases, the end of the outward extension of a bottom flange may include or be formed from two ends of framework material (for example, FIG. 7V). In some embodiments an outward extension of the bottom flange may provide a useful interface with a clamp that may be used to attach the frame to a support structure such as racking (for example, FIGS. 7U, 7V, 7W).

Figure 7T:
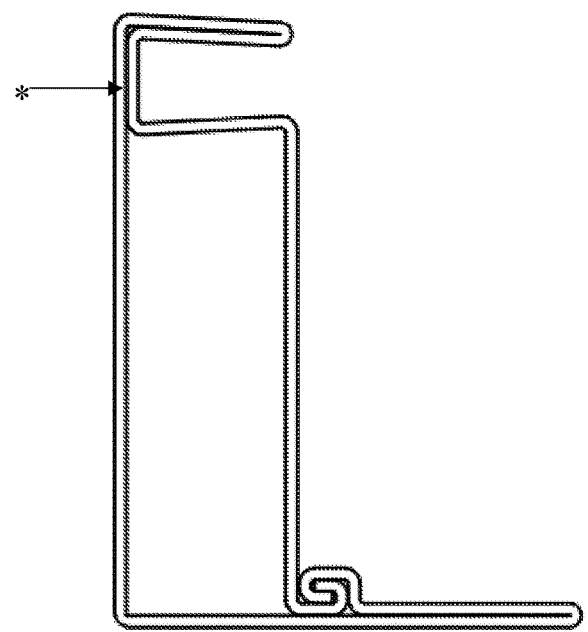
Figure 7U:
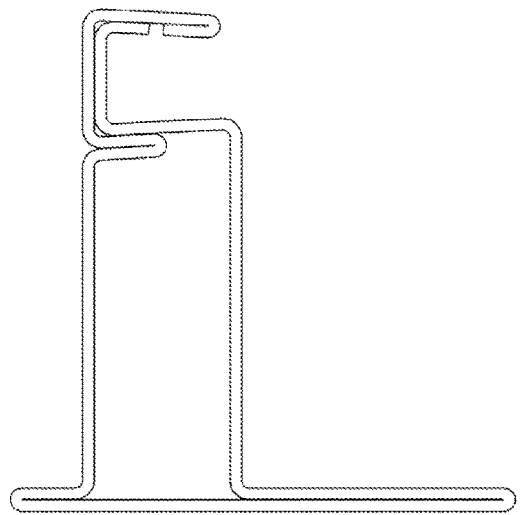
Figure 7V:
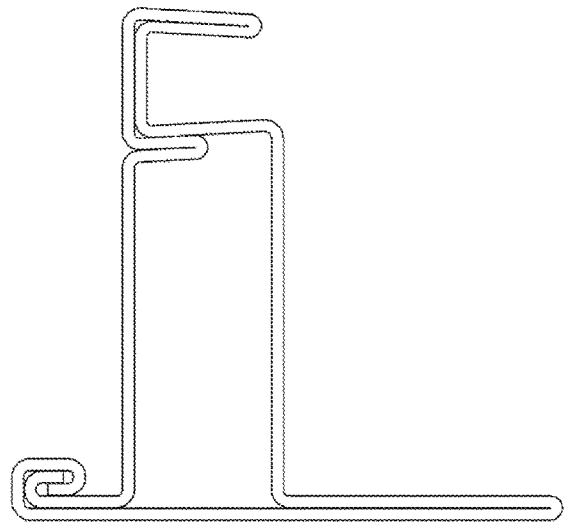
Figure 7W:
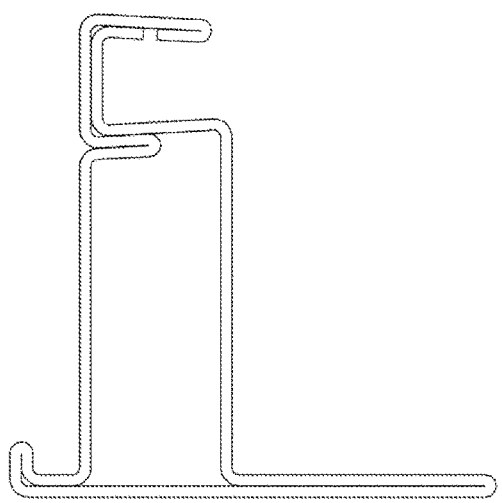
Figure 7X:
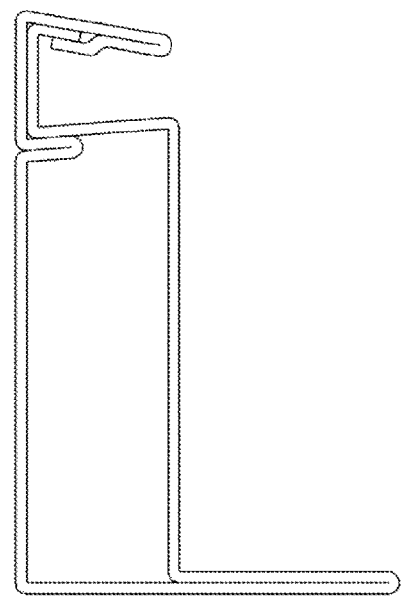

In some embodiments, the bottom flange may include framework layers that are partially wound or form a jelly roll feature such as a roll structure that may improve frame strength or resistance to external forces (for example, FIGS. 7T, 7V). In some cases, the roll structure may better distribute localized forces across the length of the bottom flange. In some cases, a roll structure may include two edges of framework material. In some embodiments, the bottom flange may include an end that is bent upwards or downwards (for example, FIGS. 7L, 7P, 7V, 7W, 7KK). In some embodiments, the bottom flange may include a feature that may act as a kind of stop to reduce or prevent slippage of the support wall (for example, FIGS. 7E, 7L, 7P, 7KK). As seen in the various non-limiting set of figures, any part the bottom flange may include any number of shapes that may serve various functions, e.g., for improving frame strength, managing electrical wiring, interfacing with racking, simplifying manufacturing, reducing need for attachment/connection features, or some other function.

Figure 8A:
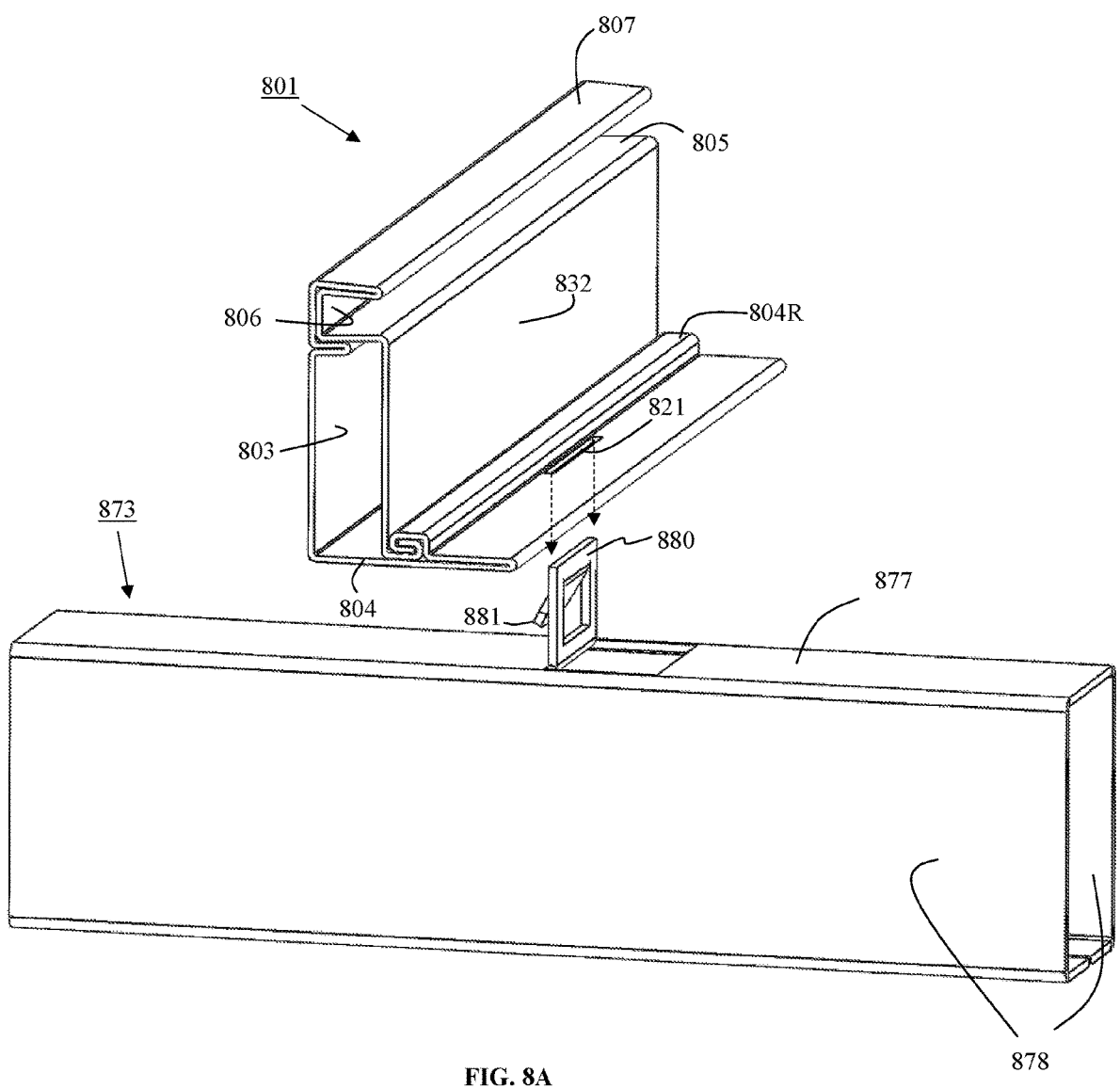
FIG. 8A is a perspective view of a non-limiting example of a frame section to be mounted to racking (support structure).
Figure 8B:
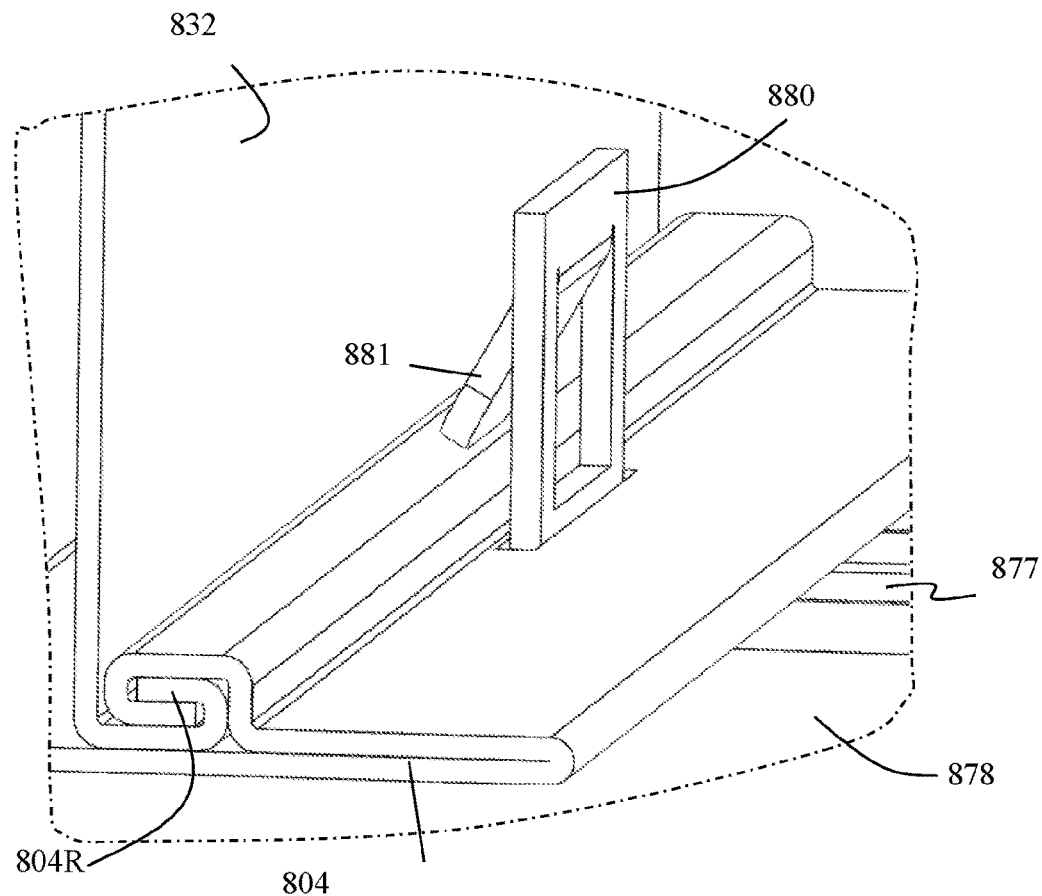
FIG. 8B is a cutaway perspective view of a mounted structure according to some embodiments.
Figure 8C:
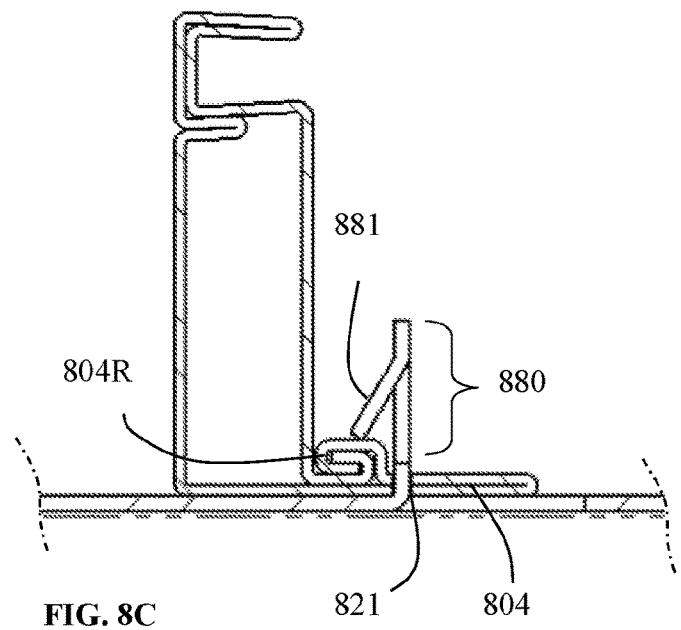
FIG. 8C is a cross-sectional view of a mounted structure according to some embodiments.

In some embodiments, the bottom flange may optionally include one or more openings or other features to aid in mounting to racking, managing electrical wiring, tool access, forming corner joints or the like. FIG. 8A is a perspective view of a non-limiting example of a frame section to be mounted to racking (a support structure). Frame section 801 may in some embodiments include bottom flange 804, frame sidewall 803, support wall 832, lower shelf 805, pocket wall 806, and top lip 807. The bottom flange 804 may include a hole 821, e.g., a slot. In some cases, the bottom flange may further include a roll structure 804R or other multilayer feature that may help strengthen the frame and/or aid in mounting, e.g., to racking. In some cases, the racking 873 may include an attachment feature 880 in the racking top surface 877. For example, the attachment feature may be a tab such as a spring tab which may include a bendable section 881 extending at an angle from the plane of the tab. The hole 821 in the bottom flange 804 may be aligned to the spring tab and then brought together (as shown by arrows). The bendable section of the spring tab flexes to straighten sufficiently to pass through the hole and may spring back to its previous or near previous position and engage the bottom flange to help lock the structures in place. In some cases, the bottom flange may optionally include a multilayer feature such as a roll structure or some other feature to assist in engaging the spring tab. Racking 873 may further include one or more racking sidewalls 878. FIG. 8B is a cutaway perspective view, and FIG. 8C is a cross-sectional view, of the mounted structure according to some embodiments. In some cases, a roll structure may better distribute potentially localized forces from the spring tab across the length of the bottom flange that reduce the chance of punch-through or deformations of the bottom flange by the spring tab. FIGS. 8A-8C illustrate a non-limiting example where the hole in the bottom flange is provided in an inward extension portion of the bottom flange. Alternatively, or in addition, the hole may in some cases be provided in an outward extension of the bottom flange. For example, referring to FIG. 7V, a hole may be provided in the bottom flange between the roll structure and the frame sidewall which may be engaged by a racking spring tab in a manner similar to that discussed with respect to FIGS. 8A-8C.

The above figures generally show a bottom flange formed from a lengthwise fold in the framework material that defines a frame sidewall and at least a portion of the bottom flange. In some cases, this may be advantaged over embodiments where, for example, an end of framework material corresponding to the bottom of a frame sidewall meeting the bottom flange. In some cases, such advantages may include simpler manufacturing, improved frame strength, or resistance to external forces. However, such lengthwise fold is not required to form an effective frame and embodiments that do not have this fold are included in the present disclosure. In some cases, embodiments not having such lengthwise fold may benefit from additional features to ensure that the frame sidewall does not slip relative to the bottom flange. For example, the bottom flange may include holes and the bottom of the frame sidewall (corresponding to an end of the framework material) may include teeth or similar features that mate with the holes. Other attachment or connection features may also be used.

Frame Sidewall

The frame sidewall may correspond to an outer portion of the frame section. As discussed, an outer portion may be relative to the support wall and does not necessarily mean outermost. Some non-limiting examples where the frame sidewall corresponds to an outer portion, but that is not outermost, may be seen in FIGS. 7L, 7M, 7DD, 7OO (where the pocket wall may be outermost), and FIGS. 7U, 7V, 7W (where the bottom flange may be outermost). A frame sidewall may be characterized by a height extending from the bottom flange, in some cases, up to about the panel containment structure such as the lower shelf. In some embodiments, the upper portion of the frame sidewall may include one or more folds that form the lower shelf or a portion thereof (e.g., FIGS. 6A, 6B, 6D, 7A-7F, 7I-7N, 7Q, 7R, 7U-7Z, 7BB, 7DD, 7II, 7NN, 7OO). In some embodiments, the framework material that forms the frame sidewall may extend upwardly beyond the lower shelf without a bend to form the pocket wall (e.g., FIGS. 7G, 7H, 7O, 7P, 7T, 7AA, 7CC, 7EE, 7FF-7HH, 7JJ-7MM). In some embodiments, the framework material that forms the frame sidewall may terminate at the intersection with the lower shelf, e.g., as in FIG. 7S. Although not visible in FIG. 7S, the end of frame sidewall may include one or more protrusions such as fingers that may extend through holes in the lower shelf to form one or more finger connections. Numerous alternative connection structures may be used besides the shown finger connection.

Although not illustrated, the frame sidewall or a portion thereof may optionally include multiple layers of framework material, e.g., to improve general frame strength or mounting strength to racking when using top clamps. Although not shown, the frame sidewall may optionally include one or more openings or other features to aid in mounting to racking, managing electrical wiring, tool access, forming corner joints, or the like.

Although shown as generally flat, in some embodiments, the frame sidewall may be curved or partially curved inward or outward. Alternatively, the frame sidewall may have additional bends or folds to produce a sideways "V" shape, a corrugated shape, or one or more steps, or the like.

Lower Shelf

The lower shelf may be part of the panel containment structure and may be generally located at an upper portion of, and extending at least inwardly from, the frame sidewall. The lower shelf may in some cases define the end or height of the frame sidewall. In some embodiments, the lower shelf may include only a single layer of framework material (for example, FIGS. 7G, 7H, 7O, 7P, 7S, 7T, 7CC, 7EE-7HH, 7JJ-7MM). In some embodiments, the lower shelf may include multiple layers of framework material, which may be referred to as lower shelf layers. For example, referring to FIGS. 6A and 6B, lower shelf 605 may include lower shelf layers 605', 605", and 605'". In some embodiments, a portion of the lower shelf may be formed from a bend or series of bends in the framework material at an upper portion of the frame sidewall. In some embodiments, a portion of the lower shelf may be formed from a bend or series of bends in the framework material at an upper portion of the support wall. In some embodiments, only a portion of the lower shelf may include multiple layers (for example, FIGS. 6A, 6B, 7A, 7I, 7L, 7M, 7Q, 7U-7Y, 7BB, 7DD, 7NN, 7OO). In some embodiments, substantially all of the lower shelf may include multiple layers (for example, FIGS. 7B-7F, 7J, 7K, 7N, 7R, 7Z, 7AA, 7II). In some cases, the panel of a framed panel structure may rest on at least a portion of the lower shelf. The top surface(s) of the lower shelf that are proximate the panel may optionally be referred to as the panel-side portion of the lower shelf.

In some embodiments, in addition to extending inwardly, a portion of the lower shelf may also extend outwardly from the frame sidewall (for example, FIGS. 7L, 7M, 7DD, 7OO).

In some embodiments, the end of the lower shelf opposite the frame sidewall end (the inward end of the lower shelf) may approximately align with or correspond to the top of the support wall (for example, FIGS. 6A, 6B, 7A-7C, 7F-7M, 7O-7Y, 7BB-7HH, 7JJ-7OO). In some embodiments, the end of the lower shelf opposite the frame sidewall end may extend inwardly such as toward the panel center beyond the top of the support wall (for example, FIGS. 7D, 7E, 7N, 7Z, 7AA, 7II).

Although shown as generally flat, in some embodiments, the lower shelf may be curved or partially curved upward or downward. Alternatively, the lower shelf may have additional bends or folds to produce a "V" shape, an inverted "V" shape, a corrugated shape, or one or more steps.

Support Wall

The support wall position may correspond to an inner portion of the frame section. As discussed, an inner portion may be relative to the frame sidewall and may not necessarily mean innermost. In some embodiments, the support wall may extend between the bottom flange and the frame sidewall as shown in FIG. 7AA. This is also shown later in FIGS. 14A-14C. In some cases, support wall may meet the frame sidewall in approximately the same location as where the lower shelf meets the frame sidewall. In some embodiments, the support wall may extend between the bottom flange and the lower shelf (for example, FIGS. 6A, 6B, 7A-7Z, 7BB-7OO). In some cases, the top of the support wall may meet or approximately align with the inward end of the lower shelf (for example, FIGS. 6A, 6B, 7A-7C, 7F-7M, 7O-7Y, 7BB-7HH, 7JJ-7OO). In some embodiments, the end of the top of the support wall may meet the lower shelf somewhere between the lower shelf end adjacent the frame sidewall and the inward end of the lower shelf (for example, FIGS. 7D, 7E, 7N, 7Z, 7II). As shown later with respect to FIGS. 14A and 14B, in some embodiments, a frame section may include a support wall where a portion extends to the frame sidewall and another portion extends to the lower shelf.

In some cases, a support wall may optionally include multiple layers of framework material (such as FIG. 7E, 7II), e.g., to improve frame strength. In some embodiments, a support wall may be formed at least in part from a lengthwise fold at the bottom flange (for example, FIGS. 6A, 6B, 7A-7D, 7F-7HH, 7JJ-7OO), a lengthwise fold at the lower shelf (for example, FIGS. 6A, 6B, 7A-7I, 7K-7OO), or both (for example, FIGS. 6A, 6B, 7A-7D, 7F-7I, 7K-7HH, 7JJ-7OO). In some embodiments, the top of the support wall may generally represent one end of the framework material (such as FIG. 7J), or alternatively, the bottom of the support wall may include one end of the framework material (not shown). In such cases, the end of the support wall may optionally include a structure that aids in attachment to the lower shelf perhaps when the framework end is at the top of the support wall or to the bottom flange perhaps when the framework end is at the bottom of the support wall. In some embodiments, the end of the support wall may include protrusions or fingers that may mate with holes provided in the lower shelf or support wall. For example, FIG. 7J illustrates an embodiment where the top of the support wall includes fingers that engage holes in the lower shelf. To further secure the structure, this interface may optionally be crimped. There are numerous other attachment/connection structures that may be used instead of fingers and holes and all are included in this application.

In some embodiments, the angle between the support wall and the bottom flange may be approximately 90°, e.g., in a range of about 85° to about 95° (for example, FIGS. 6A, 6B, 7A-7C, 7E-7Y). In some other embodiments, the angle may be outside that range, e.g., in a range of about 45° to about 135° (for example, FIGS. 7D, 7Z, 7AA). In some embodiments, the angle is approximately orthogonal or acute, e.g., in a range of about 45° to about 90°. Any angle may be used.

Although not shown, the support wall may optionally include one or more openings or other features to aid in mounting to racking, managing electrical wiring, tool access, forming corner joints, or the like.

Although shown as generally flat, in some embodiments, the support wall may be curved or partially curved inward or outward. Alternatively, the lower shelf may have additional bends or folds to produce a sideways "V" shape, a corrugated shape, or one or more steps.

Enclosed Shape

Figure 14A:
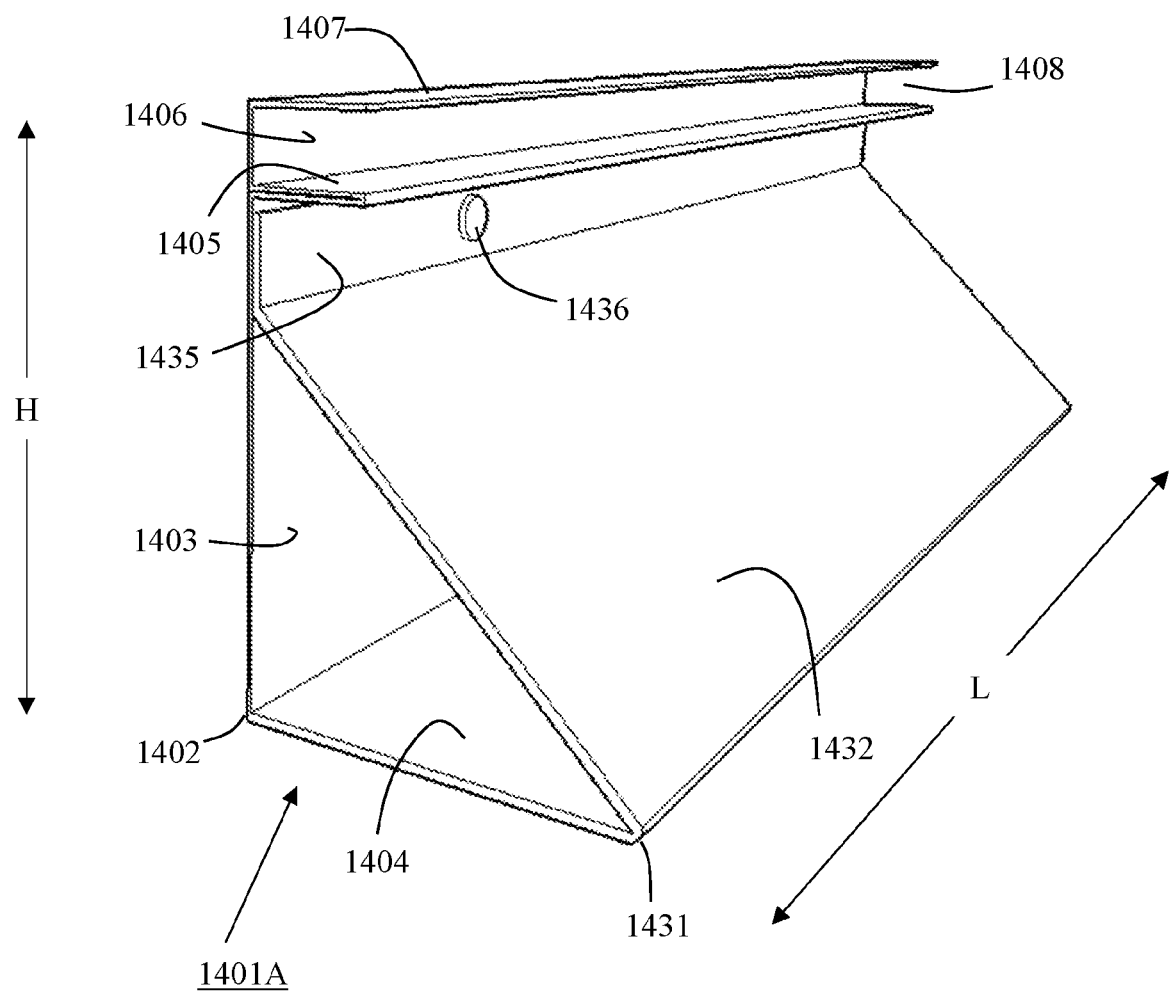
FIG. 14A is a perspective view of a cutaway portion of a non-limiting example of a frame section or frame precursor structure that may include a frame support substructure according to some embodiments.
Figure 14B:
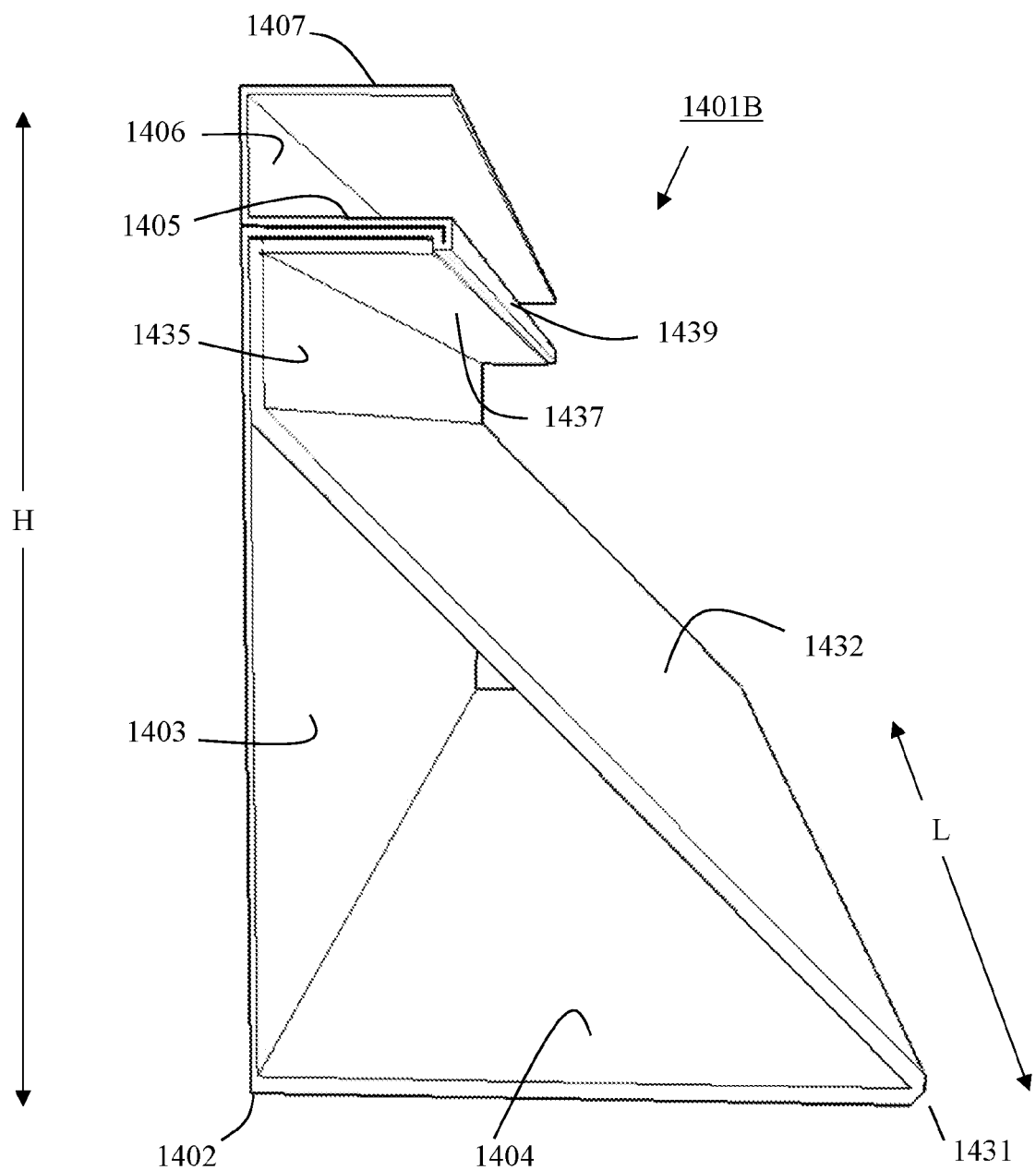
FIG. 14B is a perspective view of a cutaway portion of a non-limiting example of a frame section or frame precursor structure that may include a frame support substructure according to some embodiments.
Figure 14C:
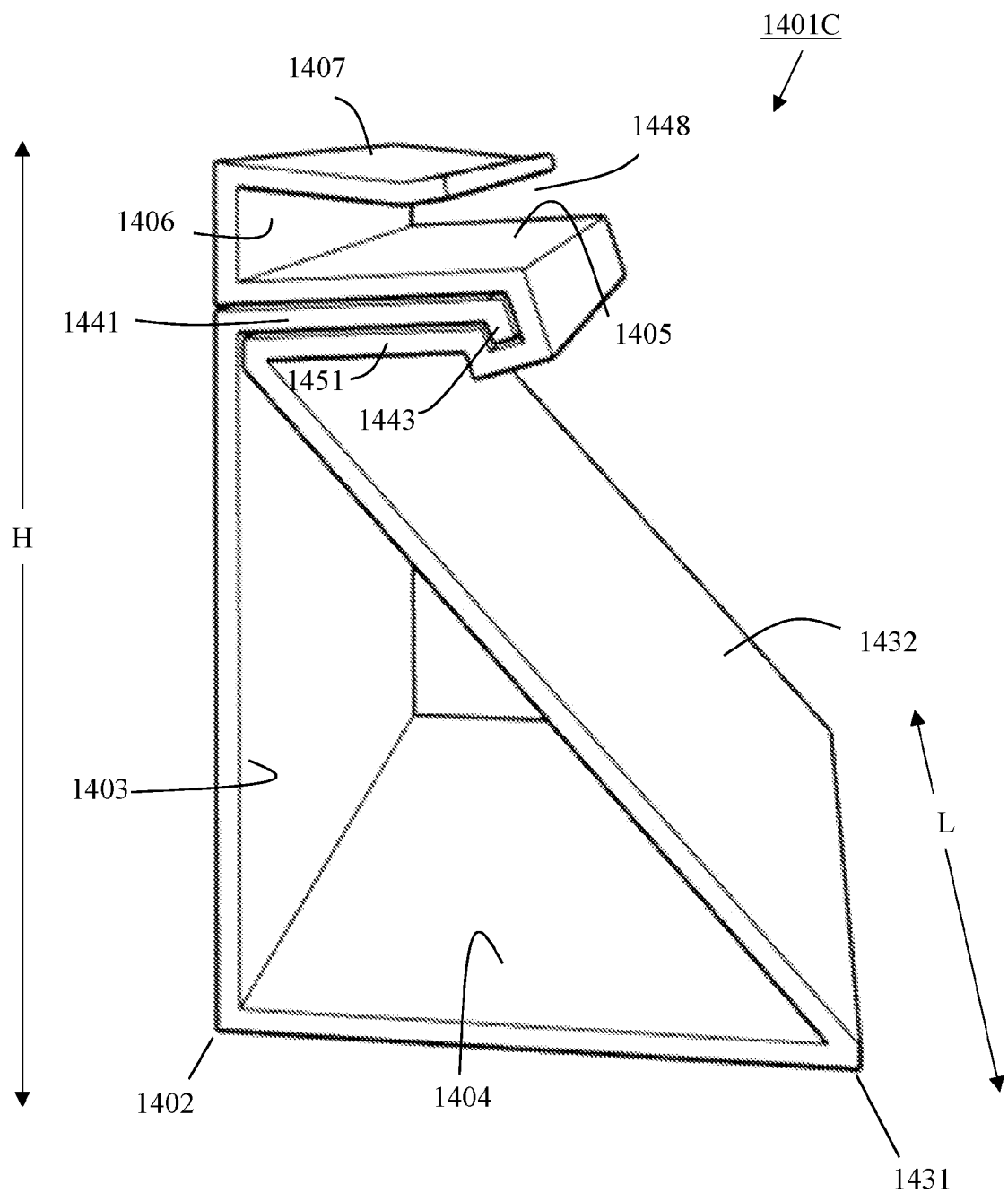
FIG. 14C is a perspective view of a cutaway portion of a non-limiting example of a frame section or frame precursor structure that may include a frame support substructure according to some embodiments.

As mentioned, a box frame may apply to any frame section that in cross section forms any enclosed shape. In some embodiments, the enclosed shape may involve at least the bottom flange, the frame sidewall, and the support wall, and have three or more apparent sides in cross section. A non-limiting example of a box frame having three apparent sides in cross section are shown in FIGS. 7AA. FIGS. 14A-14C provide non-limiting examples of box frames having three apparent sides. In some embodiments, the box frame may have four or more apparent sides in cross section involving the bottom flange, frame sidewall, lower shelf and support wall (FIGS. 6A, 6B, 7A-7Z, 7BB-7OO).

Figure 6E:
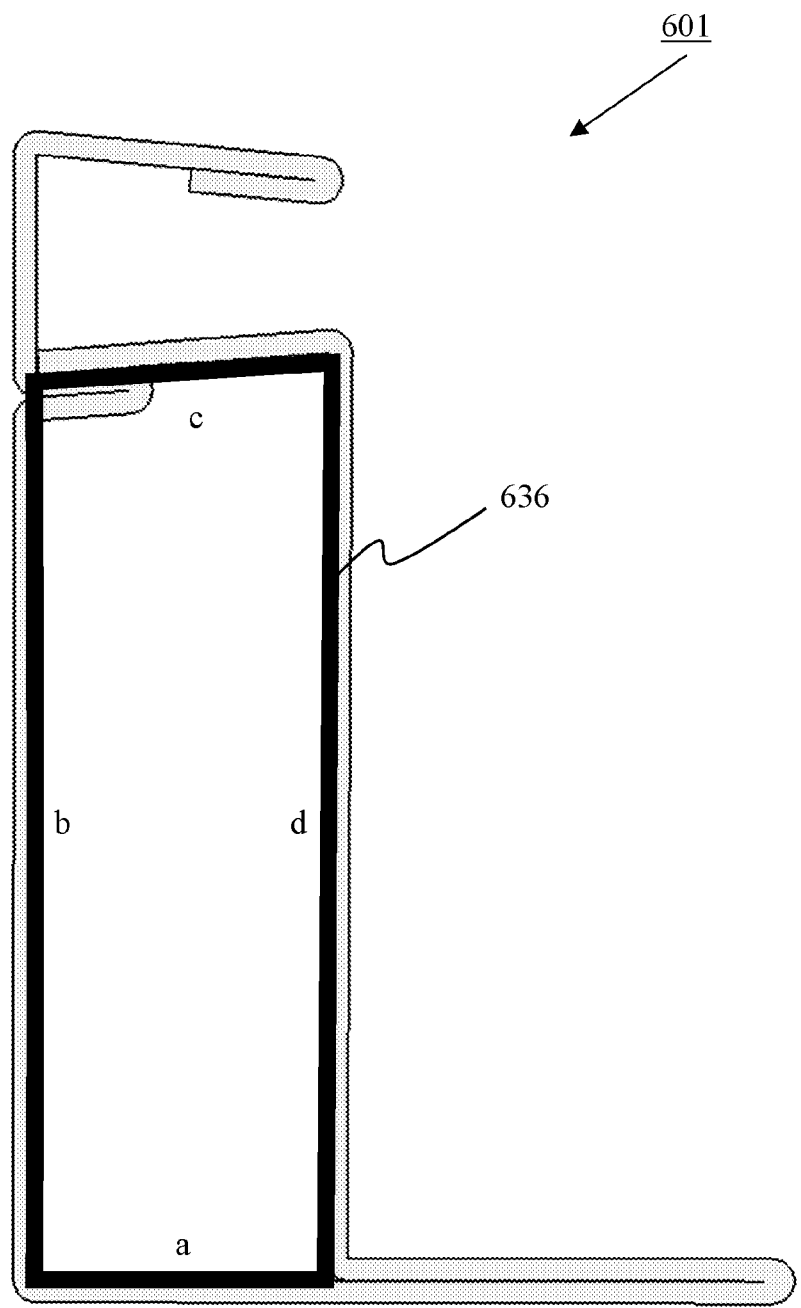
FIG. 6E is like FIG. 6B but with the approximate enclosed shape of the box frame marked according to some embodiments.

It should be noted that the presence of multilayer features may in some cases be ignored when characterizing general properties of the box or enclosed shape. For example, FIG. 6E is similar to FIG. 6B, but with the approximate enclosed shape 636 marked out based on the general positions of the features without accounting for multilayer structure of the lower shelf. For clarity, the other features are not marked but they are self-evident with reference back to FIG. 6B. Side "a" of enclosed shape 636 may represent the box enclosure floor approximately corresponding to the bottom flange portion extending between the frame sidewall and the support wall. Side "b" of enclosed shape 636 may represent the box enclosure outer wall approximately corresponding to the frame sidewall extending between the bottom flange and the lower shelf. Side "c" of enclosed shape 636 may represent the box enclosure roof approximately corresponding to the lower shelf extending between the frame sidewall and the support wall. Side "d" of enclosed shape 636 may represent the box enclosure inner wall approximately corresponding to the support wall extending between the bottom flange and the lower shelf.

Each side of the enclosed shape may be characterized by an approximate length. Each intersection of two sides of the enclosed shape may be characterized by an angle. By way of a non-limiting example and referring again to FIG. 6E, angles Zab and Zad may be characterized as approximately orthogonal or about 90°. Side "d" may be characterized as about parallel to side "b", but having a greater length. Angle Zbc may be characterized as obtuse (greater than) 90° and angle Lcd may be characterized as acute (less than 90°). A similar analysis can be done for any of FIGS. 7A-7Z. A four-sided enclosed shape may in some cases itself be further characterized, e.g., as a square, a rectangle, a parallelogram, a trapezoid, an isosceles trapezoid, a trapezium, a rhombus, or some other type of four-sided shape.

Although no examples are illustrated, where substantial additional bends are provided in any of the features making up the enclosed shape, such enclosed shape may sometimes be characterized as having more than four sides.

Note that in the case of a three-sided enclosure such as FIG. 7AA, there may be no corresponding side "c" (relative to FIG. 6E) and corresponding side "d" of the enclosed shape may instead represent the box enclosure inner wall approximately corresponding to the support wall extending between the bottom flange and the frame sidewall.

Pocket Wall

The pocket wall may be considered part of the panel containment structure. In embodiments, the pocket wall extends from the lower shelf and may act as a stop to reduce or prevent lateral slippage or movement of the panel in the framed panel structure. In some cases, the pocket wall may approximately align with the frame sidewall (for example, FIGS. 6A, 6B, 7A-7K, 7N-7CC, 7EE-7NN). In some embodiments, relative to the frame sidewall, the pocket wall may be offset inwardly or outwardly (for example, FIGS. 7L, 7M, 7DD, 7OO). In some embodiments, and as illustrated in the present figures, the pocket wall may generally be parallel to the frame sidewall. In some embodiments, the pocket wall may be provided at an angle relative to the frame sidewall. In some embodiments the pocket wall may be provided at an out-of-plane angle relative to the frame sidewall that is less than about 45°, alternatively less than about 30°, alternatively less than about 20°, alternatively less than about 10°.

In some cases, the pocket wall may include multiple layers of framework material (for example, FIGS. 7A, 7G, 7H, 7L, 7M, 7P, 7Q, 7T 7Y, 7AA-7HH, 7JJ-7OO). In some cases, such multiple layers may improve the general strength of the frame or mounting strength to racking when using top clamps. In some embodiments, the pocket wall may include a separator element that protrudes into the pocket region to partially separate the panel from sitting flush against the pocket wall (such as FIG. 7O). In some cases, the separator element may have a spring-type of structure. In some cases, a spring type of separator element may relax some manufacturing alignment tolerances when building the framed panel structure. Alternatively, a separator element may extend upwards from the lower shelf. In some cases, a separator element may allow optional sealant material to cover the much of the panel edge to help protect it from environmental factors and/or provide improved the overall strength of the bonding of the panel within the pocket region as discussed below with respect to the panel containment structure and use of optional adhesives.

Although not shown, the pocket wall may optionally include one or more openings or other features to aid in mounting to racking, managing electrical wiring, tool access, forming corner joints, or the like.

Although shown as generally flat, in some embodiments, the pocket wall may be curved or partially curved inward or outward. Alternatively, the lower shelf may have additional bends or folds to produce a sideways "V" shape, a corrugated shape, or one or more steps.

Top Lip

In some embodiments, a top lip may intersect an upper portion of the pocket wall. In some cases, a top lip may be formed at least in part from at least one lengthwise fold at the upper portion of the pocket wall. Although not illustrated, the top lip may optionally include a single layer of framework material. In some embodiments, including but not limited to those formed of a single layer of framework material, the inward end of a top lip may include an upward bend to reduce the risk that the panel is damaged by a sharp edge of framework material.

In some embodiments, the top lip, or at least a portion thereof, may be formed of multiple layers of framework material. In some embodiments, the top lip may include a rounded top lip edge as discussed with respect to FIGS. 6A and 6B. A rounded top lip edge may be formed by a fold at the inward end of the top lip. There may be various benefits to such a design, e.g., it may be more aesthetically pleasing, it may keep the frame edge in the pocket which may help with edge oxidation since it may be covered with adhesive, it may cause less accidental damage to the panel by eliminating sharp corners, and it may create a natural pocket for optional adhesives. In some cases, a rounded top lip edge may fully extend from the inward end of the top lip back to the pocket wall (for example, FIGS. 7L, 7M, 7P, 7T, 7V, 7BB, 7DD-7HH, 7JJ, 7KK, 7MM). In some embodiments, a rounded top lip edge may extend only part way back to the pocket wall where it terminates at one end of framework material, thereby forming an apparent step within the pocket region (for example, FIGS. 6A, 6B, 7A-7K, 7N, 7O, 7Q-7S, 7U, 7W-7AA, 7CC, 7LL, 7NN, 7OO). In some cases, such a step may improve bonding of the panel within the pocket region as discussed below with respect to the panel containment structure and the use of optional adhesives. In some embodiments, a top lip layer formed from rounded top lip edge may not necessarily extend parallel with another top lip layer (such as in FIG. 7Y). In some embodiments, the end of the top lip may be bent upwards as in FIG. 7II, which may also have a similar set of benefits as a rounded top lip edge, as described above.

In some embodiments, the top lip may include two top lip layers where one of the top lip layers is formed from a fold at the pocket wall and which extends only part way towards the inward end of the top lip and terminates at one end of the framework material (for example, FIGS. 7A, 7Q, 7U, 7W, 7X, 7Y, 7FF, 7LL, 7NN, 7OO). In some cases, this may form a step within the pocket region (for example, FIGS. 7A, 7U, 7W, 7Y, 7LL, 7NN, 7OO). In some other embodiments, the end of such top lip layer may be received into a lip pocket created by a rounded top lip edge (for example, FIGS. 7Q, 7X, 7LL, 7NN, 7OO).

Although shown as generally flat, in some embodiments, the top lip may be curved or partially curved upward or downward. Alternatively, the lower shelf may have additional bends or folds to produce a "V" shape, an inverted "V" shape, a corrugated shape, or one or more steps.

Panel Containment Structure Pocket Region

Figure 6F:
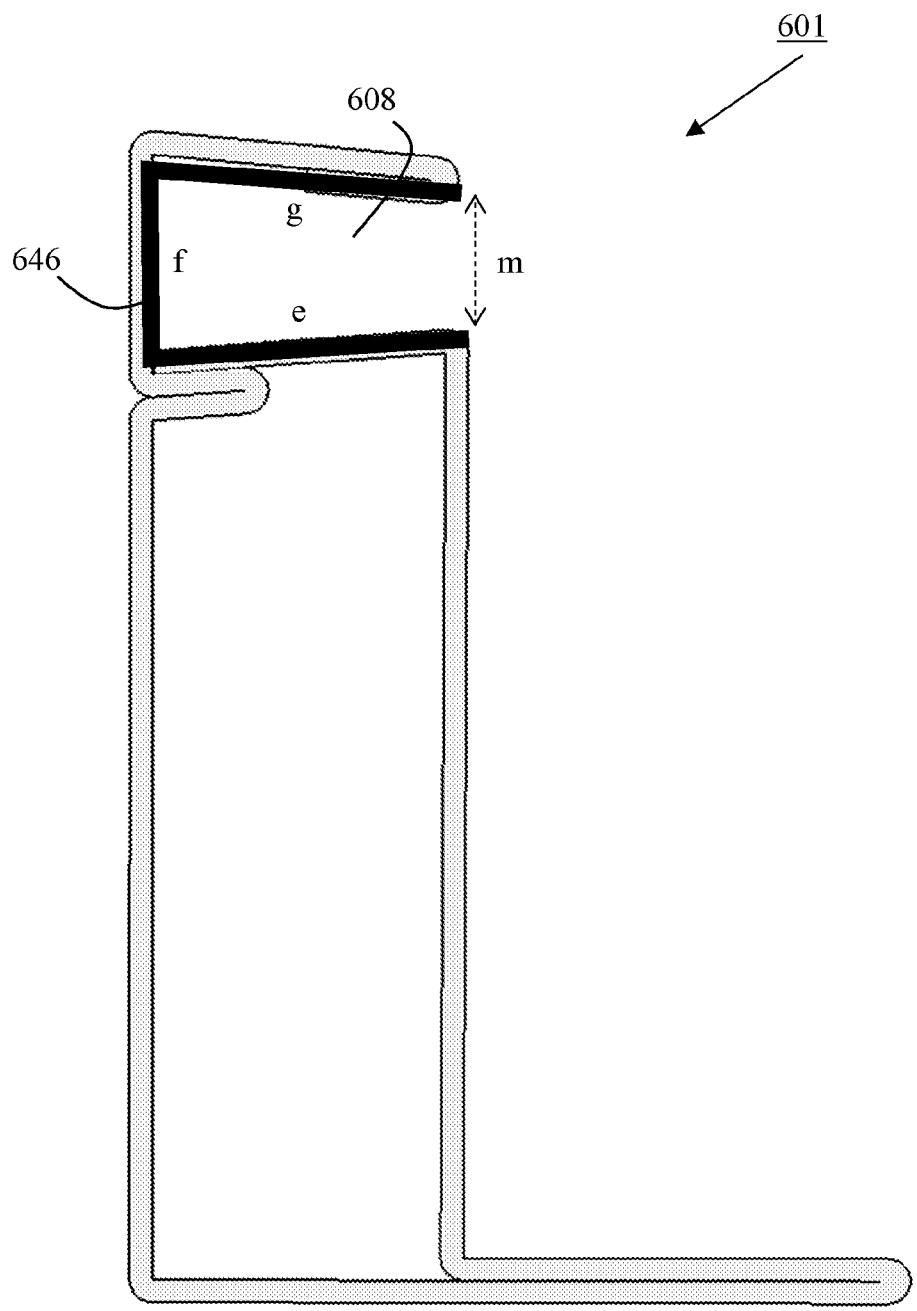
FIG. 6F is like FIG. 6B but with the approximate panel containment shape marked according to some embodiments.

In some embodiments, in cross-section, a panel containment structure may include three apparent sides in cross section involving the lower shelf, pocket wall, and top lip, the three sides thereby forming a panel containment shape. It should be noted that the presence of multilayer features may in some cases be ignored when characterizing general properties of the panel containment shape. For example, FIG. 6F is similar to FIG. 6B, but with the approximate panel containment shape 646 marked out based on the general positions of the panel containment structure features without accounting for the multilayer structure of the lower shelf and top lip. Side "e" of the panel containment shape 646 may represent the panel containment floor approximately corresponding to the lower shelf extending between the pocket wall and the inward end of the lower shelf. Side "f" of the panel containment shape 646 may represent the panel containment outer wall approximately corresponding to the pocket wall extending between the lower shelf and the top lip. Side "g" of the panel containment shape 646 may represent the panel containment roof approximately corresponding to the top lip. In some cases, the panel containment shape may approximately correspond to the feature surfaces (e.g., surfaces of the lower shelf, pocket wall and top lip) adjacent the pocket region 608. Such surfaces may be a panel side portions of the various features (e.g., lower shelf, pocket wall, top lip). The panel containment shape may be further characterized by a pocket opening or even a mouth", (e.g., virtual side "m") extending between the inward end of the lower shelf and the inward end of the top lip. A size of a pocket opening may in some cases be characterized by the distance along the frame height axis at the inward-most point where the lower shelf and top lip overlap (along the frame height axis). When virtual side "m" is approximately vertical (aligned with the frame height axis), it may approximately correspond to a pocket opening size. If the top lip extends inwardly more or less than the lower shelf, virtual side "m" may be longer than the pocket opening size.

Each side of the panel containment shape may be characterized by an approximate length. Each intersection of two sides of the panel containment shape may be characterized by an angle. By way of a non-limiting example and referring again to FIG. 6F, angles ∠ef and ∠fg may be characterized as acute (less than 90°). However, in some cases, either angle may instead be about orthogonal (about 90°) or even obtuse (greater than 90°). In some embodiments, angle ∠ef (e.g., between the lower shelf and the pocket wall) or angle ∠fg (e.g., between the top lid and the pocket wall) may be independently selected to be in a range of about 50° to about 60°, about 60° to about 70°, about 70° to about 80°, about 80° to about 85°, about 85° to about 90°, about 90° to about 95°, about 95° to about 100°, about 100° to about 110°, about 110° to about 120°, or any combinations of ranges thereof or any range. In some cases, the sum of angles ∠ef and ∠fg may be 180° or less, e.g., in a range of about 100° to about 120°, about 120° to about 130°, about 130° to about 140°, about 140° to about 150°, about 150° to about 160°, about 160° to about 170°, about 170° to about 175°, about 175° to about 180°, or any combination of ranges thereof, or any range. In some embodiments, side "f" may be characterized as about parallel to side "m", but longer than side "m". That is, in FIG. 6F, the pocket opening in some cases may be smaller than the pocket wall height (e.g., the interior height of the panel containment structure adjacent the pocket wall as measured along the frame height axis). In some cases, side "f" may be selected so that it is substantially parallel to a panel edge which enters the pocket. In some cases, side "f" may be selected so that it is not parallel to the panel edge, e.g., so that the panel cannot sit flush against the pocket wall which may improve the ability of sealant to coat the panel edge. Angles ∠em and ∠mg may be characterized in FIG. 6F as obtuse (greater than 90°). However, in some cases, either angle may instead be about orthogonal (about 90°) or even acute (less than 90°). A similar analysis can be done for any of FIGS. 7A-7Z. Including opening side "m", a four-sided panel containment shape may in some cases itself be further characterized, e.g., as a square, a rectangle, a parallelogram, a trapezoid, an isosceles trapezoid, a trapezium, a rhombus, or some other type of quadrilateral shape that may be fully symmetrical, partially symmetrical, or asymmetrical. In some embodiments, the panel containment shape may include more than four sides. In some embodiments, a lower shelf, a pocket wall, a top lip, or any combination thereof, may have a substantially non-flat surface and may include one or more bends, corrugations, or curvatures without changing the general function of the panel containment structure.

In some embodiments, a panel containment structure may include an inner pocket wall layer (proximate the panel) and outer pocket wall layer which form part of a trapezoidal panel containment shape. In some cases, e.g., as shown in FIGS. 7A, 7U, 7W, and 7Y, the inner pocket wall layer is contiguous (perhaps via a fold) with an inner top lip layer that extends partway along the top lip feature. Such a trapezoidal shape may prevent or reduce the inner pocket wall from separating from the outer pocket wall during loading. If the top lip layers are bent together as part of forming the panel containment structure, the outer pocket wall may compress the inner pocket which may further hold the inner pocket wall to the outer pocket wall. In some cases, and referring again to FIG. 6F, such compression may occur when ∠fg is acute. In addition, or alternatively, in some cases an acute angle ∠ef between the pocket wall and lower shelf may similarly help hold the inner pocket wall layer against the outer pocket wall layer. It should be noted that an attachment feature, e.g., as shown in FIGS. 7G, 7H, and 7T, may optionally be applied instead of, or in addition to, forming a trapezoidal panel containment shape when the pocket wall includes an inner pocket wall layer and an outer pocket wall layer.

In some embodiments, the frame or frame section include one or more features that help support the panel containment structure, e.g., that assist in reducing or preventing sagging or slippage of the lower shelf or pocket wall when under pressure. In some cases, such panel containment support feature may be considered part of the lower shelf and include a fold structure at an upper part of the frame sidewall and/or at an upper portion of the support wall whereon one or more other lower shelf layers rest. In some embodiments, a panel containment support feature may extend from the frame sidewall at an angle that may be approximately parallel to any other lower shelf layers not forming part of the panel containment support feature. A majority of the figures shown herein have one or the other. In some cases, the panel containment support feature may include finger connections as discussed herein. In some cases, a panel containment support feature may include an attachment feature as discussed. For example, frames shown in FIGS. 7G, 7H, 7P, 7T, 7AA, 7CC, 7EE, 7GG, 7HH, and 7JJ-7MM may include an attachment feature between inner and outer pocket wall layers. In some cases, the sealant applied within the pocket region that may also act as a panel containment support feature by bonding to the pocket wall, top lip, and/or the lower shelf (e.g., as shown in FIG. 7O).

Sealant and Panel Containment Structure

In some embodiments, a sealant may optionally be applied inside the panel containment structure or to an edge area of the panel or both perhaps so that when the framed panel structure is assembled the sealant may spread within at least portion of the panel containment structure or pocket region. The sealant may serve one or a variety of functions. In some cases, the sealant acts as a coating that protects the surface and edge areas of the panel to reduce the chance of degradation through environmental factors such as ingress of water or contaminants. Often panels are multilayer structures that may have interfaces that may be vulnerable to exposure at the panel edge.

In some cases, the sealant may be formed of a material that is more compressible than the framework material. For example, the sealant may include a polymeric material. This may reduce the transference of external physical forces acting on the frame to the panel.

A sealant may be an adhesive sealant that bonds both to the panel and to the framework material of the panel containment structure. This may add additional strength to the frame and resistance against external forces. Use of a sealant may allow more design freedom of the frame or increase manufacturing tolerances for frame assembly by not relying solely on the frame architecture to provide desired performance.

Figure 9A:
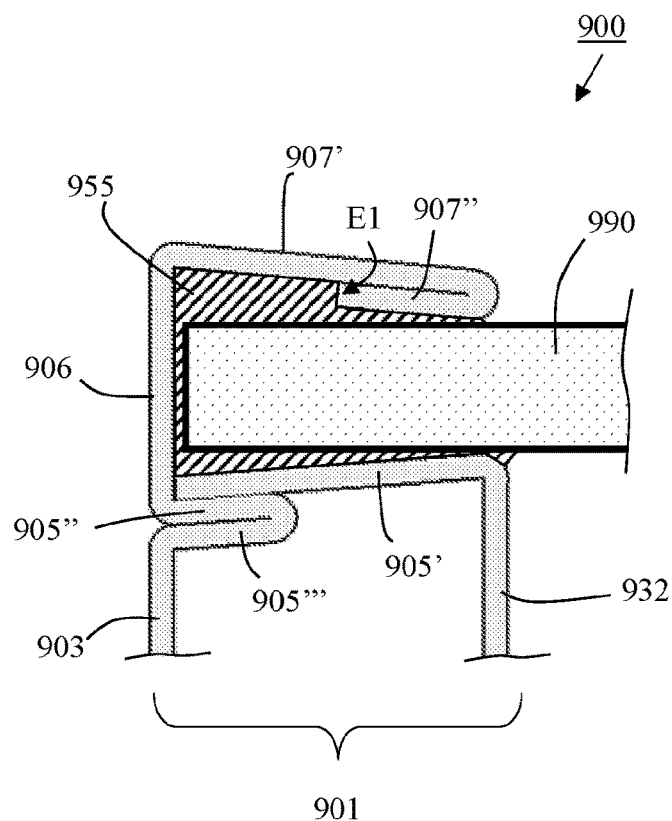
FIG. 9A is a cross-sectional view of a non-limiting example of a framed panel structure zoomed in to show a panel containment structure portion of a frame section according to some embodiments.

FIG. 9A is a cross-sectional view of a non-limiting example of a framed panel structure zoomed in to show a panel containment structure portion of a frame section according to some embodiments. Framed panel structure 900 may include panel 990 provided in the pocket region of the panel containment structure of frame section 901. The panel containment structure may include a lower shelf, e.g., one including lower shelf layers 905', 905", 905''', a pocket wall 906, and a top lip, e.g., one including top lip layer 907' and top lip layer 907" that form a rounded top lip edge. An edge E1 of framework material is also shown which may correspond to the end of top lip layer 907". Also visible in FIG. 9A are the upper portions of the frame sidewall 903 and support wall 932.

At least a portion of the pocket region may include sealant 955, which may have adhesive properties. In some embodiments, most or all of the pocket region includes sealant 955.

In some cases, it may be desirable that at least some sealant 955 be provided between the edge of panel 990 and pocket wall 906. In some cases, it may be desirable to keep the sealant from extending substantially beyond the inward end of the top lip so that the sealant does not interfere with the function of the panel, e.g., if the panel is a solar panel. In some cases, during assembly, if there is excess sealant, it may be desirable to allow or direct it to overflow onto the underside of the panel or support wall. Pushing the panel up towards the top of the pocket during assembly may also help reduce or prevent the sealant flowing out on top of the panel. It may be advantageous not to have the sealant flow on the top of the panel for aesthetics and the possibility of the sealant covering the PV active area which may reduce the efficiency of the PV panel. In some embodiments, the lower shelf may include one or more holes to allow excess sealant to escape into the enclosed space of the frame to reduce or prevent sealant flowing out onto the solar panel top.

As can be seen from FIG. 9A, the general cross-sectional shape of the panel containment portion is approximately a trapezoid with the opening or mouth inward side being smaller than the side corresponding to pocket wall 906. When external forces act on the framed panel structure (wind, snow weight, handling, or the like) such forces may at times try to pull the panel away from or out of the panel containment structure. However, the trapezoidal shape of the sealant may create an extra resistance to such pulling due to the advantageous geometric shape. In addition, the step formed by the edge E1 of framework material at the end of top lip layer 907" may create another point of resistance to forces trying to pull the panel away from the panel containment structure. That is, the edge E1 may act as a sharp wall to make it difficult for the portion of sealant behind the edge (e.g., towards the pocket wall) to be pulled past. Such edges may also be effective at resisting panel pullout even where the panel containment shape is not trapezoidal. In some embodiments, the lower shelf may include a framework edge (e.g., FIGS. 7K and 7N) that may form a step which may also act as a sharp wall that resists panel pullout.

Figure 9B:
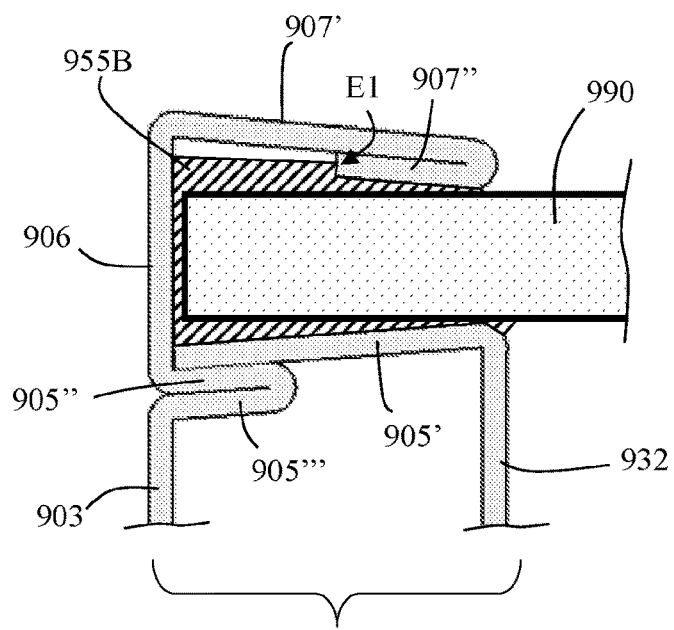
FIG. 9B is like FIG. 9A but where sealant does not entirely fill the pocket region according to some embodiments.

In some embodiments, the sealant does not necessarily fill all the available space in the pocket region. FIG. 9B is similar to FIG. 9A except that the sealant 955B does not entirely fill the pocket region leaving a partial space in the gap behind the edge E1. In some embodiments, the gap behind the edge E1 may act as an area for sealant overflow. Although not shown, the top lip layer 907' may include one or more holes over the region between the edge E1 and the pocket wall that may be filled with sealant which may provide improved bonding of the panel within the panel containment structure or even allow for additional sealant overflow path. If the sealant is transparent to visible light, such holes may in some cases further allow additional light to reach the solar panel and improve its efficiency.

Figure 9C:
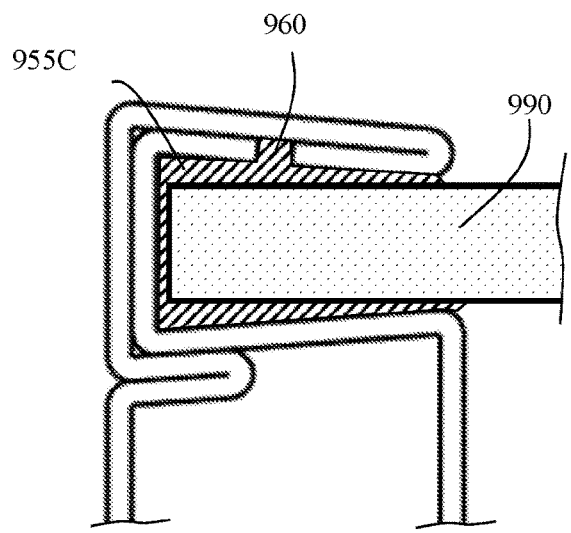
FIGS. 9C-9E are cross-sectional views of non-limiting examples of framed panel structures to further illustrate the use of sealant within the panel containment structure according to some embodiments.
Figure 9D:
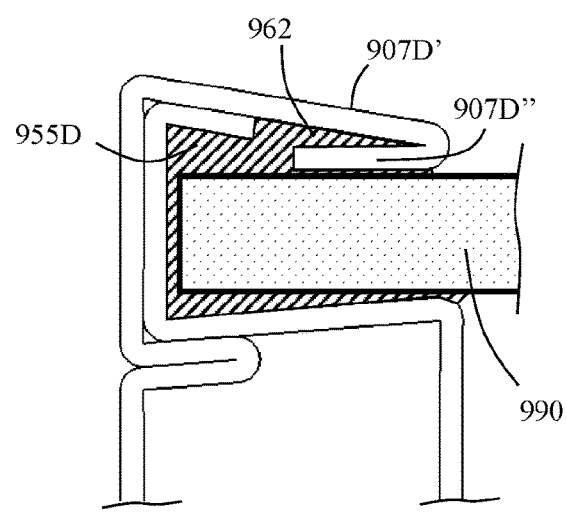
Figure 9E:
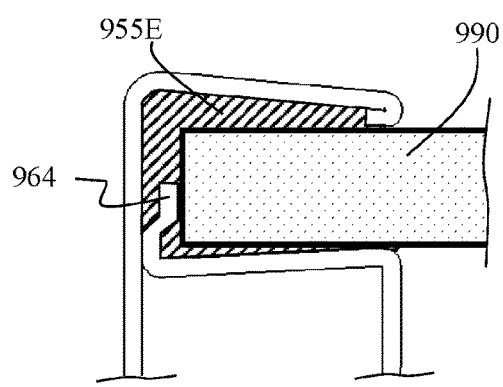

FIGS. 9C-9E are cross-sectional views of a few more non-limiting examples of framed panel structures to further illustrate the use of sealant within the panel containment structure according to some embodiments. These figures are similar to FIG. 9A except using different frame section architectures. Although the frame features are not all labelled, their identities are self-evident from the rest of this disclosure. Each example may have one or more of the same properties or benefits as described above even though not always mentioned.

In FIG. 9C, the frame section may be similar to that shown in FIG. 7A. The gap 962 between the two edges of framework material may form a space for sealant 955C overflow and (if filled) the frame edge may further act as a resistant step or feature against panel 990 pullout.

Figure 7Y:
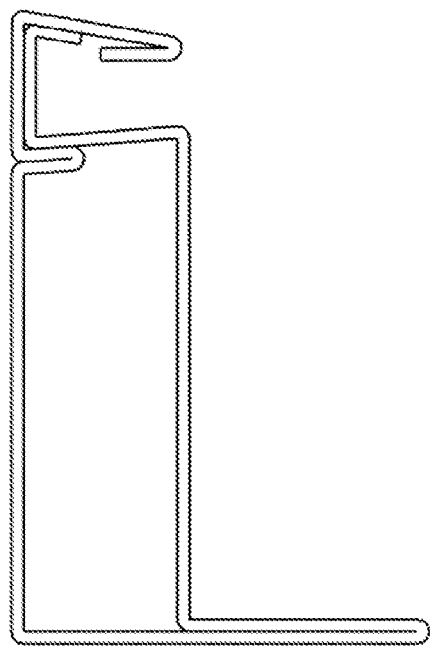
Figure 7Z:
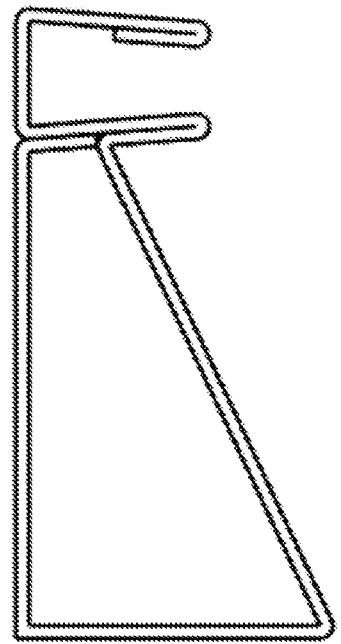
Figure 7A:
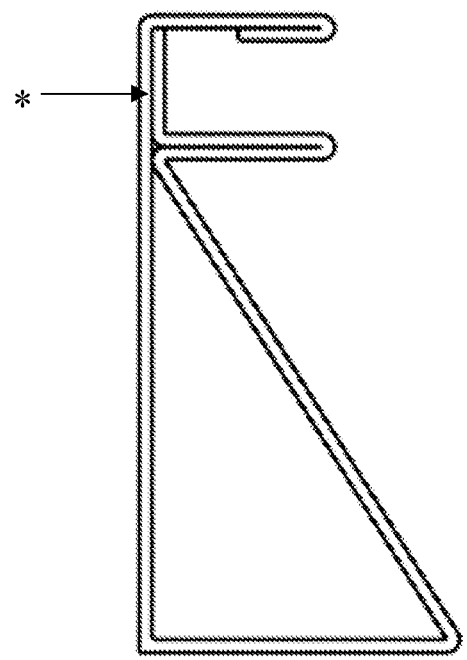
Figure 7B:
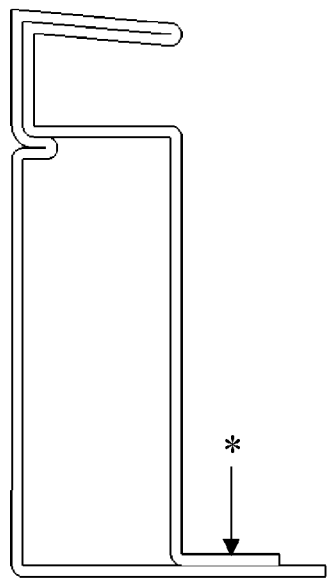
Figure 7C:
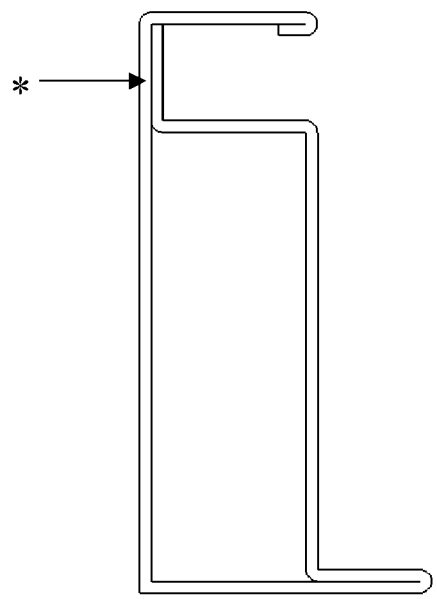
Figure 7D:
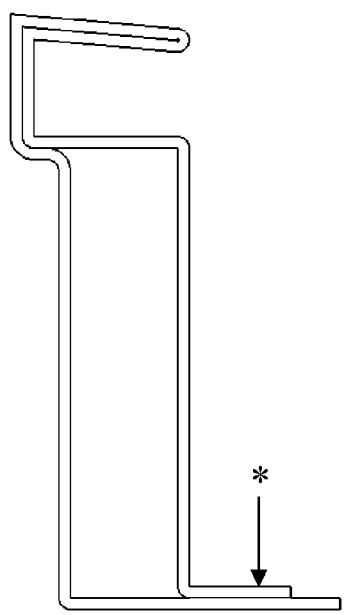
Figure 7E:
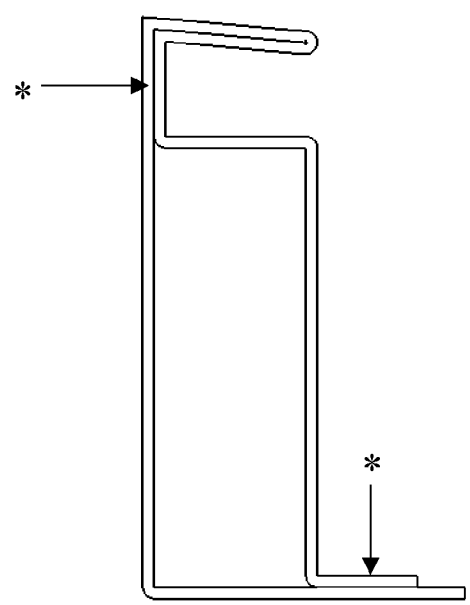
Figure 7F:
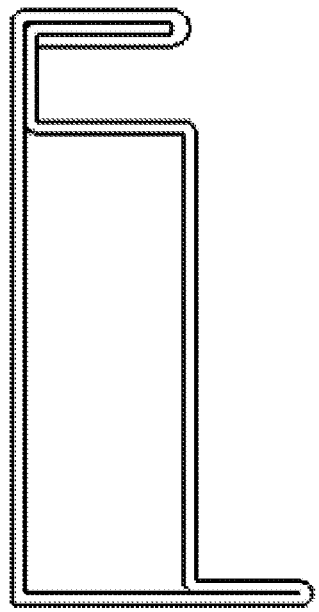
Figure 7G:
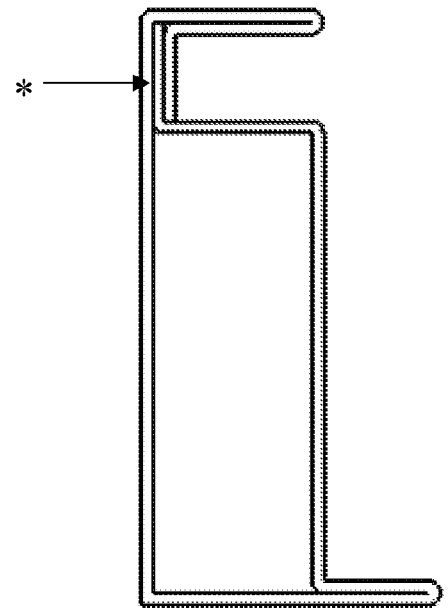
Figure 7H:
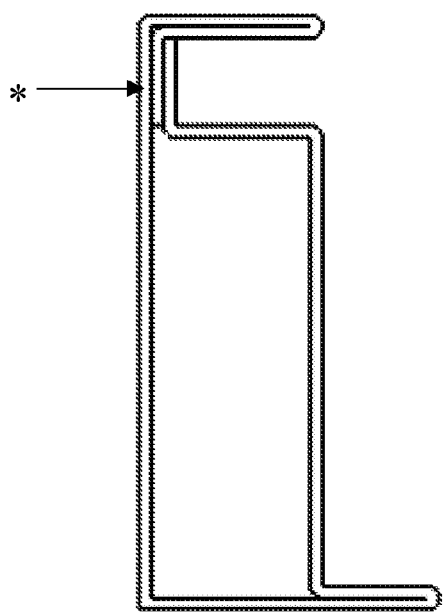
Figure 7I:
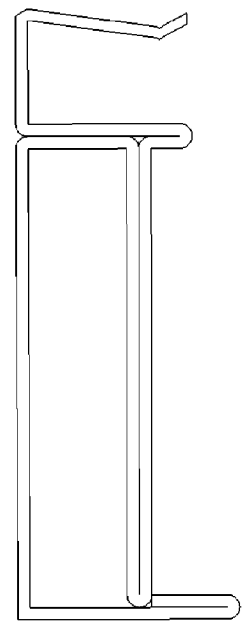
Figure 7J:
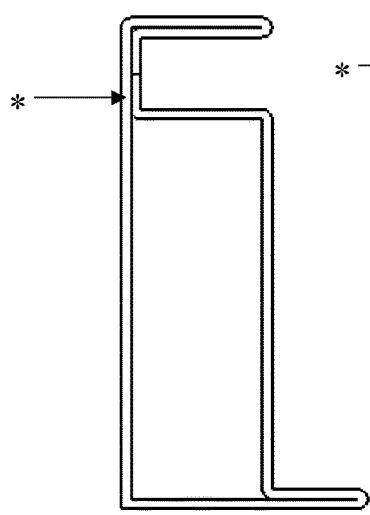
Figure 7K:
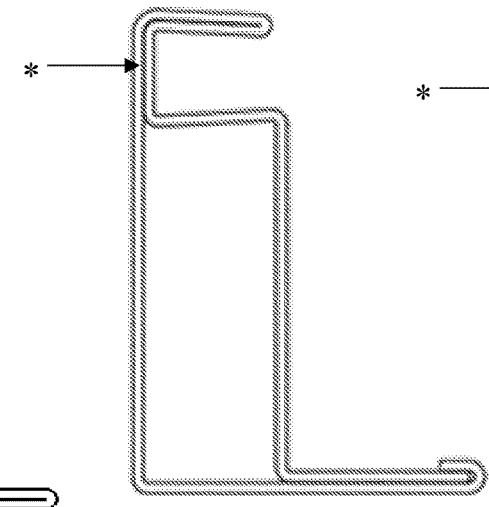
Figure 7L:
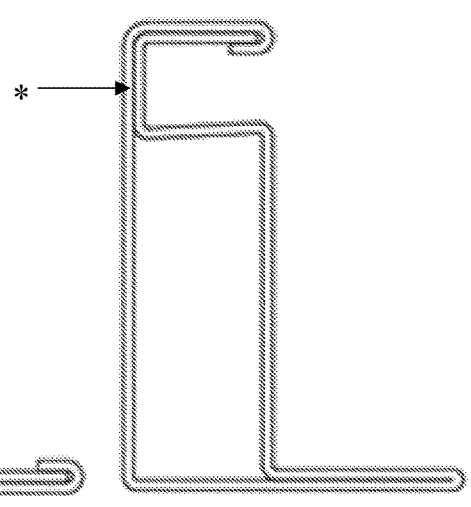
Figure 7M:
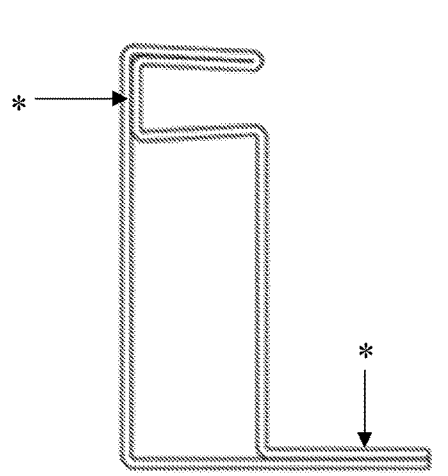
Figure 7N:
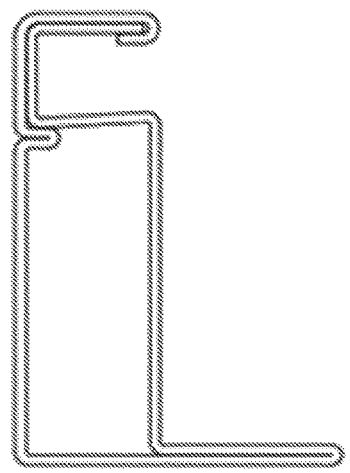
Figure 7O:
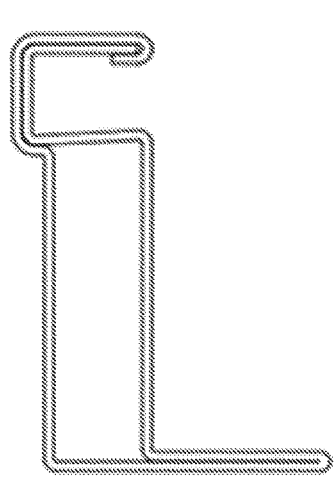

In FIG. 9D, the frame section may be similar to that shown in FIG. 7Y. Rather than having both top lip layers parallel as in FIG. 9A, the top lip layer 907D" may be provided at an angle relative to top lip layer 907D' thereby creating a crevice 962 between the two layers of framework material. In some cases, the lower top lip layer 907D" may be provided at an angle that is approximately parallel to the panel surface which may assist in guiding the panel into the panel containment structure. Sealant 955D provided into the crevice and/or behind the framework material edge may act as a resistant step or feature against panel 990 pullout.

In FIG. 9E, the frame section may be similar to that shown in FIG. 7O, which illustrates a non-limiting example of a separator element. The separator element 964 in some cases may ensure that the panel edge does not sit flush against the pocket wall. As shown in FIG. 9E, this may help allow ample sealant 955E to be provided between the edge of panel 990 and the pocket wall.

Figure 10A:
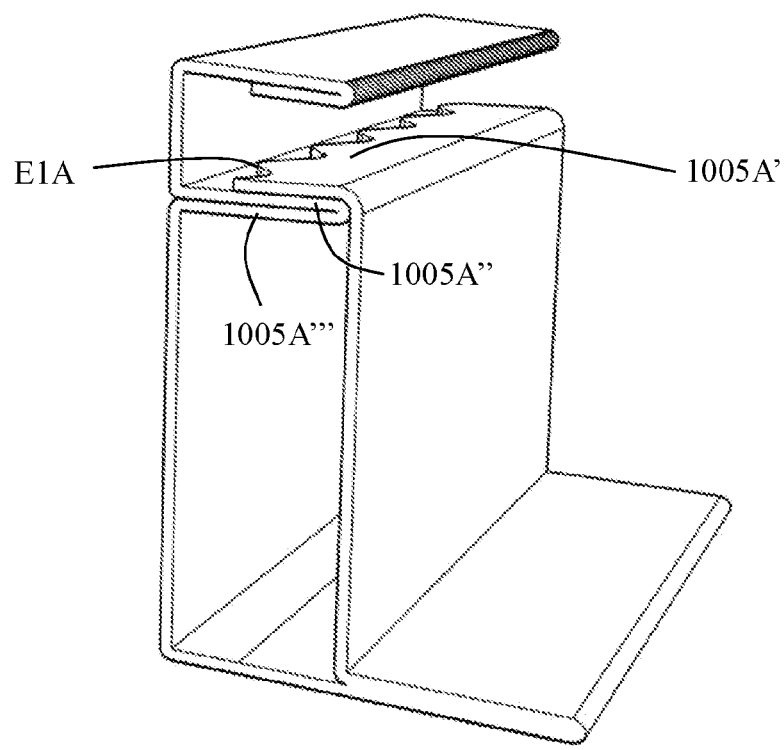
FIGS. 10A and 10B are perspective views of some non-limiting examples of frame sections having a structured lower shelf according to some embodiments.
Figure 10B:
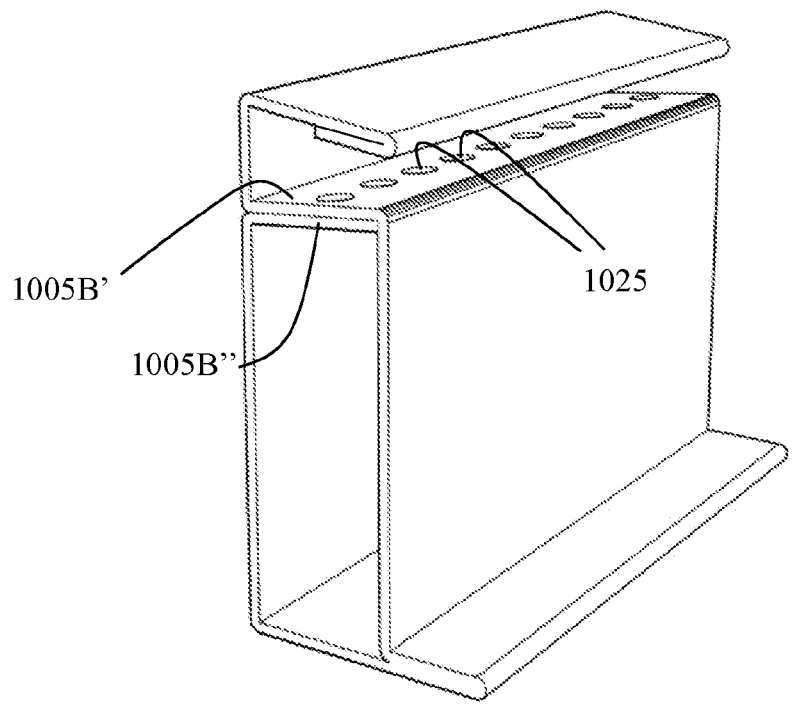

In some embodiments, the lower shelf may include a structure that increases the surface area of contact between the sealant and the lower shelf. FIGS. 10A and 10B are perspective views of some non-limiting examples of frame sections having a structured lower shelf according to some embodiments. Although the frame features are not all labelled, their identities are self-evident from the rest of this disclosure. In FIG. 10A, the lower shelf may include multiple lower shelf layers 1005A', 1005A", and 1005A'". The upper layer of the lower shelf (e.g., the panel-side lower shelf layer 1005A') may include an edge E1A of framework material that has been cut to form a patterned edge such that the framework edge is no longer linear. The patterned edge E1A in FIG. 10A is shown as a scalloped or wavey edge, but many other shapes may be used such that the patterned edge may appear to include serrations, fingers, steps, or the like, which may have a uniform pattern or a non-uniform pattern. In some embodiments, the length of the panel-side layer of the lower shelf between the inward end and the patterned edge varies by an average of at least about 2% across the frame section, alternatively, by an average of at least about 5%, about 10%, about 20%, or about 30% or the like. In FIG. 10B, the lower shelf may include multiple lower shelf layers 1005B' and 1005B". The upper layer of the lower shelf (the panel-side lower shelf layer 1005B') may include one or more holes 1025. The holes in FIG. 10B are shown in a uniform line, but the holes may instead be in some other uniform or non-uniform pattern. In some embodiments, with respect to the panel-side lower shelf of a frame section, the holes may occupy an area of at least about 2%, alternatively, at least about 5%, about 10%, about 20%, about 30%, about 40%, or about 50% or the like.

In some cases, for example as shown in FIGS. 10A and 10B, the structured lower shelf may reveal additional surface area of one or more lower shelf layers other than the panel-side lower shelf layer. This may increase the overall area of bonding between the sealant and the lower shelf. In some cases, the structured lower shelf (e.g., having holes or patterned edge or both) may act as a resistant step or feature against panel pullout. In some cases, a structured lower shelf with sealant may enable additional bonding between the panel-side lower shelf layer with one or more other lower shelf layers to further strengthen the frame.

Application of the sealant to the glass and the rest of the pocket wall may also help hold the panel-side lower shelf layer in place, for example, as in FIGS. 6A, 6B, 6E, 6F, 7B, 7K, 7O, 9A, 9B, 9E, 10A and 10B.

In some embodiments, an adhesive may be used to hold a panel-side lower shelf layer to an underlying lower shelf layer, e.g., formed from a fold at the upper portion of the frame sidewall (such as those as shown in FIGS. 7I and 7R). In some embodiments, the adhesive may be applied during the bending process such as during the roll forming process. In some embodiments, the adhesive material used between framework material layers may be the same as the sealant, or alternatively, it may be different.

In some embodiments, a pocket wall may include multiple pocket wall layers, for example, as in FIGS. 7A, 7G, 7H, 7L, 7M, 7P, 7Q, 7T, 7U-7Y, 7AA-7HH, and 7JJ-7OO. Although not illustrated, the pocket wall layers may have a structure similar to the structured lower shelf. For example, the panel-side pocket wall layer may include holes or a patterned edge in a manner analogous to that described in FIGS. 10A and 10B to form a structured pocket wall. In a non-limiting example, FIG. 7H illustrates a panel-side pocket wall layer 706H' that may optionally include holes or a patterned edge, which in combination with pocket wall layer 706H" may optionally form a structured pocket wall. The structured pocket wall may reveal additional surface area of one or more pocket wall layers other than the panel-side lower pocket wall layers. In concert with sealant applied to the panel edge or pocket region, his may allow improved bonding of the pocket wall layers together and potentially act as an attachment feature that may in some cases be provided in a step common to framing the panel. This may be particularly useful when the lower shelf does not include a fold, a step, or some other panel containment support feature on which to rest (such as in FIGS. 7G, 7H, 7P, 7T, 7CC, 7EE, 7GG, 7HH, and 7JJ-7MM). With such attachment feature, the forces applied to the frame sidewall and support wall may in some cases be distributed more evenly.

Stress Modeling

Figure 11A:
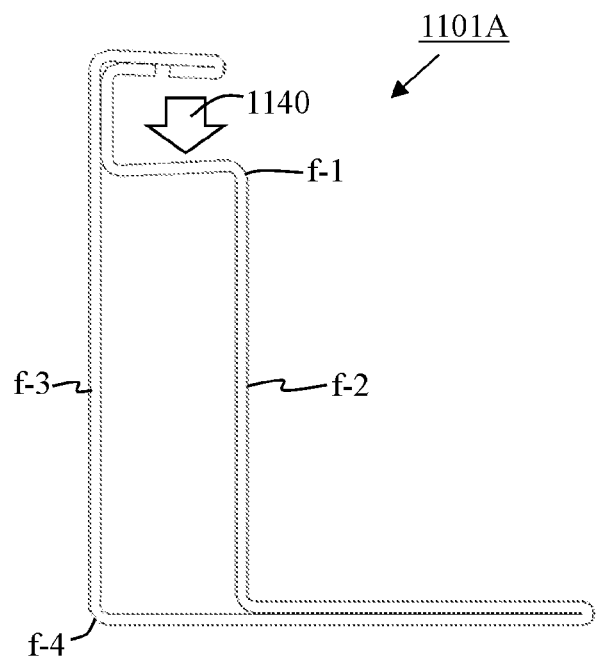
FIGS. 11A and 11B illustrate stress models for some non-limiting examples of box frames according to some embodiments.
Figure 11B:
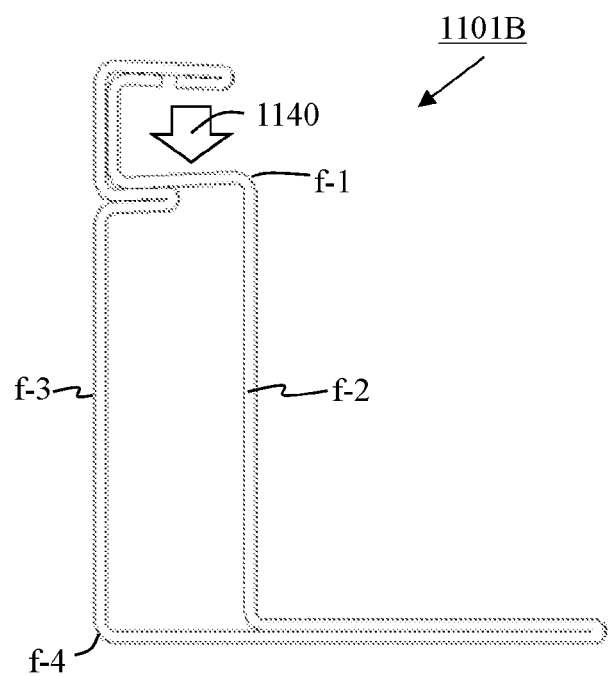

Numerous models have been created to simulate stresses that a frame might experience as function of various forces acting on it. FIGS. 11A and 11B illustrate stress models for some non-limiting examples of box frames according to some embodiments. For clarity, the various frame features are not labelled, but their identities are self-evident from the rest of this disclosure. FIG. 11A is a cross-sectional view of a frame section 1101A with a lower shelf that includes a single layer of framework material. Such a frame can be relatively simple to manufacture and has many other useful properties and advantages. FIG. 11B is a cross-sectional view of a frame section 1101B with a lower shelf having multiple layers of framework material, e.g., in part made from a fold in the framework material at an upper portion of the frame sidewall. As discussed, these multiple layers may act as a panel containment support feature. Such a frame, although having more folds than that of FIG. 11A, can be also relatively simple to manufacture and has many other useful properties and advantages.

FIGS. 11A and 11B further show an applied downward force 1140 upon the lower shelf. Such force may, for example, be from the weight of the panel in addition to any snow, wind, top clamp or other forces that may act on the panel and push downward toward the base as shown. The stresses induced in the frame section may be analyzed at various points including: f-1 (generally corresponding to the fold or intersection between the lower shelf and the support wall); f-2 (generally corresponding to about halfway down the support wall from the lower shelf); f-3 generally (corresponding to about halfway down the frame sidewall from the lower shelf); and f-4 (generally corresponding to the fold or intersection between the frame sidewall and bottom flange). The stresses at each point for each frame are summarized in Table 1.

TABLE 1

| | Stress (relative units) | |
|---|---|---|
| Point | Frame Section 1101A | Frame Section 1101B |
| f-1 | 8.61 | 2.88 |
| f-2 | 3.84 | 1.71 |
| f-3 | 0.16 | 0.86 |
| f-4 | 4.89 | 1.33 |

Depending on the framework material properties, the panel weight, and other expected environmental factors, the forces and stresses at the various points may pose no problem for either frame. However, the structure of frame section 1101B (having the panel containment support feature) may distribute such stresses more evenly at the various locations. In some cases, improved stress distribution may allow the designer to choose thinner framework material, use heavier panels, or place framed panel structures in more environmentally challenging locations. In some embodiments, a ratio of the stress experienced at the midpoint of a support wall (like point f-2) to the stress experienced at the midpoint a frame sidewall (like point f-3) caused by the weight of a panel may be in a range of about 0.1 to about 10, or alternatively about 0.2 to about 5, about 0.4 to about 3.0, or about 0.5 to about 2. In some embodiments, the stress experienced at the midpoint of a support wall (like point f-2) and the stress experienced at the midpoint a frame sidewall (like point f-3) caused by the weight of a panel may be within a factor of 10 of each other, alternatively within a factor of 5, 4, 3, or 2.

Figure 12A:
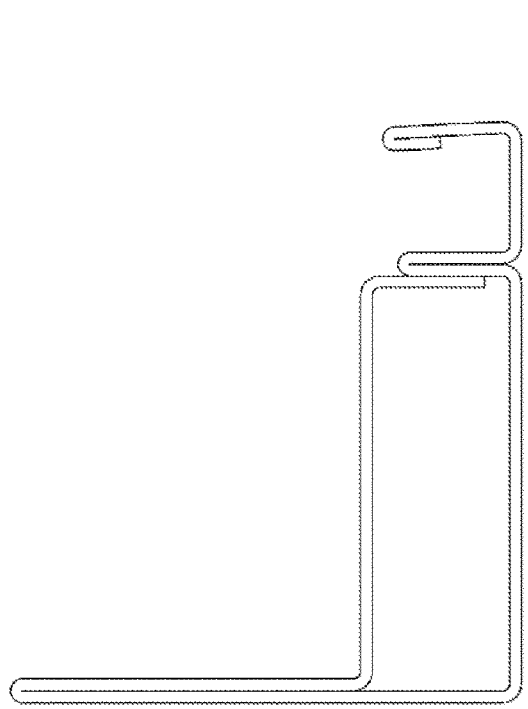
FIGS. 12A-12C illustrate stress models for some non-limiting examples of box frames according to some embodiments.
Figure 12B:
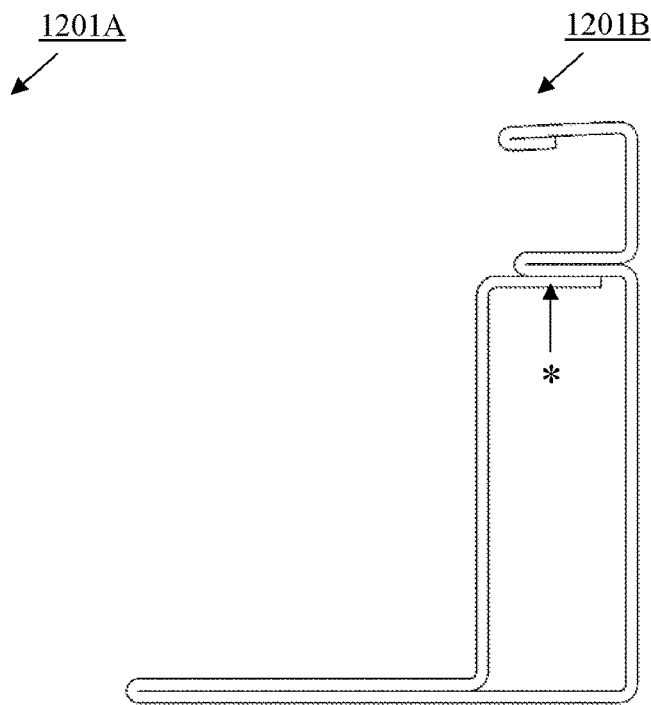
Figure 12C:
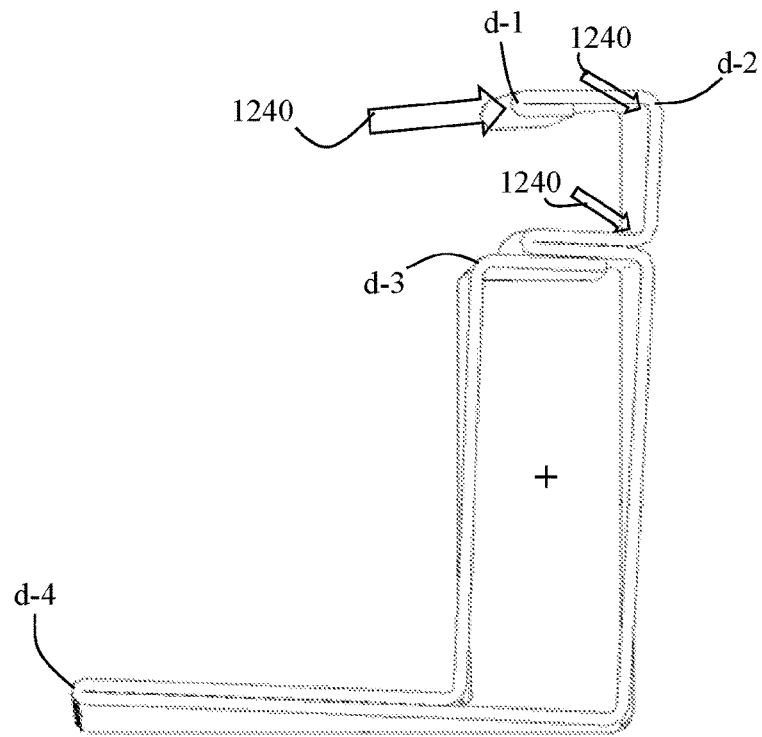

FIGS. 12A-12C illustrate stress models for some non-limiting examples of box frames according to some embodiments. For clarity, the various frame features are not labelled, but their identities are self-evident from the rest of this disclosure. FIG. 12A is a cross-sectional view of frame section 1201A and FIG. 12B is a cross-sectional view of frame section 1201B. For both FIGS. 12A and 12B, the box frame includes a multilayer lower shelf structure. For frame section 1201B, the lower shelf includes an attachment feature (marked with "*") to bond or otherwise attach the bottommost lower shelf layer to the lower shelf layer(s) above it formed from a fold in the framework material at an upper portion of the frame sidewall. The attachment feature may include a clinch, adhesive, or any of the other attachment feature options discussed in the present disclosure. The box frame shown in FIG. 12A is like 12B, but without the attachment feature.

FIG. 12C is a generic sideview of a frame like 1201A or 1201B further including some arrows indicating a torque 1240 applied at the panel containment structure about an axis (marked with "+"). One force arrow is at the inward end of the upper lip, another force arrow is at the top of the pocket wall and one arrow is at the base of the pocket wall, all generally pointing in a clockwise direction relative to the marked axis. The torque translated to the frame creates positional displacements across the frame section relative to the original positions. The displacement may be analyzed at various points of the frame section including: d-1 (generally corresponding to an inward edge of the top lip); d-2 (generally corresponding to a fold or intersection of the top lip with the pocket wall; d-3 (generally corresponding to a fold or intersection of the lower shelf with the support wall); and d-4 (generally corresponding to the inward end of a bottom flange. The displacement experienced at each point for each frame are summarized in Table 2.

TABLE 2

| | Displacement (relative units) | |
|---|---|---|
| Point | Frame Section 1201A | Frame Section 1201B |
| d-1 | 80 | 22 |
| d-2 | 75 | 18 |
| d-3 | 47 | 19 |
| d-4 | 71 | 36 |

Although frame section 1201A may be fully adequate under many conditions, adding an attachment feature as in frame section 1201B may impart improved stiffness and substantial resistance to torsional stresses on the frame. The attachment feature may allow the designer to choose thinner framework material, use heavier panels, or place framed panel structures in more environmentally challenging locations.

General Box Frame Model

FIG. 13 illustrates general models to assist in understanding some aspects of the present disclosure with respect to stresses. On the left is a cross-sectional representation (Model A—Non-box frame 1800 of a frame sidewall portion of a non-box frame section, i.e., one that does not include a support wall. For example, it may be similar to a frame sidewall shown in FIG. 1C or 2C. The frame sidewall has a height (h) and a base (b). For the purposes of illustration, the dimensions of Model A are not shown in accurate proportion—base b will generally be substantially smaller than height h. On the right is a cross-sectional representation (Model B-Box frame) 1801 of a box frame where some of the material from the frame sidewall has been redeployed as a support wall. The two models have the same cross-sectional area of framework material, and therefore, the same amount of framework material. Below each model are a set of equations and term definitions for determining moment of inertia and stress properties.

Referring to the equations in FIG. 13, it can be seen that changing from a rectangular shape (Model A) to a box shape (Model B) of similar (scaled) dimensions (while maintaining the same amount of material), results in increasing the moment of inertia by a factor of four (4×). The maximum bending stress in each of these models is inversely proportional to the moment of inertia, so a 4× increase in moment of inertia will decrease the bending stress by four times (4×). Similar to bending stress, the torsional shear stress is inversely proportional to the polar moment of inertia (J). This means a 4× increase in the polar moment of inertia will decrease the torsional shear stress by a factor of four (4×).

In some embodiments, therefore, and relative to frames not having a support wall, substantial improvements in stress performance may be achieved using a box frame without the burden of additional framework material and its associated costs and weight.

Additional Examples

FIG. 14A is a perspective view of a cutaway portion of a non-limiting example of a frame section or frame precursor structure that may include a frame support substructure according to some embodiments. The height H and lengthwise L axes are also shown for reference. Frame section 1401A may include a first lengthwise fold 1402 that may define an intersection of a frame sidewall 1403 with a bottom flange 1404. The frame section may include a series of folds to form a panel containment structure that may include a lower shelf 1405, a pocket wall 1406, a top lip 1407 and even pocket region 1408. In FIG. 14A, the frame section may include another lengthwise fold 1431 that may define an intersection of a support wall 1432 with bottom flange 1404. Support wall 1432 may extend from the bottom flange to, and may engage with, frame sidewall 1403. To engage with may be that at least a portion of the support wall may be held in place, e.g., by friction, geometry, spring forces, locking features, attachment features, or the like. The support wall may include an end flange 1435 that sits flush against the sidewall 303. In some embodiments, the support wall end flange 1435 and sidewall 1403 may include features that form a locking feature 1436. For example, the support wall end flange may include an opening or recess that receives a corresponding plug or raised feature that has been provided in the frame sidewall. Alternatively, the end flange may include the raised feature that is received by an opening or recess in the frame sidewall. Many alternative features that may be built into the frame to form locking features including, but not limited to, hooks and bendable tabs. In some embodiments, a locking feature but may instead be, or further include, some other attachment feature, e.g., welding, gluing, crimping, clinching, rivets, screws, bolts, or the like. Multiple locking/attachment features may be used.

Collectively, the frame sidewall, bottom flange and support wall may form a frame support substructure, and in this case, may be characterized as having three sides. That is, frame section 1401A may be characterized as a type of 3-sided box frame.

Numerous variations of the frame support substructures are available. FIG. 14B is a perspective view of a cutaway portion of a non-limiting example of a frame section or frame precursor structure that may include a frame support substructure according to some embodiments. FIG. 14B may be similar to FIG. 14A in some respects, but the perspective is different to show a portion of frame section 1401B below the lower shelf 1405. Lower shelf 1405 may be formed from a series of folds, but in FIG. 14B it may include a downwardly directed lower shelf lip 1439 that forms a recess in the bottom portion of the lower shelf. Support wall 1433 may include an end flange having a first end flange portion 1435 that may be flush against frame sidewall 1403 and a second end flange portion 1437 that may fit into the recess of the lower shelf formed by the lower shelf lip 1439. Second end flange portion 1437 may also be considered as a layer of the lower shelf. In this way, the support wall may engage both the sidewall and the lower shelf (part of the panel containment structure). The geometry of these features may hold the support wall in place, but any additional locking/attachment features mentioned previously may be included. Collectively, the frame sidewall, bottom flange and support wall form a frame support substructure, and in this case, may be characterized as having three sides. That is, frame section 1401B may be characterized as a type of 3-sided box frame.

FIG. 14C is a perspective view of a cutaway portion of a non-limiting example of a frame section or frame precursor that may include a frame support substructure according to some embodiments. Frame section 1401C may include a first lengthwise fold 1402 that may define an intersection of a frame sidewall 1403 with a bottom flange 1404. At an upper part of the frame sidewall, there may be a fold creating a core shelf structure 1441 that may include a downward facing lip 1443 which may form a recess. The frame section further may include another lengthwise fold 1431 that may define an intersection of a support wall 1432 with bottom flange 1404. Support wall 1432 may extend from the bottom flange to, and may engage with, frame sidewall 1403. The support wall may include an end flange 1451 which may engage with the recess portion of center lower shelf structure 1441. Beyond the end flange 1451, there may be a series of bends to form a panel containment structure that may include lower shelf 1405 (e.g., bent around lip 1443 and over core shelf structure 1441), pocket wall 1406, a top lip 1407 and even pocket region 1408. The panel containment structure of FIG. 14C may be based in part on folds in the framework material corresponding to the support wall portion, rather than to the frame sidewall portion. The geometry of these features may hold the support wall in place, but any additional locking/attachment features mentioned previously may be included. Collectively, the frame sidewall, bottom flange and support wall form a frame support substructure, and in this case, may be characterized as having three sides. That is, frame section 1401C may be characterized as a type of 3-sided box frame.

Figure 15:
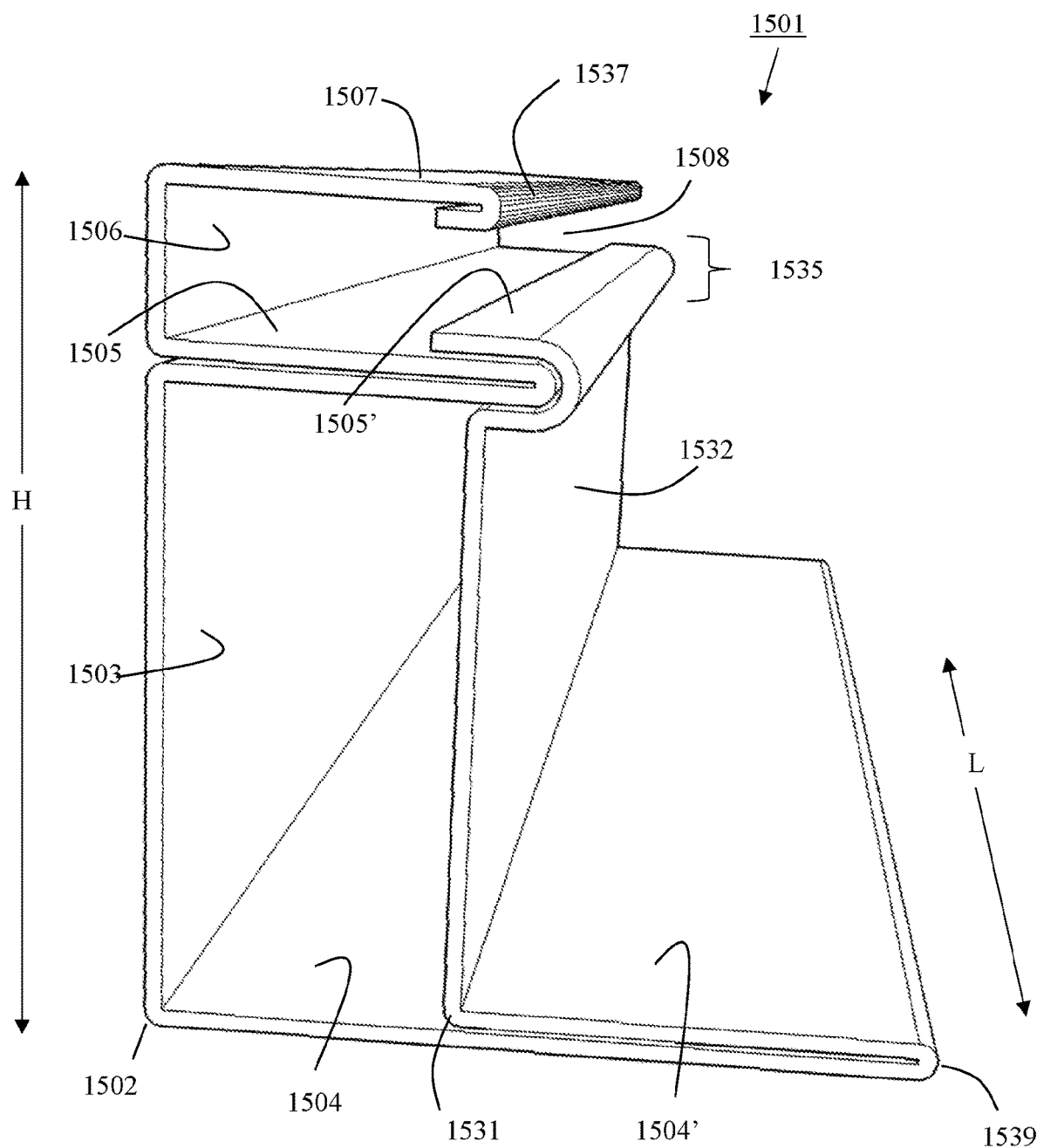
FIG. 15 is a perspective view of a cutaway portion of a non-limiting example of a frame section or frame precursor structure that may include a frame support substructure according to some embodiments.

FIG. 15 is a perspective view of a cutaway portion of a non-limiting example of a frame section or frame precursor structure that may include a frame support substructure according to some embodiments. The height H and lengthwise L axes are also shown for reference. Frame section 1501 may include a lengthwise fold 1502 that may define an intersection of a frame sidewall 1503 with a bottom flange 1504. The frame or frame precursor structure may include a series of folds to form a panel containment structure that may include a multilayer lower shelf 1505, a pocket wall 1506, a top lip 1507 and even pocket region 1508. The frame section may include a reversing flange fold 1539 such that a portion 1504' of the bottom flange may include a double layer of framework material. Another lengthwise fold 1531 may define an intersection of a support wall 1532 with the bottom flange 1504'. Support wall 1532 may extend from the bottom flange to, and may engage with, the end of lower shelf 1505 (part of the panel containment structure). By "engage with" it may be meant that at least a portion of the support wall is held in place, e.g., by friction, geometry, spring forces, locking features, attachment features or the like. The support wall may include an end flange 1535 that may be shaped to receive the end of the lower shelf. This shaping may sometimes be referred to herein as a "box closure fold". In some embodiments, the end flange may be crimped around the end of the bottom shelf. The top portion of support wall end flange 1535 may act as a lower shelf layer 1505' (a panel-side lower shelf layer) In some embodiments, the top lip 1507 may not extend as far as the lower shelf 1505. There may be various benefits to this design, e.g., it may create more room for crimping or other engaging mechanisms between the support wall and the lower shelf, or it may allow more sunlight to reach the solar panel by blocking less of the solar panel edge. In some embodiments, the top lip 1507 may include a top lip fold 1537 to form a rounded top lip edge. There may be various benefits to such a design, e.g., it may be more aesthetically pleasing, it may cause less accidental damage to the panel by eliminating sharp corners, and it may create a natural pocket for optional adhesives. In some cases, a cross-sectional view of FIG. 15 may be similar to that shown in FIG. 7N.

While structures like FIG. 15 may already include locking features due to geometry and/or crimping, alternative or additional locking/attachment features may be used. Collectively, the frame sidewall, bottom flange, support wall and the lower shelf may form a frame support substructure, and in this case, may be characterized as having four sides. That is, frame section 1501 may be characterized as a type of 4-sided box frame.

As mentioned, many of the frame structures discussed herein may be made using a combination of cutting, punching, and/or folding. In some embodiments, roll forming is used to perform some or all of the folds. Numerous sequences may potentially be used, but a non-limiting example of a process flow is shown in FIGS. 16A-16K for forming a structure that may be similar to FIG. 15 according to some embodiments. FIGS. 16A-16K are a series of cross-sectional views (except FIG. 16J) along a width of a framework material strip.

Figure 16A:
FIGS. 16A-16K are a series of various views of a non-limiting example of a framework material illustrating a sequence of steps in forming a frame or frame precursor structure according to some embodiments.

FIG. 16A shows a non-limiting example of Step 1 1700 which may be a step to cut and/or punch framework material. Step 1 may include making some or all of the desired cuts and punches in the framework material that may enable frame features such as notches and the like. The cross-sectional portion shown in FIG. 16A does not correspond to a notch area or other area having a cut or punch, so it may appear simply as a flat sheet of framework material 1540.

Figure 16B:
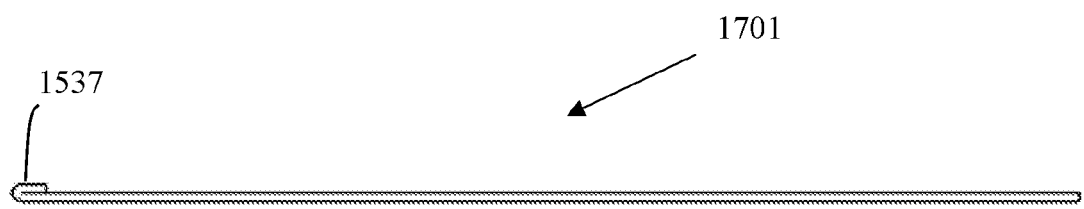
Figure 16C:
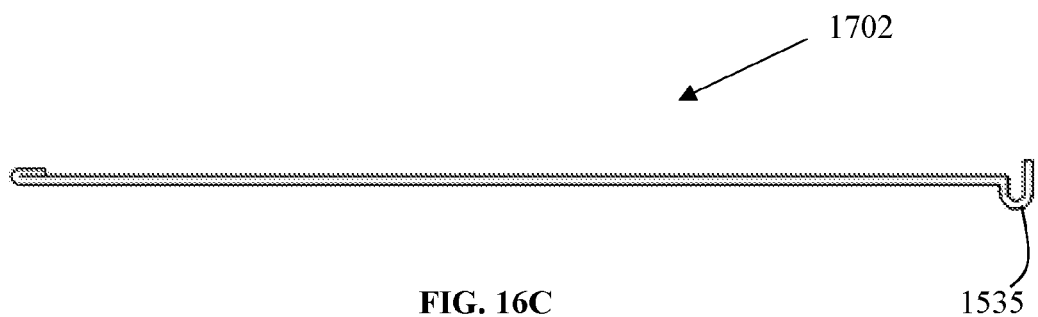
Figure 16D:
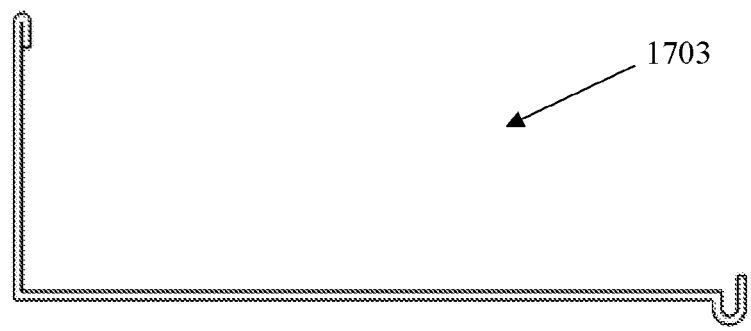
Figure 16E:
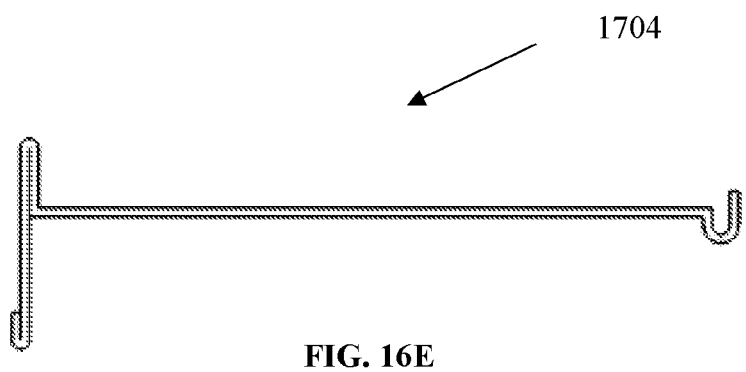
Figure 16F:
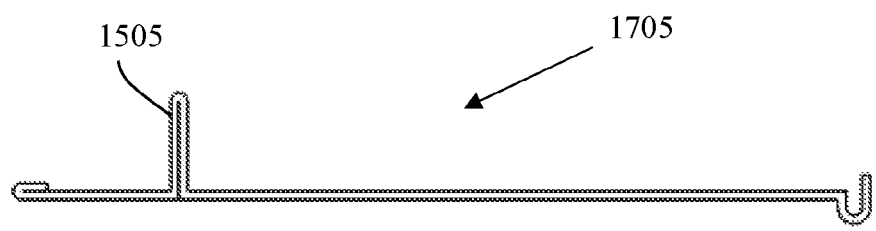
Figure 16G:
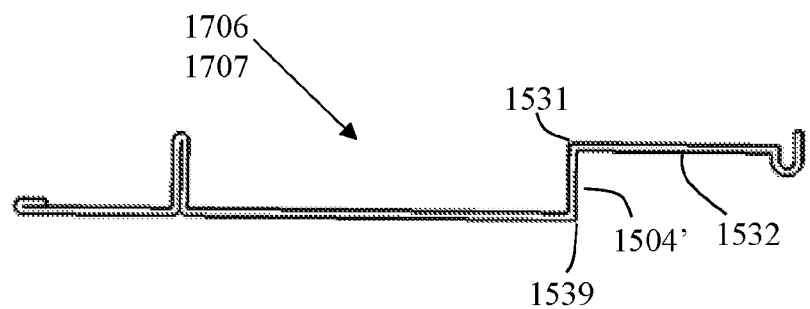
Figure 16H:
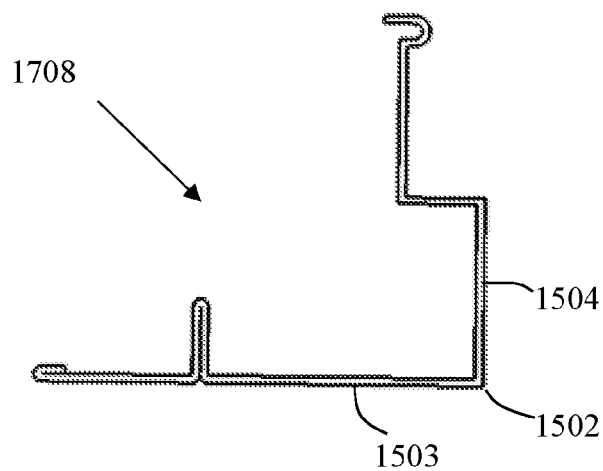
Figure 16I:
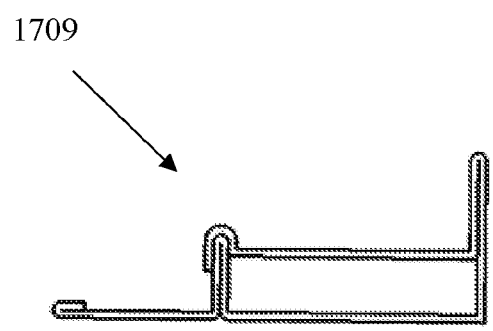
Figure 16J:
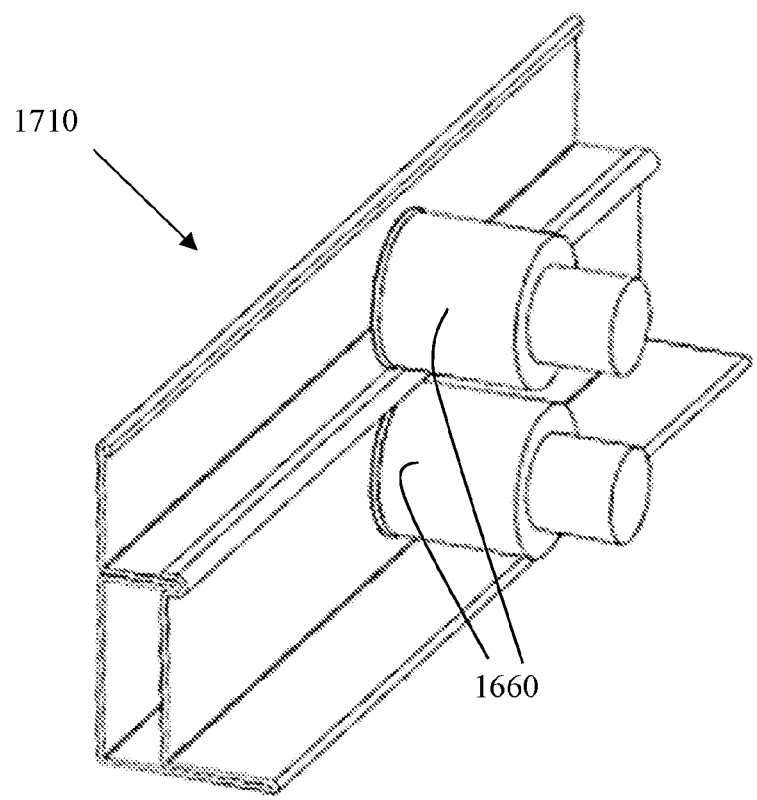
Figure 16K:
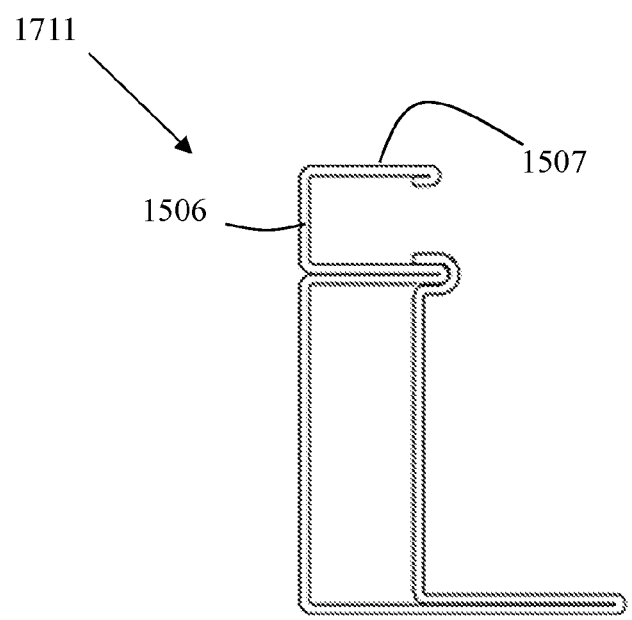

FIG. 16B shows a non-limiting example of Step 2 1701 which may be a top lip fold step. Step 2 may include making top lip fold 1537. FIG. 16C shows a non-limiting example of Step 3 1702 which may be a box closure fold step. Step 3 may include making box closure fold 1535. FIGS. 16D-16F show non-limiting examples of steps 4, 5 and 6, respectively. Step 4 1703 may be a lower shelf fold ∠#1. Step 5 1704 may be a lower shelf fold #2. Step 6 1705 may be a lower shelf fold #3. Steps 4-6 may include making lower shelf folds #1, #2, and #3, respectively, to form lower shelf 1505. FIG. 16G shows a non-limiting example of Steps 7 1706 and 8 1707 which may be box form folds #1 and #2. Steps 7 and 8 may include making box form folds #1 and #2, which may include a fold corresponding to fold 1531 perhaps defining the intersection of what may become support wall 1532 with what may become bottom flange 1504', and a fold that may correspond to the start of bottom flange doubling fold 1539. FIG. 16H shows a non-limiting example of Step 9 1708 which may be box form fold #3. Step 9 may include making box form fold #3, which may include a fold corresponding to fold 1502 that may define the intersection of frame sidewall 1503 with bottom flange 1504. FIG. 16I shows a non-limiting example of Step 10 1709 which may be a box form fold #4. Step 10 may include making box form fold #4 where a doubled flange portion may be formed, and the box closure fold may mate with the end of the lower shelf. FIG. 16J is a perspective view showing Step 11 a non-limiting example of Step 11 1710 which may be a crimping box closure fold to lower shelf step. Step 11 may be where the box closure fold may be crimped using crimping rollers 1660 to tightly secure the support wall to the end of the lower shelf. In some embodiments, the crimping rollers may include teeth. FIG. 16K shows a non-limiting example of Step 12 1711 which may be a pocket fold step. Step 12 may include making a pocket fold defining the top lip 1507 and pocket wall 1506. In some embodiments, a pocket fold may be made prior to mounting to a panel. In some embodiments, a pocket fold may be made with during panel mounting, e.g., with the panel positioned in place along with optional adhesive. In embodiments, any number of steps may be used and may be in any order.

There may be additional steps not shown during or after this sequence, e.g., application of straightening rollers, additional cuts or punches, buffing or the like. The skilled artisan will understand that there are numerous variations to the sequence and FIGS. 16A-16K represent just one non-limiting example. In some embodiments, some folding steps may be performed in parallel rather than serially.

Although described herein with respect to their utility in making frames for solar panels, the methods, equipment, and devices of the present application may be used to manufacture many other products in many other fields. In some cases, such other products may be those formed at least in part from a generally flat starting material including, but not limited to, sheet metal (coated or uncoated).

It should be noted that various parts and frame features, including but not limited to, frame sidewalls and bottom flanges, have generally be represented in their respective figures as being straight or flat, but in some embodiments, one or more of these features (or other features shown as being straight or flat) may instead be non-straight or non-flat. For example, one or more of these features may include one or more curves or additional bends and still effectively perform their intended function.

Note also that in any of the figures herein, folds that may be represented as having sharp corners may be replaced with rounded corners. In some embodiments, a corner formed by a fold may be characterized by a bending radius.

In some embodiments, in areas where a portion of framework material may come into contact with another material including, but not limited to, another portion of framework material, a bolt, a washer, a support structure, or the like, such areas may optionally include an anti-corrosion coating or an additional anti-corrosion coating treatment including, but not limited to, those already discussed.

In some embodiments, in areas where multiple layers of framework material are formed, such areas may optionally include a bonding or attachment feature to hold the layers together. Some non-limiting examples of attachment features may include a crimp, a clinch, an interlocking feature between the layers, double-sided adhesive tape, an adhesive, a weld, a braze, a solder, or the like. In some embodiments, an anticorrosion coating may also have adhesive properties and act as an attachment feature.

Still further embodiments herein include the following enumerated embodiments. The term "including" (and its variations, "includes", "include") in these enumerated embodiments encompasses its normal meaning in addition to "comprising" ("comprises", "comprise") and/or "consisting of" ("consists of", "consist of") and/or "consisting essentially of" ("consists essentially of", consist essentially of").

Enumerated Embodiments

Enumerated embodiment 1. A frame for at least partially enclosing or supporting a panel, the frame including at least a first frame section, the first frame section including:
a bottom flange provided at a base of the frame section;
a frame sidewall provided at an outer portion of the frame section, the frame sidewall characterized by a height extending from the bottom flange;
a panel containment structure at an upper portion of the frame sidewall, the panel containment structure including a lower shelf extending from the frame sidewall; and
a support wall provided at an inner portion of the frame section, the support wall extending: between the bottom flange and the frame sidewall, between the bottom flange and the lower shelf, or both) between the bottom flange and the frame sidewall and between the bottom flange and the lower shelf;

wherein the bottom flange, frame sidewall, panel containment structure, and support wall are formed at least in part from folds provided in a single piece of framework material.

Enumerated embodiment 2. The frame of enumerated embodiment 1 or any other enumerated embodiment, further including a lengthwise fold defining an intersection of the frame sidewall with the bottom flange.

Enumerated embodiment 3. The frame of enumerated embodiment 1 or 2 or any other enumerated embodiment, wherein at least a portion of the bottom flange, frame sidewall, lower shelf, or support wall, or any combination thereof, includes at least two layers of framework material.

Enumerated embodiment 4. The frame according to any of enumerated embodiments 1-3 or any other enumerated embodiment, wherein the panel containment structure further includes a pocket wall extending from the lower shelf.

Enumerated embodiment 5. The frame according to enumerated embodiment 4 or any other enumerated embodiment, wherein at least a portion of the pocket wall includes at least two layers of framework material.

Enumerated embodiment 6. The frame of enumerated embodiment 4 or 5 or any other enumerated embodiment, wherein the panel containment structure further includes a top lip intersecting an upper portion of the pocket wall, thereby forming a pocket region for receiving the panel, the pocket region defined by the lower shelf, the pocket wall, and the top lip.

Enumerated embodiment 7. The frame of enumerated embodiment 6 or any other enumerated embodiment, wherein at least a portion of the top lip includes at least two layers of framework material.

Enumerated embodiment 8. The frame of enumerated embodiment 6 or 7 or any other enumerated embodiment, wherein an angle formed by the lower shelf and the pocket wall is in a range of about 50° to about 90°.

Enumerated embodiment 9. The frame according to any of enumerated embodiments 6-8 or any other enumerated embodiment, wherein an angle formed by the top lip and the pocket wall is in a range of about 50° to about 90°.

Enumerated embodiment 10. The frame of enumerated embodiment 9 or any other enumerated embodiment, wherein the pocket wall includes multiple layers of framework material including a panel-side pocket wall layer connected by a fold to a lower shelf layer, and wherein the angle formed by the top lip and pocket wall is less than about 90°.

Enumerated embodiment 11. The frame of enumerated embodiment 10 or any other enumerated embodiment, wherein the top lip includes multiple layers of framework material including a panel-side top lip layer connected by a fold to the panel-side pocket wall.

Enumerated embodiment 12. The frame of enumerated embodiment 10 or 11 or any other enumerated embodiment, wherein the panel-side pocket wall is locked in place by geometry or compressive forces or both.

Enumerated embodiment 13. The frame according to any of enumerated embodiments 6-9 or any other enumerated embodiment, wherein along a frame height axis, a pocket opening between an inward end of the lower shelf and an inward end of the top lip is smaller than a pocket wall height.

Enumerated embodiment 14. The frame according to any of enumerated embodiments 6-13 or any other enumerated embodiment, wherein at least one edge of framework material is provided within the panel containment structure.

Enumerated embodiment 15. The frame according to enumerated embodiment 14 or any other enumerated embodiment, wherein the edge of framework material within the panel containment structure forms a predetermined step or gap that forms an area for sealant overflow.

Enumerated embodiment 16. The frame according to enumerated embodiment 14 or 15 or any other enumerated embodiment, wherein the edge of the framework material within the panel containment structure forms a predetermined step or gap that, in combination with applied sealant, resists pullout of the panel.

Enumerated embodiment 17. The frame according to any of enumerated embodiments 1-16 or any other enumerated embodiment, wherein the first frame section further includes a panel containment support feature.

Enumerated embodiment 18. The frame of enumerated embodiment 17 or any other enumerated embodiment, wherein the panel containment support feature includes a fold structure at an upper portion of the frame sidewall or at an upper portion of the support wall.

Enumerated embodiment 19. The frame of enumerated embodiment 18 or any other enumerated embodiment, wherein the panel containment support feature forms a portion of the lower shelf.

Enumerated embodiment 20. The frame of enumerated embodiment 19 or any other enumerated embodiment, wherein the panel containment support feature extends from the frame sidewall at an angle approximately parallel to any other lower shelf layers not forming part of the panel containment support feature.

Enumerated embodiment 21. The frame according to any of enumerated embodiments 1-20 or any other enumerated embodiment, wherein the first frame section is characterized in cross-section by an enclosed space including at least three sides including the bottom flange, frame sidewall, and the support wall.

Enumerated embodiment 22. The frame according to any of enumerated embodiments 1-20 or any other enumerated embodiment, wherein the first frame section is characterized in cross-section by an enclosed space including at least four sides, the four sides including the bottom flange, frame sidewall, lower shelf, and support wall.

Enumerated embodiment 23. The frame of enumerated embodiment 22 or any other enumerated embodiment, wherein a lengthwise fold defines an intersection of the lower shelf with the support wall.

Enumerated embodiment 24. The frame according to any of enumerated embodiments 1-23 or any other enumerated embodiment, wherein the bottom flange includes an inward extension, an outward extension, or both.

Enumerated embodiment 25. The frame according to any of enumerated embodiments 1-24 or any other enumerated embodiment, wherein the bottom flange includes a roll structure.

Enumerated embodiment 26. The frame of enumerated embodiment 25 or any other enumerated embodiment, wherein the roll structure is designed to engage with an attachment feature provided on a support structure.

Enumerated embodiment 27. The frame according to any of enumerated embodiments 1-26 or any other enumerated embodiment, wherein the bottom flange includes a hole for mounting to a support structure.

Enumerated embodiment 28. The frame of enumerated embodiment 27 or any other enumerated embodiment, wherein the support structure includes an attachment feature.

Enumerated embodiment 29. The frame of enumerated embodiment 28 or any other enumerated embodiment, wherein the attachment feature includes a spring tab.

Enumerated embodiment 30. The frame according to any of enumerated embodiments 1-29 or any other enumerated embodiment, wherein the lower shelf includes a panel-side lower shelf layer including a patterned edge.

Enumerated embodiment 31. The frame according to any of enumerated embodiments 1-30 or any other enumerated embodiment, wherein the lower shelf includes a panel-side lower shelf layer including one or more holes.

Enumerated embodiment 32. The frame according to any of enumerated embodiments 1-31 or any other enumerated embodiment, wherein the panel containment includes a pocket wall having multiple layers of framework material, and wherein a panel-side pocket wall includes one or more holes, a patterned edge, or both.

Enumerated embodiment 33. The frame according to any of enumerated embodiments 1-32 or any other enumerated embodiment, wherein the frame section includes an attachment feature.

Enumerated embodiment 34. The frame of enumerated embodiment 33 or any other enumerated embodiment, wherein the attachment feature includes a recess, a hole, a hook, a plug, a tab, or a spring tab.

Enumerated embodiment 35. The frame of enumerated embodiment 33 or 34 or any other enumerated embodiment, wherein the attachment feature includes a crimp, a clinch, a rivet, a weld, an adhesive, a screw, or a bolt.

Enumerated embodiment 36. The frame according to any of enumerated embodiments 1-35 or any other enumerated embodiment, wherein the framework material includes coated steel.

Enumerated embodiment 37. The frame of enumerated embodiment 36 or any other enumerated embodiment, wherein the coated steel has a thickness in a range of about 0.7 mm to about 1.4 mm.

Enumerated embodiment 38. The frame according to any of enumerated embodiments 1-37 or any other enumerated embodiment, further including a second frame section having a structure that is the same as, or different than, the first frame section.

Enumerated embodiment 39. The frame of enumerated embodiment 38 or any other enumerated embodiment, further including third and fourth frame sections, each independently selected to be the same as, or different than, the first frame section.

Enumerated embodiment 40. The frame according to any of enumerated embodiments 1-39 or any other enumerated embodiment, wherein the frame is formed from a single frame precursor structure.

Enumerated embodiment 41. The frame according to any of enumerated embodiments 1-39 or any other enumerated embodiment, wherein the frame is formed from multiple frame precursor structures.

Enumerated embodiment 42. A framed panel structure including a frame according to any of enumerated embodiments 1-41 and a panel provided in association with the panel containment structure of the first frame section.

Enumerated embodiment 43. The framed panel structure of enumerated embodiment 42 or any other enumerated embodiment, wherein the panel is a solar panel.

Enumerated embodiment 44. The framed panel structure of enumerated embodiment 42 or 43 or any other enumerated embodiment, wherein the panel has a weight that applies a first force to a midpoint of the frame sidewall of the first frame section and a second force to a midpoint of the support wall of the first frame section, and wherein the ratio of the second force to the first force is in a range of about 0.2 to about 5.0.

Enumerated embodiment 45. A photovoltaic solar energy system including a framed panel structure according to enumerated embodiment 43 or 44 attached to a support structure.

Enumerated embodiment 46. The photovoltaic solar energy system of enumerated embodiments 45 or any other enumerated embodiment, wherein the frame includes a bottom flange including a mounting hole, and wherein the support structure includes a spring tab that engages the bottom flange through the mounting hole.

Enumerated embodiment 47. The photovoltaic solar energy system of enumerated embodiment 46 or any other enumerated embodiment, wherein the bottom flange further includes a roll structure that is engaged by the spring tab.

Enumerated embodiment 48. A method of making a frame precursor structure for use in a frame according to any of enumerated embodiments 1-41 or any other enumerated embodiment, the method including:

providing framework material to a framework materials station;

receiving the framework material at a punching station, wherein the framework material is cut or punched in a predetermined pattern to form a patterned framework material; and receiving the patterned framework material at a roll forming station, wherein the patterned framework material is folded or bent into a predetermined shape to form a shaped framework material.

Enumerated embodiment 49. The method of enumerated embodiment 48 or any other enumerated embodiment, wherein the shaped framework material is the frame precursor structure.

Enumerated embodiment 50. The method of enumerated embodiment 48 or any other enumerated embodiment, further including:

receiving the shaped framework material at a post forming station, wherein the shaped framework material is acted on by one or more post forming processes to form the framework precursor structure.

Enumerated embodiment 51. The method of enumerated embodiment 50 or any other enumerated embodiment, wherein the one or more post forming processes include:

cutting the frame precursor structure to a predetermined length;

passing the shaped framework material through straightening rollers; or buffing or deburring the shaped framework material.

Enumerated embodiment 52. The method according to any of enumerated embodiments 48-51 or any other enumerated embodiment, wherein the framework material is provided in the form of a roll.

As can be easily understood from the foregoing, the basic concepts of the various embodiments of the present application(s) may be embodied in a variety of ways. It involves frame, frame precursor structure, frame section, framed panel structure and/or mounting technology techniques as well as devices to accomplish the appropriate frame, frame precursor structure, frame section, framed panel structure, and/or mounting technology. In this application, the frame, frame precursor structure, frame section, framed panel structure and/or mounting technology techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the various embodiments of the present application(s) and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application. As used herein and in the appended claims, the singular forms "a", "an", and "the" include plural referents unless the context clearly dictates otherwise. Thus, for example, reference to "a method" includes a plurality of such methods and reference to "the anode" includes reference to one or more anodes and equivalents thereof known to those skilled in the art, and so forth. Terms like "overlaying", "over" or the like may be direct contact, indirect contact, above, upon, cover, or the like.

It should also be understood that a variety of changes may be made without departing from the essence of the various embodiments of the present application(s). Such changes are also implicitly included in the description. They still fall within the scope of the various embodiments of the present application (s). A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the present application (s) both independently and as an overall system.

Further, each of the various elements of embodiments of the present application (s) and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the present application (s), the words for each element may be expressed by equivalent apparatus terms or method terms— even if only the function or result is the same. Such equivalent, broader, or even more generic terms should be considered to be encompassed in the description of each element or action. Such terms can be substituted where desired to make explicit the implicitly broad coverage to which embodiments of the present application (s) are entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "fold" should be understood to encompass disclosure of the act of "folding"—whether explicitly discussed or not—and, conversely, were there effectively disclosure of the act of "folding", such a disclosure should be understood to encompass disclosure of a "fold" and even a "means for folding." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components that are configured to, or configured and arranged to, achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this present application for patent are hereby incorporated by reference. Any priority case(s) claimed by this present application is hereby appended and hereby incorporated by reference. In addition, as to each term used it should be understood that unless its utilization in this present application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of the various embodiments of present application(s) such statements are expressly not to be considered as made by the applicant(s).

References to be Incorporated by Reference
Foreign Patent Documents

| Foreign Document No. | Country Code | Kind Code | Publication Date | Name of Patentee |
|---|---|---|---|---|
| 2020252091 | WO | A1 | 2020 Dec. 17 | Origami Solar |

Non Patent Literature Documents

U.S. Provisional patent Application No. 63/176,803, filed Apr. 19, 2021. First named inventor: Hafter.
U.S. Provisional patent Application No. 63/176,824, filed Apr. 19, 2021. First named inventor: Patton.
U.S. Provisional patent Application No. 63/288,556, filed Dec. 11, 2021. First named inventor: Patton.
U.S. Provisional patent Application No. 63/189,591, filed May 17, 2021. First named inventor: Hafter.
U.S. Provisional patent Application No. 63/213,541, filed Jun. 22, 2021. First named inventor: Hafter.
U.S. Provisional patent Application No. 63/224,271, filed Jul. 21, 2021. First named inventor: Patton.
U.S. Provisional patent Application No. 63/272,086, filed Oct. 26, 2021. First named inventor: Patton.

Thus, the applicant(s) should be understood to have support and make claims to embodiments including at least: i) each of the frame, frame precursor structure, frame section, framed panel structure, and/or mounting technologies as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent applications, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all applications described herein.

In addition and as to computer aspects and each aspect amenable to programming or other electronic automation, it should be understood that in characterizing these and all other aspects of the various embodiments of the present application(s)—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of application to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi)

circuitry configurations (including configurations of transistors, gates, and the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent applications, and xxxiii) the various combinations of each of the above and of any aspect, all without limiting other aspects in addition. In addition, the applicant(s) should be understood to have support to claim and make a statement of application that may include claims directed to any of the enumerated embodiments and any permutation or combination thereof.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this present application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of various embodiments of the present application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as desired to define the matter for which protection is sought by this present application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this present application including any subsequent continuation, division, or continuation-in-part application thereof or any reissue or extension thereon.

We claim:

1. A frame for at least partially enclosing or supporting a solar panel, the frame comprising at least a first frame section, the first frame section comprising:
   a bottom flange provided at a base of the frame section;
   a frame sidewall provided at an outer portion of the frame section, the frame sidewall characterized by a height extending from the bottom flange;
   a panel containment structure at an upper portion of the frame sidewall, the panel containment structure comprising a lower shelf extending from the frame sidewall; and
   a support wall provided at an inner portion of the frame section, the support wall extending: between the bottom flange and the frame sidewall, between the bottom flange and the lower shelf, or both between the bottom flange and the frame sidewall and between the bottom flange and the lower shelf;

wherein the bottom flange, frame sidewall, panel containment structure, and support wall are formed at least in part from folds provided in a single piece of framework material;

wherein the panel containment structure further comprises a top lip intersecting an upper portion of the frame sidewall, thereby forming a pocket region for receiving the solar panel, the pocket region defined by the lower shelf, part of the frame sidewall, and the top lip;

wherein the angle formed by the top lip and the frame sidewall is less than about 90°; and wherein the angle formed by the lower shelf and the frame sidewall is less than about 90° so that an end of the lower shelf opposite of the frame sidewall is angled towards the top lip.

2. The frame of claim 1, further comprising a lengthwise fold defining an intersection of the frame sidewall with the bottom flange.

3. The frame of claim 1, wherein at least a portion of the bottom flange, frame sidewall, lower shelf, or support wall, or any combination thereof, comprises at least two layers of framework material.

4. The frame of claim 1, wherein the panel containment structure further comprises a pocket wall extending from the lower shelf.

5. The frame of claim 4, wherein at least a portion of the pocket wall comprises at least two layers of framework material.

6. The frame of claim 4, wherein the panel containment structure further comprises the top lip intersecting an upper portion of the pocket wall, thereby forming the pocket region for receiving the panel, the pocket region defined by the lower shelf, the pocket wall, and the top lip.

7. The frame of claim 6 wherein the pocket wall comprises multiple layers of framework material including a panel-side pocket wall layer connected by a fold to a lower shelf layer.

8. The frame of claim 7, wherein the top lip comprises multiple layers of framework material including a panel-side top lip layer connected by a fold to the panel-side pocket wall.

9. The frame of claim 7 wherein the panel-side pocket wall is locked in place by geometry, compressive forces, or both.

10. The frame of claim 6, wherein along a frame height axis, a pocket opening between an inward end of the lower shelf and an inward end of the top lip is smaller than a pocket wall height.

11. The frame of claim 6, wherein at least one edge of framework material is provided within the panel containment structure.

12. The frame of claim 11, wherein the edge of the framework material within the panel containment structure forms a predetermined step or gap that, in combination with applied sealant, resists pullout of the panel.

13. The frame of claim 1, wherein the first frame section further comprises a panel containment support feature.

14. The frame of claim 13, wherein the panel containment support feature comprises a fold structure at an upper portion of the frame sidewall or at an upper portion of the support wall.

15. The frame of claim 14, wherein the panel containment support feature forms a portion of the lower shelf.

16. The frame of claim 15, wherein the panel containment support feature extends from the frame sidewall at an angle approximately parallel to any other lower shelf layers not forming part of the panel containment support feature.

17. The frame of claim 1, wherein the bottom flange comprises an inward extension, an outward extension, or both.

18. The frame of claim 1, wherein the framework material comprises coated steel.

19. The framed panel structure of claim 1, and further comprising an attachment feature in the first frame section configured to attach the single piece of framework material to itself.

20. The framed panel structure of claim 19, wherein a first end of the single piece of framework is located near a second end of the single piece of framework in the first frame section, wherein the first and second ends of the single piece of framework are located on a bottom flange in the first frame section, and wherein the attachment feature is located inward from the first and second ends of the single piece of framework.

21. The framed panel structure of claim 19, wherein the attachment feature is chosen from clinching, crimping, rivets, screws, nuts and bolts, welding, adhesives, and interlocking elements between layers of framework material.

22. The framed panel structure of claim 19, wherein the attachment feature comprises clinching.

23. A framed panel structure comprising a frame of claim 1 and the solar panel provided in association with the panel containment structure of the first frame section.

24. The framed panel structure of claim 23, wherein the panel has a weight that applies a first stress to a midpoint of the frame sidewall of the first frame section and a second stress to a midpoint of the support wall of the first frame section, and wherein the lower shelf of the panel containment structure is configured to distribute an amount of the first stress to the midpoint of the frame sidewall with an amount of the second stress to the midpoint of the support wall.

25. The framed panel structure of claim 24, wherein the lower shelf of the panel containment structure is configured to more evenly distribute the amount of the first stress to the midpoint of the frame sidewall and the amount of the second stress to the midpoint of the support wall.

26. The framed panel structure of claim 23, wherein the panel has a weight that applies a stress to the first frame section, wherein the lower shelf of the panel containment structure is configured to distribute said stress from said weight in said first frame section.

27. The framed panel structure of claim 26, wherein the lower shelf is part of the frame sidewall.

28. The framed panel structure of claim 26, wherein the lower shelf of the panel containment structure comprises at least two layers.

* * * * *